(12) United States Patent  
Phillips et al.

(10) Patent No.: US 7,959,069 B2
(45) Date of Patent: *Jun. 14, 2011

(54) SYSTEMS AND METHODS FOR INTERFACING LOCATION-BASE DEVICES

(75) Inventors: Cheryl Phillips, Yuma, AZ (US); David Smith, Sugar Land, TX (US)

(73) Assignee: First Data Corporation, Greenwood Village, CO (US)

( * ) Notice: Subject to any disclaimer, the term of this patent is extended or adjusted under 35 U.S.C. 154(b) by 410 days.

This patent is subject to a terminal disclaimer.

(21) Appl. No.: 11/936,376

(22) Filed: Nov. 7, 2007

(65) Prior Publication Data

US 2008/0059347 A1    Mar. 6, 2008

Related U.S. Application Data

(63) Continuation of application No. 11/418,780, filed on May 5, 2006, now Pat. No. 7,299,979, which is a continuation of application No. 10/695,401, filed on Oct. 27, 2003, now Pat. No. 7,118,030.

(51) Int. Cl.
   *G06F 17/60* (2006.01)
(52) U.S. Cl. .............................. 235/379; 705/39; 705/45
(58) Field of Classification Search .................. 235/379, 235/375; 705/38–39, 42, 45
   See application file for complete search history.

(56) References Cited

U.S. PATENT DOCUMENTS

| 5,175,682 | A | 12/1992 | Higashiyama et al. |
| 5,237,159 | A | 8/1993 | Stephens et al. |
| 5,444,616 | A | 8/1995 | Nair et al. |
| 5,544,043 | A | 8/1996 | Miki et al. |
| 5,679,938 | A | 10/1997 | Templeton et al. |
| 5,679,940 | A | 10/1997 | Templeton et al. |
| 5,691,524 | A | 11/1997 | Josephson |
| 5,703,344 | A | 12/1997 | Bezy et al. |
| 5,757,571 | A | 5/1998 | Basham et al. |
| 5,801,366 | A | 9/1998 | Funk et al. |
| 5,832,463 | A | 11/1998 | Funk |

(Continued)

FOREIGN PATENT DOCUMENTS

WO    WO 01/97134 A1    12/2001

(Continued)

OTHER PUBLICATIONS

Disclosure Under 37 CFR § 1.56 dated Dec. 1, 2008, filed for U.S. Appl. No. 11/936,376.

(Continued)

*Primary Examiner* — Edwyn Labaze
(74) *Attorney, Agent, or Firm* — Sutherland Asbill & Brennan LLP

(57) ABSTRACT

Systems and methods for electronically processing accounts receivable (AR) check transactions via a location-base device associated with a merchant. The location-base device, such as a point-of-sale (POS) device, can be configured to perform various functions that facilitate processing of AR checks. Such functions may include improved user interface, an ability to handle a repetitive input parameter, an ability to handle multiple merchant identifiers, an ability to generate multiple receipt types, an ability to edit check transactions, an ability to manage throughput of the device, and an ability to allow scanning of different types of checks so as to allow subsequent processing of the scanned checks to be different based on the type of the check. The location-base device configured in one or more of the foregoing manner facilitates a check authorization process performed by a check processing service.

23 Claims, 44 Drawing Sheets

U.S. PATENT DOCUMENTS

| | | | |
|---|---|---|---|
| 5,832,464 A | 11/1998 | Houvener et al. |
| 5,848,400 A | 12/1998 | Chang |
| 5,848,412 A | 12/1998 | Rowland et al. |
| 5,930,777 A | 7/1999 | Barber |
| 5,991,758 A | 11/1999 | Ellard |
| 6,059,185 A | 5/2000 | Funk et al. |
| 6,085,977 A | 7/2000 | James et al. |
| 6,097,834 A | 8/2000 | Krouse et al. |
| 6,117,011 A | 9/2000 | Lvov |
| 6,129,273 A | 10/2000 | Shah |
| 6,164,528 A | 12/2000 | Hills et al. |
| 6,189,785 B1 | 2/2001 | Lowery |
| 6,282,523 B1 | 8/2001 | Tedesco et al. |
| 6,505,772 B1 | 1/2003 | Mollett et al. |
| 6,547,132 B1 | 4/2003 | Templeton et al. |
| 6,574,377 B1 | 6/2003 | Cahill et al. |
| 6,581,043 B1 | 6/2003 | Wallin et al. |
| 6,601,037 B1 | 7/2003 | Kolls |
| 6,644,546 B2 | 11/2003 | George et al. |
| 6,754,640 B2 | 6/2004 | Bozeman |
| 6,816,608 B2 | 11/2004 | Cato |
| 6,931,382 B2 | 8/2005 | Laage et al. |
| 7,004,382 B2 | 2/2006 | Sandra |
| 7,020,639 B1 | 3/2006 | Slater |
| 7,062,463 B2 | 6/2006 | Knapp |
| 7,070,092 B2 | 7/2006 | Phillips et al. |
| 7,103,579 B1 | 9/2006 | Phillips et al. |
| 7,118,030 B2 | 10/2006 | Phillips et al. |
| 7,124,936 B2 | 10/2006 | Templeton et al. |
| 7,181,430 B1 | 2/2007 | Buchanan et al. |
| RE39,736 E | 7/2007 | Morrill, Jr. |
| 7,257,246 B1 | 8/2007 | Brodie et al. |
| 7,299,979 B2 | 11/2007 | Phillips et al. |
| 7,324,960 B2 | 1/2008 | Enoki et al. |
| 2002/0032645 A1 | 3/2002 | Nozaki |
| 2002/0040344 A1 | 4/2002 | Preiser et al. |
| 2002/0065786 A1 | 5/2002 | Martens et al. |
| 2002/0095360 A1 | 7/2002 | Joao |
| 2002/0103756 A1 | 8/2002 | Andrews et al. |
| 2002/0145035 A1 | 10/2002 | Jones |
| 2002/0152169 A1 | 10/2002 | Dutta et al. |
| 2002/0178112 A1 | 11/2002 | Goeller et al. |
| 2003/0023557 A1 | 1/2003 | Moore |
| 2003/0033252 A1 | 2/2003 | Buttridge et al. |
| 2003/0093368 A1 | 5/2003 | Manfre et al. |
| 2003/0097332 A1 | 5/2003 | Golasinski et al. |
| 2003/0126082 A1 | 7/2003 | Omura et al. |
| 2003/0130919 A1 | 7/2003 | Templeton et al. |
| 2003/0158811 A1 | 8/2003 | Sanders et al. |
| 2003/0182227 A1 | 9/2003 | Guzman |
| 2003/0187796 A1 | 10/2003 | Swift et al. |
| 2003/0216987 A1 | 11/2003 | Mollett et al. |
| 2003/0216988 A1 | 11/2003 | Mollett et al. |
| 2003/0217003 A1 | 11/2003 | Weinflash et al. |
| 2003/0217014 A1 | 11/2003 | Mollett et al. |
| 2003/0222135 A1 | 12/2003 | Stoutenburg et al. |
| 2003/0225686 A1 | 12/2003 | Mollett et al. |
| 2004/0019553 A1 | 1/2004 | Setz et al. |
| 2004/0044606 A1 | 3/2004 | Buttridge et al. |
| 2004/0044739 A1 | 3/2004 | Ziegler |
| 2004/0111371 A1 | 6/2004 | Friedman |
| 2004/0133516 A1 | 7/2004 | Buchanan et al. |
| 2004/0155101 A1 | 8/2004 | Royer et al. |
| 2004/0181485 A1 | 9/2004 | Finch et al. |
| 2005/0071283 A1* | 3/2005 | Randle et al. .................. 705/75 |
| 2005/0080717 A1 | 4/2005 | Belyi et al. |
| 2005/0080729 A1 | 4/2005 | Shaper et al. |
| 2005/0087594 A1 | 4/2005 | Phillips et al. |
| 2005/0087595 A1 | 4/2005 | Phillips et al. |
| 2005/0091114 A1 | 4/2005 | Phillips et al. |
| 2005/0091117 A1 | 4/2005 | Phillips et al. |
| 2005/0091130 A1 | 4/2005 | Phillips et al. |
| 2005/0091132 A1 | 4/2005 | Phillips et al. |
| 2005/0091163 A1 | 4/2005 | Phillips et al. |
| 2005/0097050 A1 | 5/2005 | Orcutt |
| 2006/0074799 A1 | 4/2006 | Averyt et al. |
| 2006/0202024 A1 | 9/2006 | Phillips et al. |

FOREIGN PATENT DOCUMENTS

| | | |
|---|---|---|
| WO | WO 03/042790 A2 | 5/2003 |
| WO | WO 03/083751 A1 | 10/2003 |

OTHER PUBLICATIONS

Nacha-Arc, Vose, Mark, 3 pages, 2002. Downloaded on Aug. 30, 2008 from http://www.digitalcheck.com/pdf/NACHA_ARC_Check_Truncation_Rules.pdf.

Supplemental disclosure under 37 CFR 1.56 dated Apr. 3, 2009, filed for U.S. Appl. No. 11/936,376.

Federal Reserve System, 12 CFR 205, Regulation E; 22 pages, Jan. 1, 2002. Downloaded on Feb. 18, 2009 from http://www.federalreserve.gov/boarddocs/press/boardacts/2001/20010313/attachment.pdf.

Herd, Michael, and Shaw, Deborah: Nacha E-check rules:-News, New Release on Mar. 13, 2002 by Michael Herd and Deborah Shaw of NACHA.org, 2 pages, Mar. 13, 2002. Downloaded on Feb. 18, 2009 from http://www.nacha.org/news/news/pressreleases/2002/PRO3I302.htm.

Supplemental Disclosure Statement Under 37 C.F.R. § 1.56 for U.S. Appl. No. 11/936,376, filed Nov. 7, 2007.

* cited by examiner

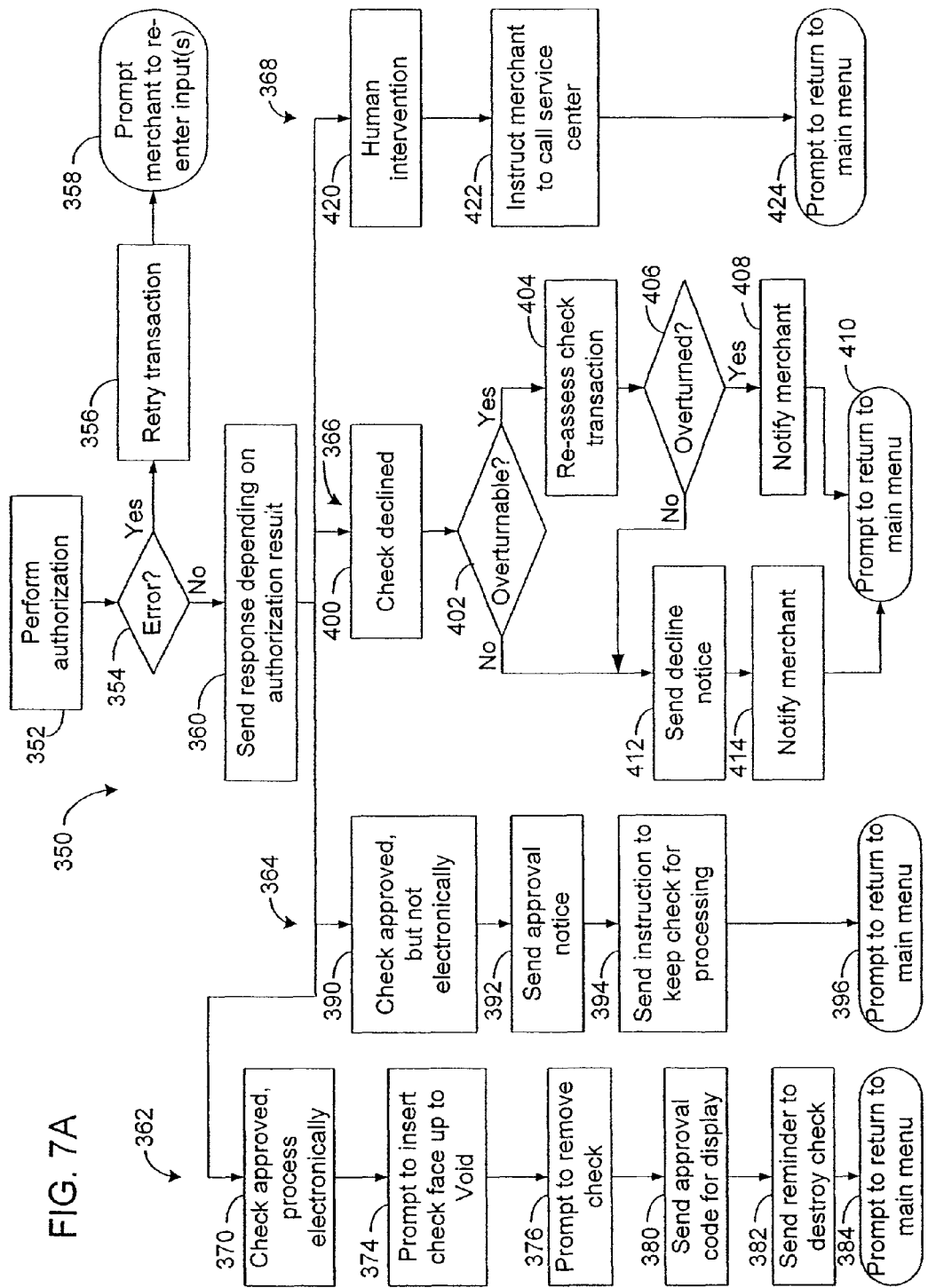

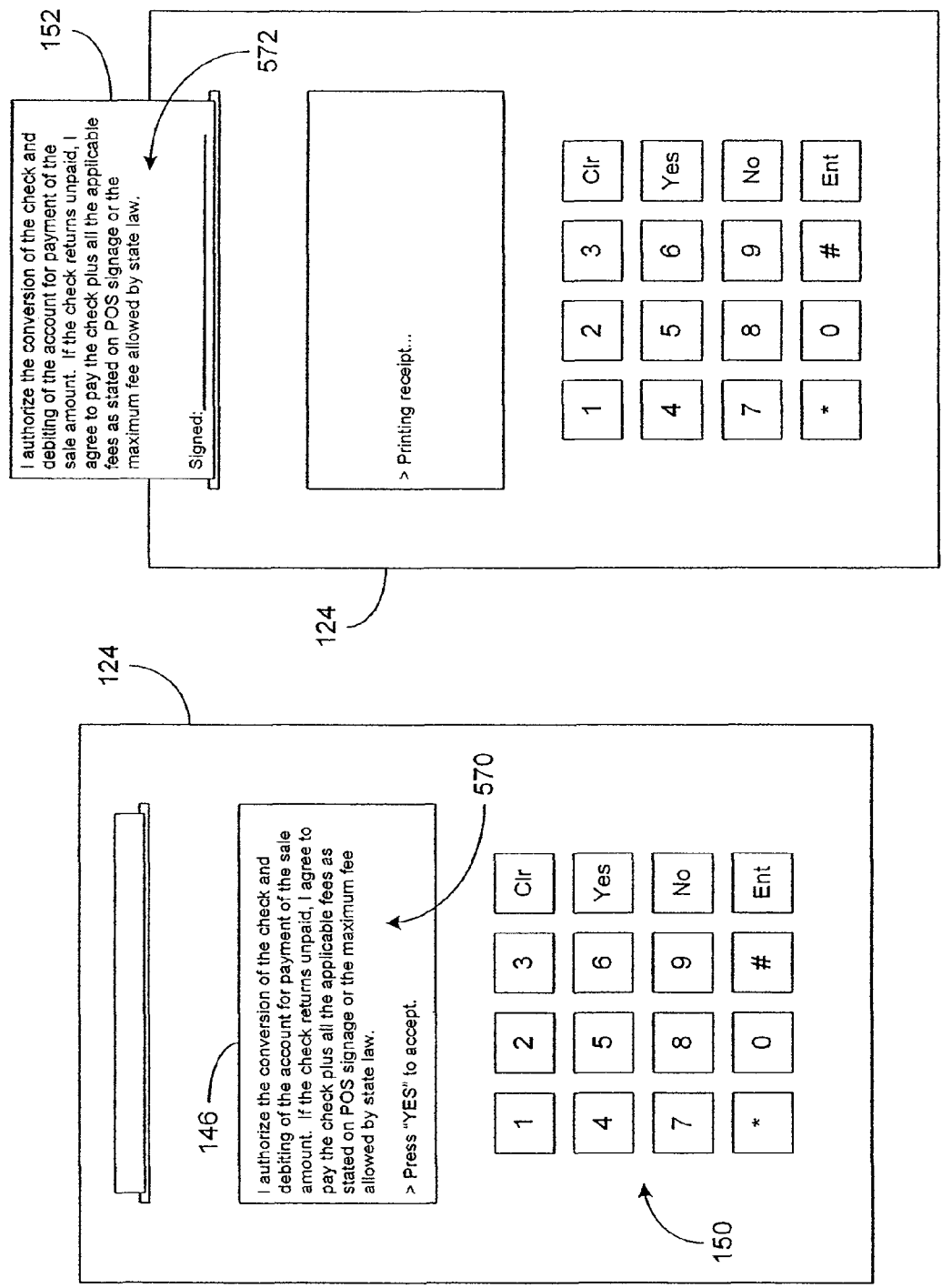

SYSTEMS AND METHODS FOR INTERFACING LOCATION-BASE DEVICES

This application is a continuation of U.S. application Ser. No. 11/418,780, filed May 5, 2006, now issued as U.S. Pat. No. 7,299,979, which is a continuation of U.S. application Ser. No. 10/695,401, filed Oct. 27, 2003, now issued as U.S. Pat. No. 7,118,030, the entirety of both of which are hereby incorporated herein by reference.

BACKGROUND

1. Field

The present teachings generally relate to processing of financial transactions and in particular, relates to processing of accounts receivable checks via location-base devices.

2. Description of the Related Art

Check transactions between customers and merchants can be categorized as a face-to-face transaction or a non-face-to-face transaction. A customer paying for a purchase with a check at a store is one example of the face-to-face transaction. In a non-face-to-face transaction, as the term implies, the customer does not hand the check to the merchant in person. Instead, the customer may mail the check or deposit the check in some form of a "dropbox" associated with the merchant, thereby allowing the merchant to receive the check without meeting the customer. Check payments received in such a manner is typically referred to as accounts receivable (AR) payments.

Frequently, a merchant that receive AR checks also has a location-base device such as a point-of-sale (POS) device, and consequently utilize the POS device to electronically process the AR checks. Because the AR checks are non-face-to-face transactions in nature, they are subject to different processing criteria than the face-to-face check transactions. Thus, if the AR checks are processed via conventional POS devices, the merchant needs to perform additional tasks to facilitate electronic processing of the AR checks through devices that are configured for face-to-face check transactions. Such tasks can be tedious and time consuming to the merchant. Thus, there is an ongoing need for an improved approach to the manner in which AR checks are processed via the location-base device associated with the merchant.

SUMMARY

Various aspects of the present teachings relate to systems and methods for electronically processing accounts receivable (AR) check transactions via a location-base device associated with a merchant. The location-base device, such as a point-of-sale (POS) device, can be configured to perform various functions that facilitate processing of AR checks. Such functions may include improved user interface, an ability to handle a repetitive input parameter, an ability to handle multiple merchant identifiers, an ability to generate multiple receipt types, an ability to edit check transactions, an ability to manage throughput of the device, and an ability to allow scanning of different types of checks so as to allow subsequent processing of the scanned checks to be different based on the type of the check. The location-base device configured in one or more of the foregoing manner facilitates a check authorization process performed by a check processing service.

One aspect of the present teachings relates to an apparatus for electronically processing an accounts receivable check received by a merchant. The apparatus comprises a scanning component that scans at least a portion of the check to facilitate the electronic processing of the check. The apparatus further comprises a display component that displays a message to the merchant to facilitate the electronic processing of the check. The apparatus further comprises an input component that allows the merchant to provide an input to the apparatus. The apparatus further comprises a processor, which implements at least one user interface function via the display component so as to allow the merchant to convert the accounts receivable check to an electronic transaction file that is transmitted to a check processing service for an authorization process.

In one embodiment, the apparatus comprises a location-base device associated with a merchant. In one embodiment, the location-base device comprises a point-of-sale device. In one embodiment, the at least one user interface function comprises providing the merchant with an option to select an operating mode associated with processing of the accounts receivable check. In one embodiment, the at least one user interface function further comprises prompting for and obtaining from the merchant the amount of the accounts receivable check. In one embodiment, the at least one user interface function further comprises informing the merchant that a receipt will not be issued for the accounts receivable check transaction. In one embodiment, the at least one user interface function comprises providing the merchant with an option to batch upload to the check processing service a plurality of image files corresponding to a plurality of converted and authorized check transactions.

In one embodiment, the apparatus further comprises a communication component configured to allow communication with the check processing service. In one embodiment, the check processing service authorizes or declines the check transaction by performing a risk assessment of the check transaction. In one embodiment, the communication component communicates with the check processing service in a manner that depends at least on a level of service subscribed by the merchant. The level of service includes the check processing service guaranteeing or purchasing check transactions it authorizes thereby assuming at least some of the risk associated with the check transaction.

Another aspect of the present teachings relates to an apparatus for processing a financial transaction. The apparatus comprises a user interface component that interfaces with a user performing the financial transaction to determine at least one property of a payment received in a non-face-to-face manner so as to allow the user to further perform the financial transaction electronically. The apparatus further comprises a conversion component that converts the payment into an electronic format so as to allow at least a portion of subsequent portion of the financial transaction processing to be performed electronically.

In one embodiment, the financial transaction comprises a check transaction involving a merchant. In one embodiment, the non-face-to-face payment comprises an accounts receivable check received by the merchant. In one embodiment, the conversion component includes a scanning component adapted to scan at least a portion of the accounts receivable check to facilitate the electronic processing of the accounts receivable check.

In one embodiment, the at least one property of the accounts receivable check comprises the merchant selecting an operating mode associated with processing of the accounts receivable check. In one embodiment, the at least one property of the accounts receivable check comprises the amount of the check. In one embodiment, the at least one property of the accounts receivable check comprises a determination that a receipt will not be issued for the accounts receivable check transaction.

In one embodiment, the user interface component further comprises a communication component configured to communicate with a check processing service. In one embodiment, the check processing service determines whether to authorize or decline the check transaction. In one embodiment, determining whether to authorize or decline the check transaction includes performing a risk assessment of the check transaction. In one embodiment, determining whether to authorize or decline the check transaction depends at least to some degree on a level of service subscribed by the merchant. The level of service includes the check processing service guaranteeing or purchasing check transactions it authorizes thereby assuming at least some of the risk associated with the check transaction.

Yet another aspect of the present teachings relates to a method of processing a financial transaction. The method comprises interfacing with a user performing the financial transaction to determine at least one property of a payment received in a non-face-to-face manner so as to allow the user to further perform the financial transaction electronically. The method further comprises converting the payment into an electronic format so as to allow at least a portion of subsequent financial transaction processing to be performed electronically.

In one implementation, the financial transaction comprises a check transaction involving a merchant. In one implementation, the non-face-to-face payment comprises an accounts receivable check received by the merchant. In one implementation, interfacing comprises prompting the user for an input. In one implementation, converting comprises scanning at least a portion of the accounts receivable check to facilitate the electronic processing of the accounts receivable check.

In one implementation, the at least one property of the accounts receivable check comprises the merchant selecting an operating mode associated with processing of the accounts receivable check. In one implementation, the at least one property of the accounts receivable check comprises the amount of the check. In one implementation, the at least one property of the accounts receivable check comprises a determination that a receipt will not be issued for the accounts receivable check transaction.

In one implementation, the method further comprises communicating with a check processing service. In one implementation, the check processing service determines whether to authorize or decline the check transaction. In one implementation, determining whether to authorize or decline the check transaction includes performing a risk assessment of the check transaction. In one implementation, determining whether to authorize or decline the check transaction depends at least to some degree on a level of service subscribed by the merchant. The level of service includes the check processing service guaranteeing or purchasing check transactions it authorizes thereby assuming at least some of the risk associated with the check transaction.

Yet another aspect of the present teachings relates to an apparatus for performing a financial transaction. The apparatus comprises a first means for interfacing with a user performing the financial transaction to determine at least one property of a payment received in a non-face-to-face manner so as to allow the user to further perform the financial transaction electronically. The apparatus further comprises a second means for performing the financial transaction electronically.

In one embodiment, the financial transaction comprises a check transaction involving a merchant. In one embodiment, the non-face-to-face payment comprises an accounts receivable check received by the merchant.

In one embodiment, the second means includes a scanning component adapted to scan at least a portion of the accounts receivable check to facilitate the electronic processing of the accounts receivable check. In one embodiment, the second means further comprises a communication component configured to communicate with a check processing service. In one embodiment, the check processing service determines whether to authorize or decline the check transaction. In one embodiment, determining whether to authorize or decline the check transaction includes performing a risk assessment of the check transaction. In one embodiment, determining whether to authorize or decline the check transaction depends at least to some degree on a level of service subscribed by the merchant. The level of service includes the check processing service guaranteeing or purchasing check transactions it authorizes thereby assuming at least some of the risk associated with the check transaction.

BRIEF DESCRIPTION OF THE DRAWINGS

FIG. 7A illustrates a process that allows various user interfacing depending on the result of the check transaction authorization;

FIG. 13A illustrates one embodiment of the location-base device configured to display on a display panel a receipt for certain check transactions;

FIG. 13B illustrates one embodiment of the location-base device configured to print a receipt for certain check transactions;

DETAILED DESCRIPTION OF CERTAIN EMBODIMENTS

Figure 1:
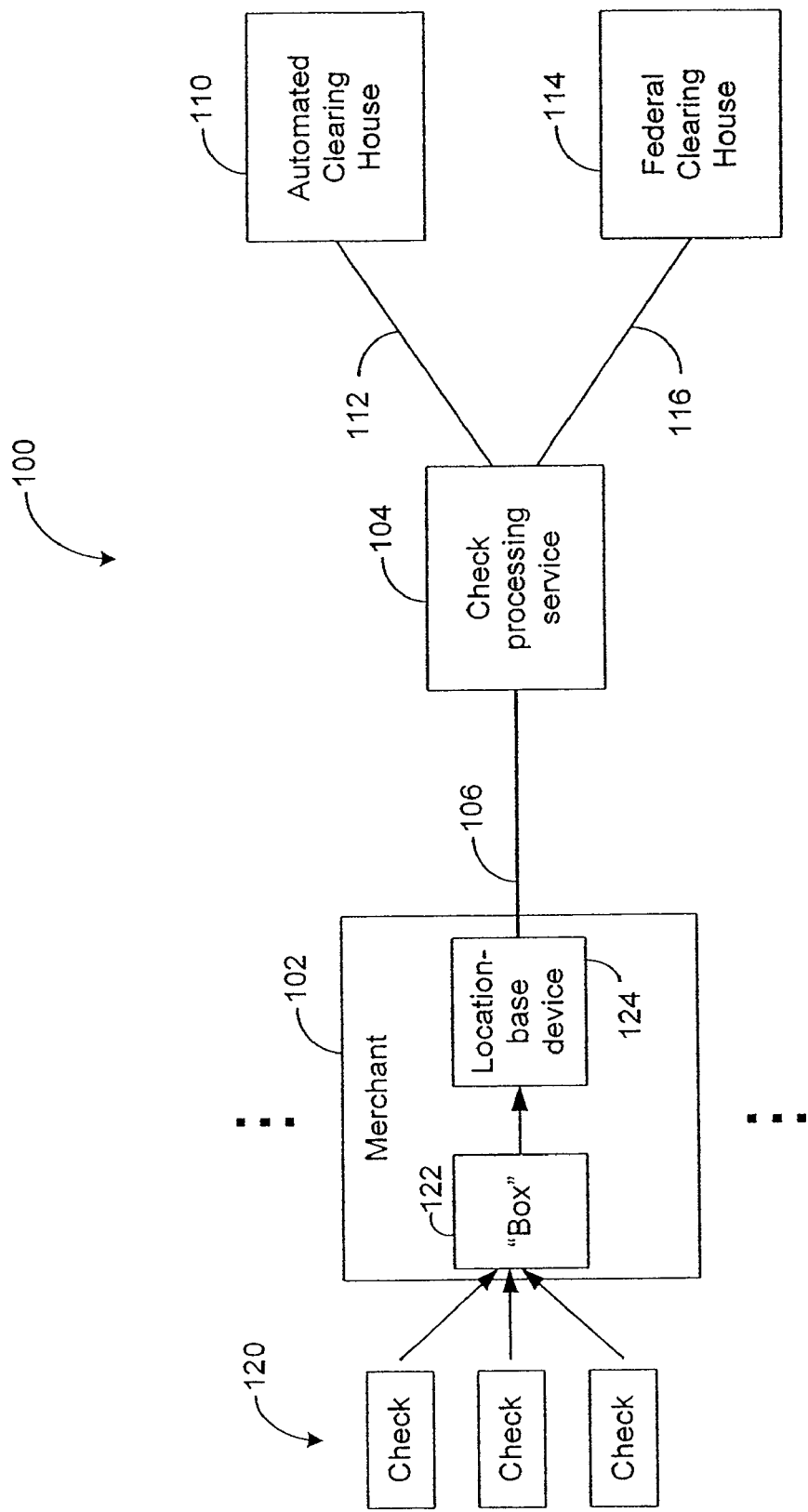
FIG. 1 illustrates a block diagram of a system configured to conduct accounts receivable (AR) check transactions.

These and other aspects, advantages, and novel features of the present teachings will become apparent upon reading the following detailed description and upon reference to the accompanying drawings. In the drawings, similar elements have similar reference numerals.

The present teachings generally relate to various aspects of systems and methods for conducting financial transactions where some form of a non-face-to-face payment is made by a customer to a merchant. It will be understood that for the purpose of description, the meaning of the customer may include, but is not limited to a person or some form of a business entity. Similarly, the merchant may mean a person or some form of a business entity.

Typically, the customer can pay the merchant on a face-to-face or a non-face-to-face transaction. One example of a face-to-face transaction occurs when a shopper pays for goods at a store by writing a check at a retail store. The shopper hands over the check to a store clerk. One example of a non-face-to-face transaction occurs when a landlord of an apartment complex receives a plurality of rent checks via some form of a "drop-off" box. The landlord may not actually see the renters depositing the checks in the box.

The "box" in the example above may comprise different embodiments that are adapted to allow a payment from the customer to be deposited. The payment can then be retrieved by the merchant for processing. Payments received in the foregoing manner is generally referred to as accounts receivable (AR). One way to process the AR payment is via electronic means in a manner similar to, for example, electronic processing of checks via a point-of-sale (POS) device. The electronic processing of the AR payments is often referred to as accounts receivable conversion (ARC).

Because the payment in the foregoing manner is received where the payer may not be present in a face-to-face transaction, the electronic processing of such payments may be subject to processing rules that may be different than that of the exemplary POS transaction. Various aspects of the present teachings described herein address various features in systems and methods that advantageously improve a manner in which the ARC process is performed.

FIG. 1 illustrates a block diagram of a system 100 configured to facilitate electronic processing of checks 120 received by a merchant 102 in a non-face-to-face manner—i.e., AR transactions. Although "checks" are used to represent the AR payments in the description herein, it will be appreciated that various features of the present teachings are not limited to checks. Rather, processing of other forms of paper-based payments, including but not limited to money orders, cashier's checks, and other forms of promissory payments, may benefit from at least some of the advantageous features of the present teachings. Moreover, processing of check-related transactions not based on paper checks may also benefit from at least some of the advantageous features of the present teachings.

FIG. 1 further illustrates that associated with the merchant 102 is a "box" 122 adapted to receive the checks 122, and a location-base device 124 adapted to process the checks retrieved from the box 124. Some exemplary embodiments of the box 122 and the location-base device 124 are described below in greater detail.

FIG. 1 further illustrates that the location-base device 124 is linked to a check processing service 104 via a communication link 106. The link 106 may be wire-based, wireless, or any combination thereof. Some examples of the link 106 include, but not limited to, a telephone based link, an internet based link, and other telecommunication links.

FIG. 1 further illustrates that the check processing service 104 can be linked to an automated clearing house (ACH) 110 via a link 112 and/or a federal clearing house (FCH) 114 via a link 116. As is generally known, the ACH 110 typically processes electronic check transactions, and the FCH 114 typically processes paper check transactions.

Figure 2A:
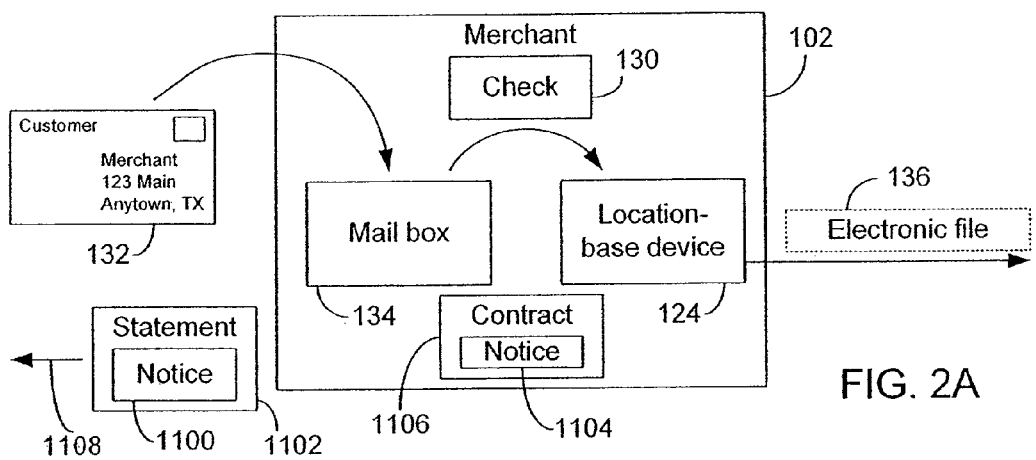
FIGS. 2A-C illustrate various embodiments of a "dropbox" that facilitates receiving of non-face-to-face AR check payments.
Figure 2B:
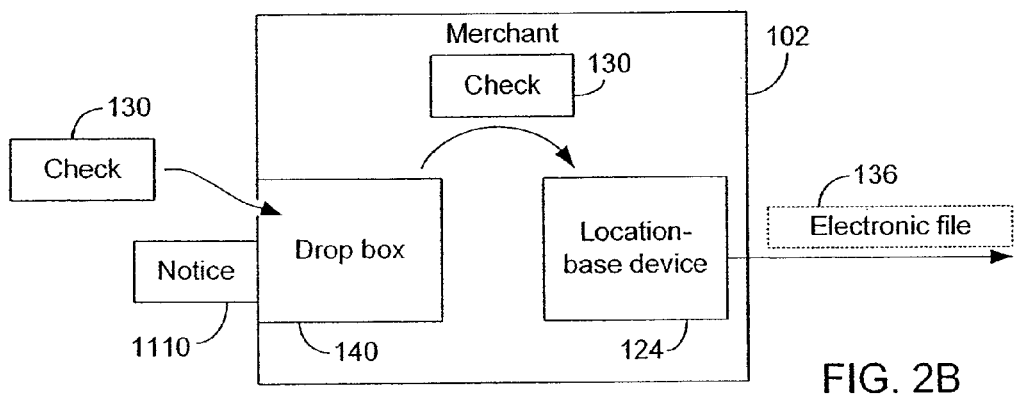
Figure 2C:
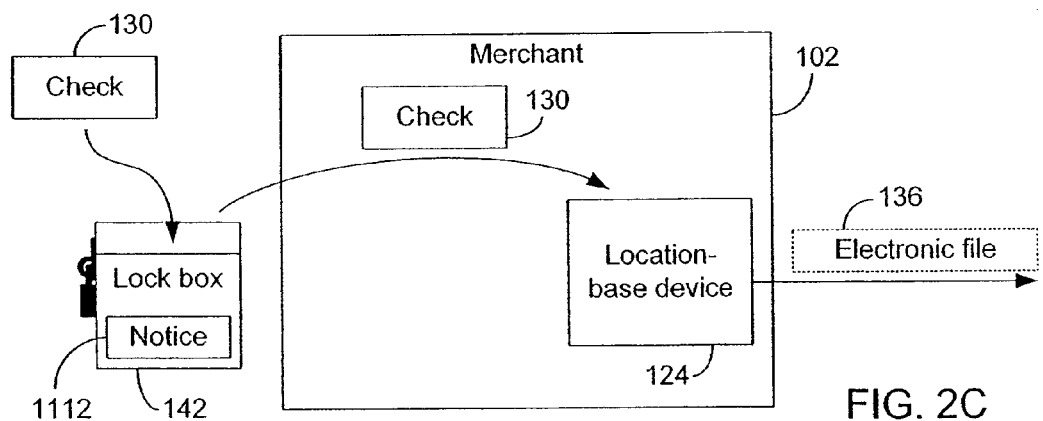

FIGS. 2A-C now illustrate block diagrams of some possible embodiments of the box 122 (FIG. 1) adapted to receive the checks. As shown in FIG. 2A, one embodiment of the box may comprise a mail box 134 associated with the merchant. It will be understood that the mail box 134 may be on or away from the merchant's premises. An example of a mail box located away from the merchant comprises a post office box. The mail box 134 receives a mail 132 that contains a check 130. The check 130 can then be retrieved from the mail box 134 and processed via the location-base device 124. The location-base device 124 then generates and sends an electronic file 136 associated with the check 130 to the check processing service (not shown).

It will be appreciated that the term "electronic file" may comprise any format of data that may be used in the art, or in the fields of computer technology, telecommunication, and the like. Furthermore, the electronic file may comprise one or more components that are logically linked for the purpose of providing the functionality intended for the electronic file.

FIG. 2B illustrates another embodiment of the box comprising a drop box 140 associated with the merchant 102. In one embodiment, the drop box 140 is located on the merchant's premises, and is adapted to receive the check 130. The drop box 140 may comprise an actual physical box, or may simply comprise a slot defined by an exterior portion of the merchant's premises such that the check 130 inserted through the slot enters the premises and be retrievable by the merchant. The check 130 retrieved from the drop box 140 can then be processed via the location-base device 124 in a manner similar to that described above in reference to FIG. 2A.

FIG. 2C illustrates another embodiment of the box comprising a lock box 142 associated with the merchant 102. In one embodiment, the lock box 142 is located on the merchant's premises and is adapted to receive the check 130. In another embodiment, the lock box 142 may be located outside of the merchant's premises. The lock box 142 may include a locking means to prevent unauthorized access to checks deposited therein. The check 130 retrieved from the lock box 142 by the merchant can then be processed via the location-base device 124 in a manner similar to that described above in reference to FIG. 2A.

As shown in FIGS. 2A-C, the various AR payments are made with the payer being notified that the check will be processed electronically. In non-AR transactions where the payer is present, the payer typically acknowledges and approves electronic processing of the check by a signature. In AR transactions, such a physical signature is not practical. Thus, submitting a check (AR) after the notice typically serves as the payer's authorization to convert and process the check electronically. The notice typically also includes an opt-out option for payers who do not want their checks to be processed electronically. A payer who opts not to have a check processed electronically typically needs to find an alternate means of providing the payment in a form other than the AR payment. Such foregoing rules on notice for AR check conversion are generally a result of government and/or industry regulations; and thus may change. Thus, it will be appreciated that different rules of notice may be applied to the manner in which AR checks are processed without departing from the spirit of the present teachings.

As shown in FIG. 2A, a notice 1100 may be sent to the customer (payer) with a statement 1102 as indicated by an arrow 1108. Such notification may be suitable for mail-in payment situations where payments are made in response to statements.

One exemplary statement-based notice may include the following language: "NOTICE TO CONSUMER: By (1) submitting your check for payment, and (2) choosing not to exercise your right to OPT-OUT, as specified below, you are authorizing the payee, or its agent, upon receipt of your check, to convert the check to an electronic payment item or draft and to submit it for payment as an ACH debit entry or draft to your account, in accordance with the same terms and conditions as your check. You may OPT-OUT of your choice, authorizing MERCHANT to convert your check for submission as an ACH debit entry or draft, followed by an alternate payment method(s) for opt-out as specified by the merchant.

As further shown in FIG. 2A, a notice 1104 may be also provided to the customer as part of an initial contract agreement 1106. Such notification may be suitable for mail-in payment situations where statements are not issued but payments are made according to the terms of the agreement 1106.

One exemplary agreement-based notice may include the following language: "NOTICE TO CONSUMER: By submitting checks for payment, I agree to and authorize MERCHANT, or its agent, upon receipt of my checks, to convert the checks to electronic payment items or drafts and to submit any one or all of them for payment as ACH debit entries to my account, in accordance with the same terms and conditions as the checks submitted. I understand that I am entitled to receive a copy of this NOTICE each time MERCHANT converts any one of my checks for ACH debit entry. Unless I have indicated my intent to opt-out, I expressly agree that my one-time receipt of this NOTICE shall fully satisfy this notice requirement and I expressly authorize MERCHANT to submit future checks for payment received from me as ACH debit entries to my account without reissuance of this notice to me.

This authorization does not apply if i have exercised my right to opt-out of the electronic conversion of my checks, pursuant to merchant's terms for opting-out. I do not waive my right to receive future notice(s) of my opt-out rights." Such language can be followed by an alternate payment method(s) for opt-out as specified by the merchant.

As shown in FIGS. 2B-C, notices 1110 and 1112 may be posted on or about the drop box 140 and the lock box 142, respectively. Such notification may comprise a decal with an appropriate language printed thereon.

One exemplary box-posted notice may include the following language: "NOTICE TO CONSUMER: By (1) submitting your check for payment, and (2) choosing not to exercise your right to OPT-OUT, as specified below, you are authorizing the payee, or its agent, upon receipt of your check, to convert the check to an electronic payment item or draft and to submit it for payment as an ACH debit entry or draft to your account, in accordance with the same terms and conditions as your check." Such language can be followed by an alternate payment method(s) for opt-out as specified by the merchant.

From the foregoing description in reference to FIGS. 2A-C, one can see that the "box" for receiving AR payments can have different configurations. Thus, it will be appreciated that the receiving box can comprise any configuration that facilitates a non-face-to-face transfer of checks between the customer and the merchant without departing from the spirit of the present teachings.

FIGS. 3-7 now illustrate one aspect of the present teachings relating to a manner in which the location-base device 124 can be configured to perform user interface functions that facilitate the ARC processing of received checks. The various user interface functions may be induced by the location-base device, the check processing service, or some combination thereof. In the description herein, the term "location-base device" may be used interchangeably with "point-of-sale device" (POS device). Although the POS device may be considered to be one embodiment of the location-base device, it will be understood that the usage of the term "POS device" is not intended to limit the scope of the present teachings in any manner.

It will also be understood that the term "user" and "merchant" may be used interchangeably in the description herein. As an example, it is generally more intuitive to refer to a user when describing a user-interface, where the user may be the merchant or anyone associated with the merchant. In another example, it is also generally more intuitive to refer to a merchant when describing a merchant identifier, profile, and the like described below. Thus, the use of either of these terms is in no way intended to limit the scope of the various aspects of the present teachings.

Figure 3B:
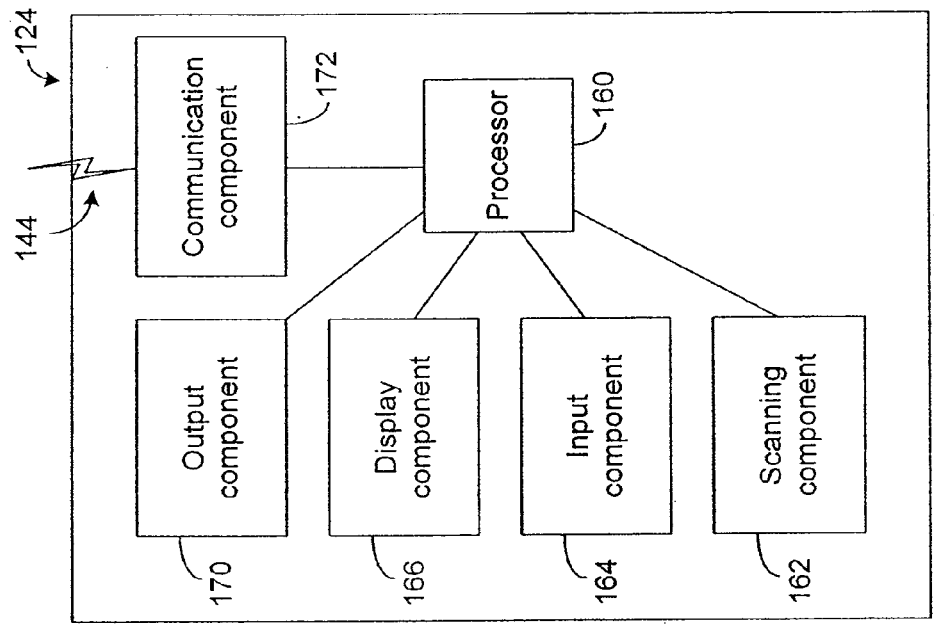
FIGS. 3A-B illustrate one embodiment of a location-base device adapted to scan the received AR checks.
Figure 3A:
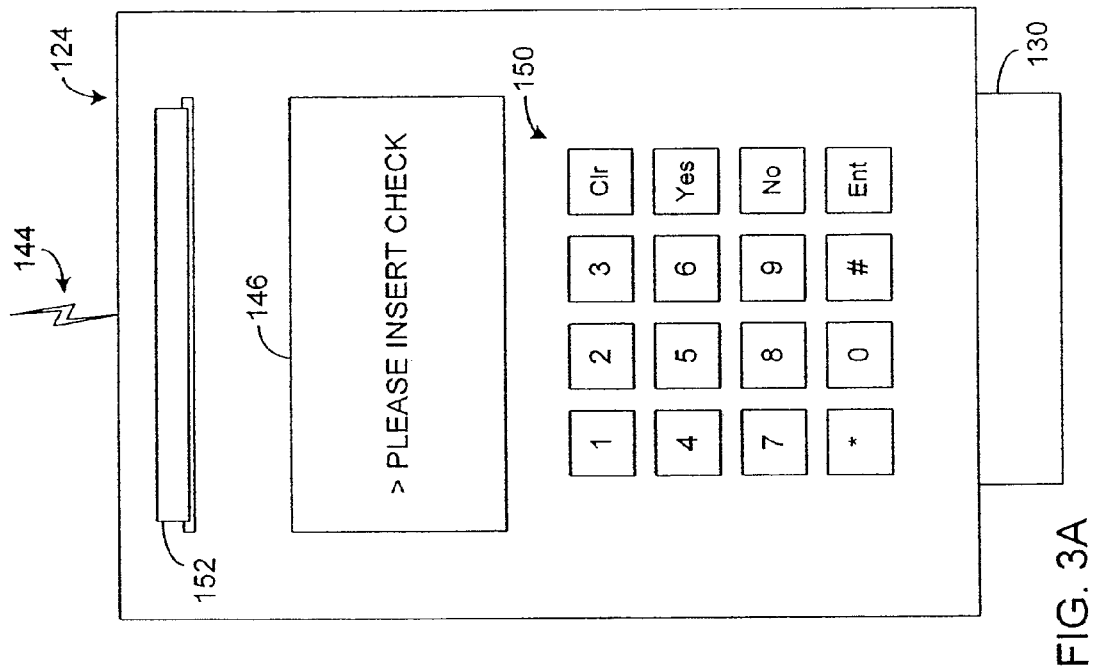

FIGS. 3A-B illustrate one embodiment of an exemplary POS device, exemplifying one possible embodiment of the location-base device 124. The exemplary POS device 124 comprises a display 146 that displays a message to the user. The POS device 124 further comprises a keypad 150 that facilitates an input from the user. The exemplary POS device 124 is adapted to allow scanning of the check 130 so as to facilitate conversion of the check 130 into the electronic file (136 in FIGS. 2A-C). The POS device 124 is further adapted to generate a receipt 152 in response to the processing of the check 130. Various manners in which the receipt 152 can be generated are described below in greater detail. The POS device 124 is also depicted to be linked to the check processing service (not shown) by a communication link 144. A typical POS device that can be incorporated into various systems and methods described herein is one of the one or more embodiments of the Eclipse® device available from TeleCheck Services, Inc. of Houston, Tex.

FIG. 3B now illustrates a functional block representation of the exemplary POS device 124 described above in reference to FIG. 3A. The POS device 124 comprises a scanning component 162 scans the check 130 so as to obtain information about the check. As is understood in the art, the scanning of the check may comprise obtaining a substantially full or partial "snippet" images of the check. The scanning process may also include reading of the check's magnetic ink character recognition (MICR) line imprinted thereon.

In the description herein, the term "scanning" is sometimes used to include the imaging (full or partial) operation as well as the MICR line reading. In certain embodiments, the such scanning of the check is initiated when the check is inserted into the POS device. The information from the MICR along with user input(s) (such as check amount) are transmitted to the check processing service for the authorization process. Since the operation process typically does not rely on the check image, and because the check may be declined, the check image is not transferred to the processing service for the authorization request. The check image not being transferred during the authorization process facilitates a speedy authorization response from the processing service. In one embodiment, the check image files are stored in the POS device and transferred subsequently in batch to the processing service.

The POS device 124 further comprises an input component 164 that receives inputs from the user. In the exemplary POS device depicted in FIG. 3A, the input component comprises the keypad 150. It will be understood, however, that the input component may comprise any other configuration that allows the user to input responses, information, and the like into the POS device 124. For example, the input component may comprise a touch sensitive screen adapted to respond to the user's touch by hand or some form of a wand. In another example, the input component may comprise a voice-based system configured to be responsive to the user's voice.

The POS device 124 further comprises a display component 166 that displays messages to the user. The message itself may comprise a prompting message requesting the user to do something. The message also may comprise an informational message informing the user about some aspect of the transaction being performed. In the exemplary POS device depicted in FIG. 3A, the display component comprises the visual display 146. It will be understood, however, that the display component may comprise any means that allows the POS device to convey a message to the user. For example, the "display" may not necessarily need to be visual in nature, and may comprise alternate means such as audio-based or touch-based (Braille, for example). It will also be understood that the display component 166 may also comprise touch-based components such as a touch screen that respond to touches by a finger, pointer, and the like.

The POS device 124 further comprises an output component 170 that generates an output in response to some transaction performed. In the exemplary POS device depicted in FIG. 3A, the display component comprises a printer that prints the receipt 152. Various manners in which the receipt can be generated are described below in greater detail.

Although FIG. 3B depicts the display and output components 166, 170 separately, it will be appreciated that some of the functionalities of one component may be implemented via the other component. For example, the printout from the output component may function as a display means. Conversely, a receipt message on the display may be viewed by the payer and confirmed via the input component (keypad, for example) when the POS device is being used to perform a face-to-face transaction. Thus, it will be appreciated that the display and output components 166, 170 being depicted and described as separate components is in no way intended to limit the scope of the present teachings.

As shown in FIG. 3B, the POS device 124 further comprises a communication component 172 configured to facilitate communication between the POS device 124 and the check processing service (not shown) via the communication link 144. As also shown in FIG. 3B, the POS device 124 further comprises a processor 160 that controls, at least to some degree, various functions of the various components described above. The processor 160 may also perform various processes that facilitate the user interface functions and other functions for conducting the ARC transactions described below.

In general, it will be appreciated that the processors comprise, by way of example, computers, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers, and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

Figure 4:
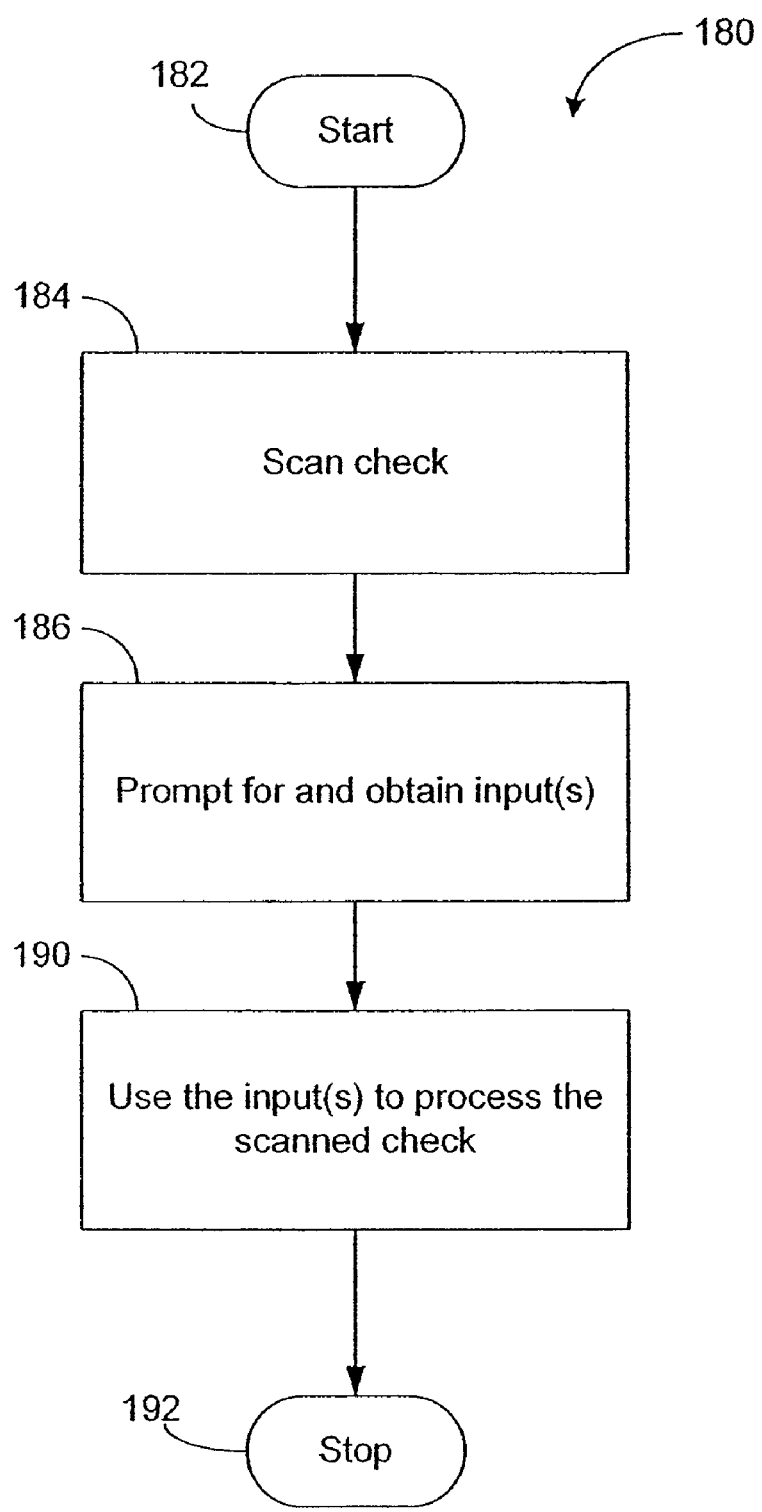
FIG. 4 illustrates a process that facilitates user interface of the location-base device.

FIG. 4 now illustrates one implementation of a process 180 that can be performed by the processor (160 in FIG. 3B) to perform user interface functions that facilitate the ARC processing of the received checks. The process 180 begins at a start state 182, and in step 184 that follows, the process 180 induces scanning of a check. In step 186 that follows, the process 180 prompts for and obtains one or more inputs from the user. In step 190 that follows, the process 180 uses the input(s) thus obtained to facilitate further electronic processing of the scanned check. The process 180 ends in a stop state 192.

FIGS. 5A-H now illustrate some of the possible user interface processes that may be performed in the generalized "prompt and obtain" interfacing step 186 of FIG. 4. It will be appreciated that the order of the description of the various exemplary user interface processes is in no way intended to limit the manner in which these processes are performed. Furthermore, the disclosure of these exemplary processes does not mean that all of the processes need to be performed. Some of the processes may not be needed, and thus not performed, in some embodiments of the location-base devices. Furthermore, some of the processes may not be needed, and thus not performed, in certain types of check transactions. It will be appreciated that some or all of these processes may be performed in any order and in any combination without departing from the spirit of the present teachings.

It will also be appreciated that the user interface processes can be tailored to obtain information from the user to satisfy at least some of the NACHA (National Automated Clearing House Association) regulations on electronic processing of AR checks. In one aspect, the various user interface processes disclosed herein improve the manner in which the user handles various information about the AR check transaction. By having the location-base device prompt and obtain selected information from the user, the user's job is simplified and the likelihood of mistake may be reduced. Furthermore, because the device prompts for information, processing of checks may be performed by a novice user that does not have extensive experience.

Figure 5A:
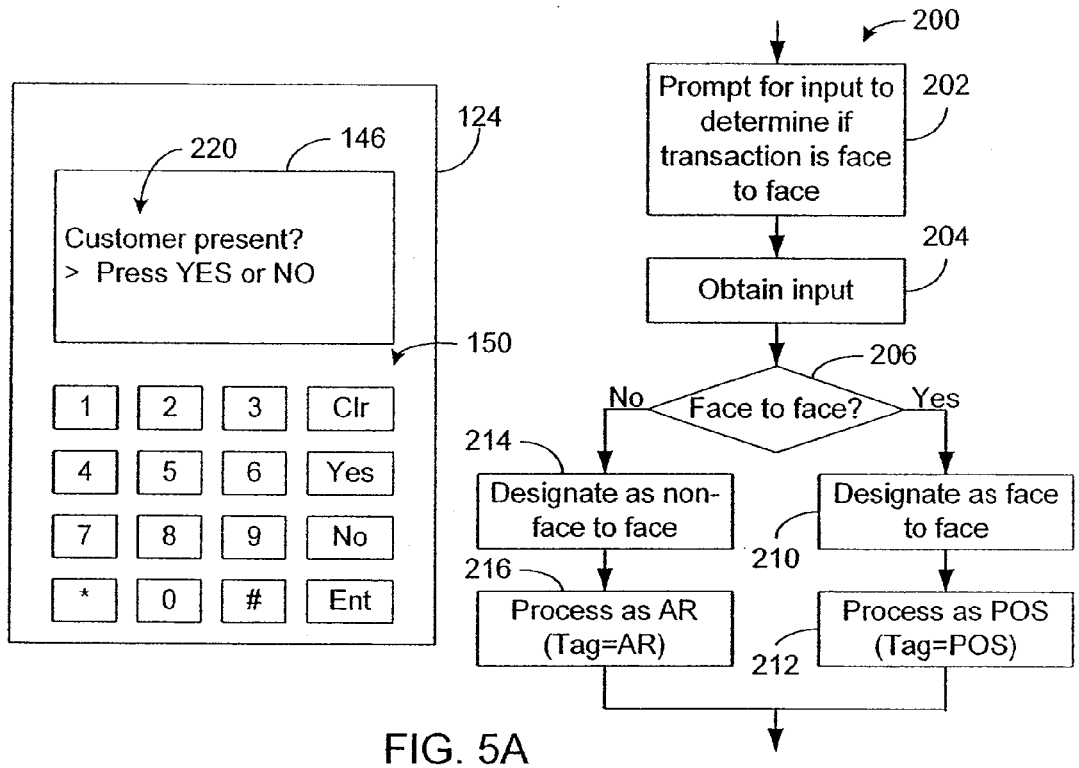
FIGS. 5A-J illustrate processes of various user interface functions that may be implemented on the location-base device.

FIG. 5A illustrates one implementation of a user interface process 200 that determines if the transaction is a face-to-face transaction. FIG. 5A also illustrates how such a process can interface with the user. In one embodiment, the POS device 124 having the display panel 146 and the keypad 150 allows the process 200 to display a message 220 on the display panel 146 and receive a user input through the keypad 150.

As shown in FIG. 5A, the process 200 in step 202 prompts for an input from the user to determine if the check transaction is a face-to-face transaction. Such a prompt may be presented to the user by the exemplary message 220 requesting a yes/no response. In step 204 that follows, the process 200 obtains the user's input. In one embodiment, the yes/no input is facilitated by yes/no keys on the keypad 150. The process 200 then determines in a decision step 206 whether the transaction is a face-to-face transaction. If the answer is yes, the process 200 in step 210 designates the transaction as a face-to-face transaction. The process 200 then subsequently processes the check as a POS transaction. In one implementation of such subsequent processing, the information associated with the transaction is tagged as a POS transaction in step 212.

If the answer in the decision step 206 is no, the process 200 in step 214 designates the transaction as a non-face-to-face transaction. The process 200 then subsequently processes the check as an AR transaction. In one implementation of such subsequent processing, the information associated with the transaction is tagged as an AR transaction in step 216.

Figure 5B:
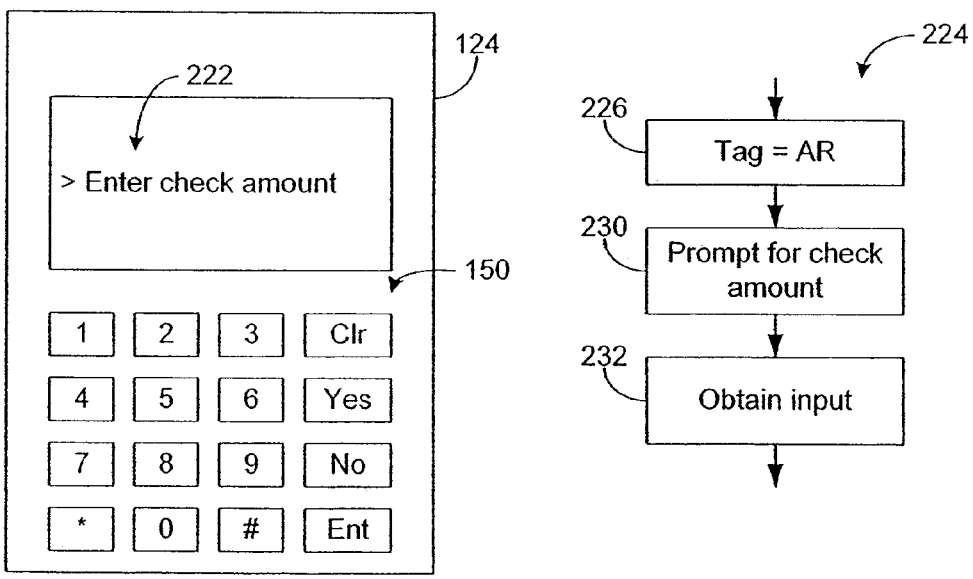

FIG. 5B illustrates another implementation of a user interface process 224 that determines the amount of the check scanned. The process 224 in step 226 tags the scanned check as an AR transaction. In step 230 that follows, the process 224 prompts the user for the amount indicated on the check. In one embodiment, such a prompt may comprise a message 222 displayed to the user. In step 232 that follows, the process 224 obtains the check amount as an input. In one embodiment, such an input may be made via the keypad 150.

Figure 5C:
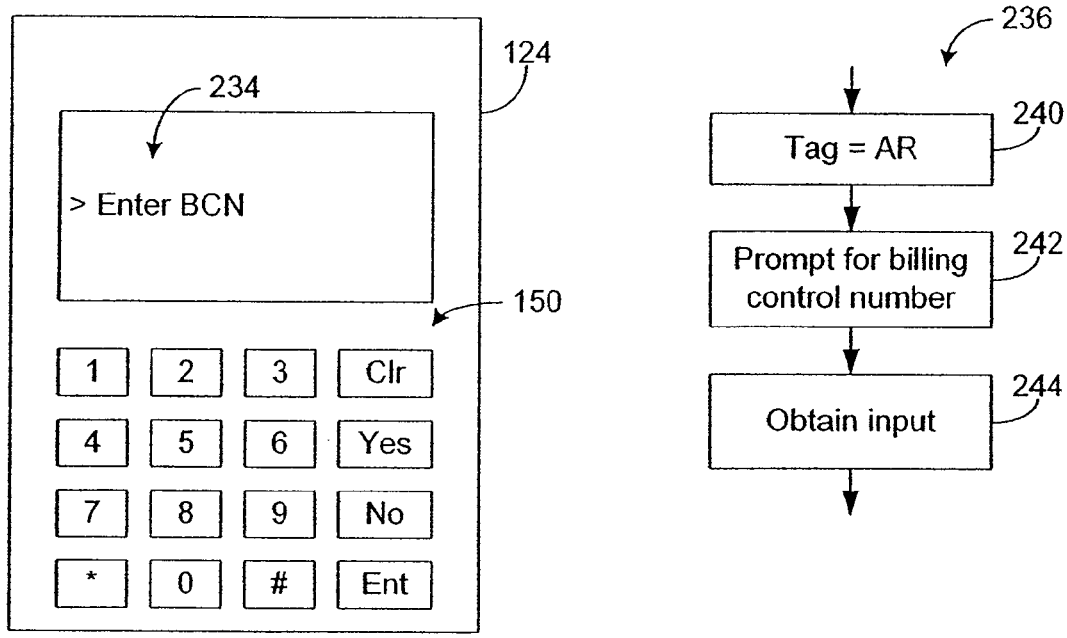

FIG. 5C illustrates another implementation of a user interface process 236 that determines the merchant's billing control number (BCN). In addition to billing purpose, the BCN may be used to configure the manner in which the checks are processed at the POS device and/or the check processing service. Such usage of the BCN is described below in greater detail.

As shown in FIG. 5C, the process 236 in step 240 tags the scanned check as an AR transaction. In step 242 that follows, the process 236 prompts the user for the billing control number. In one embodiment, such a prompt may comprise a message 234 displayed to the user. In step 244 that follows, the process 236 obtains the billing control number as an input. In one embodiment, such an input may be made via the keypad 150.

Figure 5D:
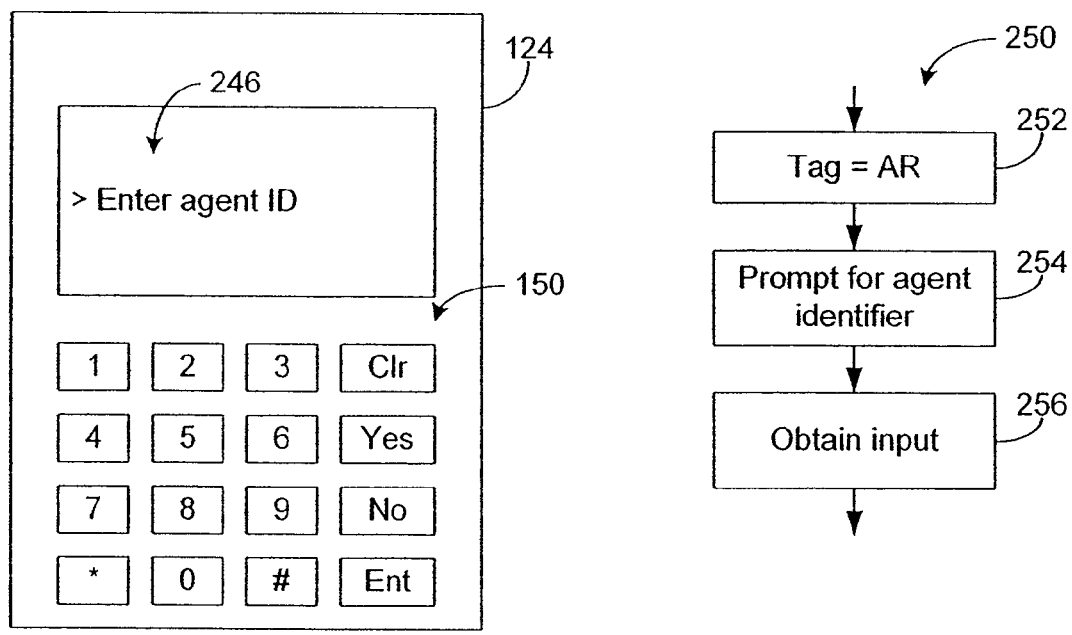

FIG. 5D illustrates another implementation of a user interface process 250 that determines the user's agent identifier. The identifier may be used to configure the manner in which the checks are processed at the POS device and/or the check processing service. Such usage of the agent identifier is described below in greater detail.

As shown in FIG. 5D, the process 250 in step 252 tags the scanned check as an AR transaction. In step 254 that follows, the process 250 prompts the user for the agent identifier. In one embodiment, such a prompt may comprise a message 246 displayed to the user. In step 256 that follows, the process 250 obtains the identifier information as an input. In one embodiment, such an input may be made via the keypad 150.

Figure 5E:
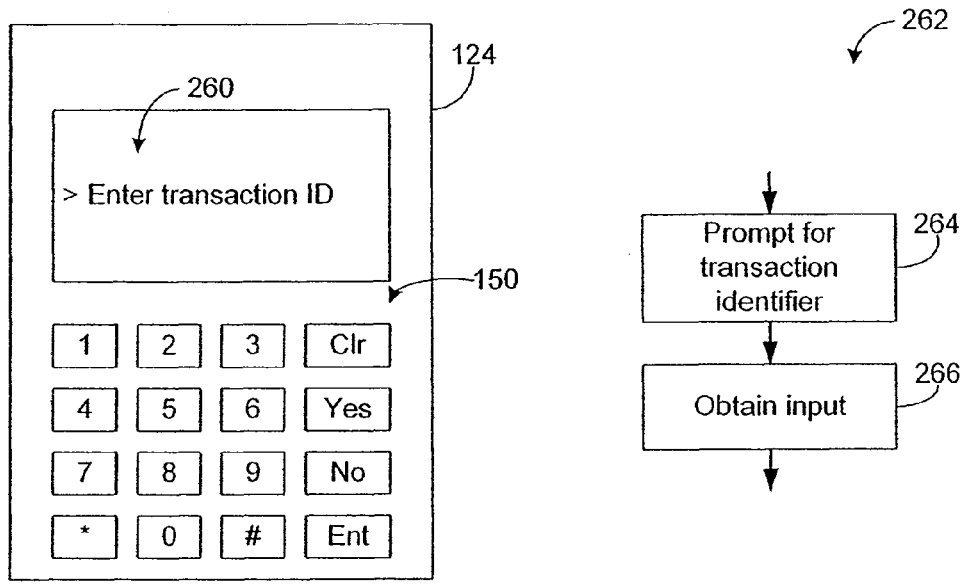

FIG. 5E illustrates another implementation of a user interface process 262 that determines the check transaction identifier. The identifier may be used to identify and access a previously performed check transaction to perform functions such as editing. Such usage of the transaction identifier for transaction editing is described below in greater detail.

As shown in FIG. 5E, the process 262 in step 264 prompts the user for the transaction identifier. In one embodiment, such a prompt may comprise a message 260 displayed to the user. In step 266 that follows, the process 262 obtains the identifier information as an input. In one embodiment, such an input may be made via the keypad 150.

Figure 5F:
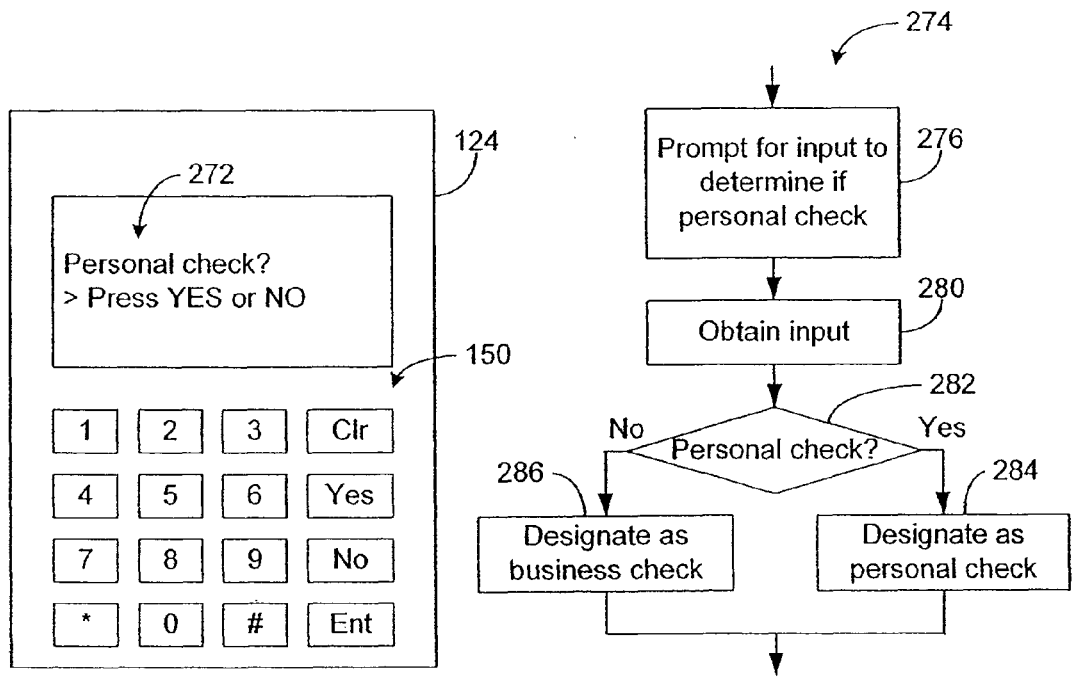

FIG. 5F illustrates another implementation of a user interface process 274 that determines whether the check is a personal check or a non-personal check. In certain embodiments of the POS device, the personal/non-personal nature of the check may be made by the device by reading the check's magnetic ink character recognition (MICR) line. In such embodiments, the manner in which various symbols and fields are arranged in the MICR line allows determination of the personal/non-personal nature of the check. Thus, the exemplary user interface process 274 may be implemented in POS devices that do not have the personal/non-personal nature determination (via MICR) capability. The personal/non-personal check information, obtained in either manner, may be used to determine how the check is processed at the location-base device and/or the check processing service. Such usage of the check-type information is described below in greater detail.

As shown in FIG. 5F, the process 274 in step 276 prompts the user to determine if the check is a personal check. In one embodiment, such a prompt may comprise a message 272 displayed to the user. In step 280 that follows, the process 274 obtains the input from the user. In one embodiment, the input may be made via the yes/no keys on the exemplary keypad 150. The process 274 then determines in a decision step 282 whether the check is a personal check based at least partly on the user input of step 280. If the answer is yes, the process 274 in step 284 designates the check as a personal check. If the answer is no, the process 274 in step 286 designates the check as a non-personal check. For the purpose of description herein, non-personal checks may be referred to as business checks.

Figure 5G:
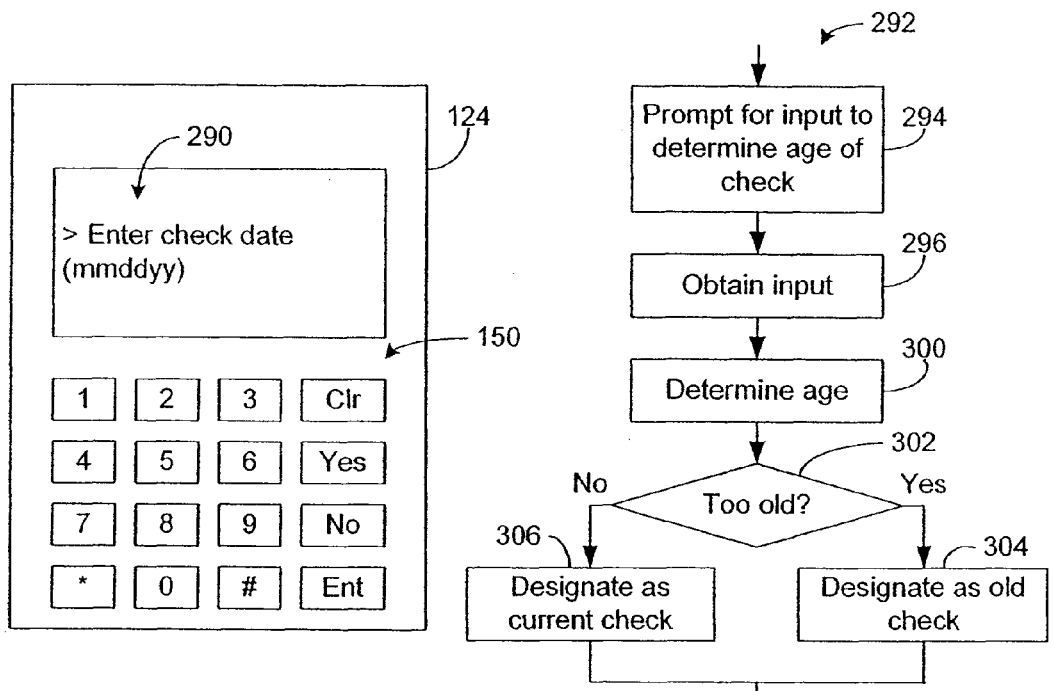

FIG. 5G illustrates another implementation of a user interface process 292 that determines how old the check is. Such information may be used to determine how the check transaction is authorized.

As shown in FIG. 5G, the process 292 in step 294 prompts the user to input the date indicated on the check. In one embodiment, such a prompt may comprise a message 290 displayed to the user. In step 296 that follows, the process 292 obtains the input from the user. In one embodiment, the input may be made via the exemplary keypad 150. The process 292 in step 300 determines the age of the check relative to the date when the check is being processed. The process 292 then determines in a decision step 302 whether the check is too old when compared to a predetermined value. If the answer is yes, the process 292 in step 304 designates the check as an old check. If the answer is no, the process 292 in step 306 designates the check as a current check. It will be appreciated that the age of the check may be classified into more categories than the two exemplary (old or current) categories without departing from the spirit of the present teachings. For example, the check age category can be graded from "current" (say, 0-60 days old), "old" (61-120 days old), and "very old" (more than 120 days old).

Figure 5H:
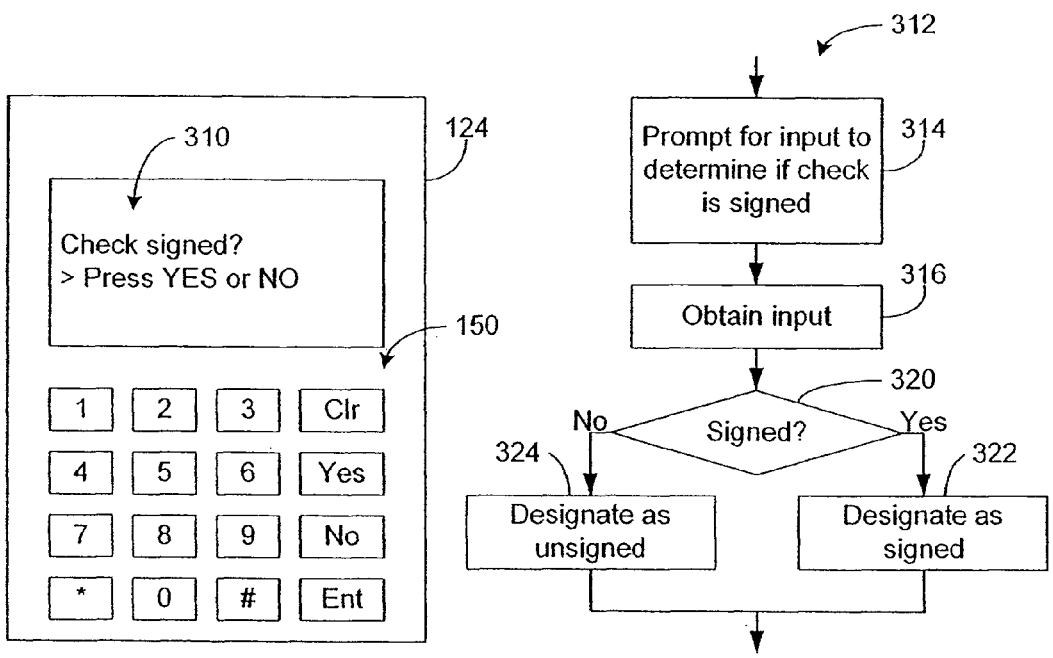

FIG. 5H illustrates another implementation of a user interface process 312 that determines whether the check is signed. Such information may be used to determine whether the check should be accepted and processed by the merchant.

As shown in FIG. 5H, the process 312 in step 314 prompts the user to determine if the check is signed. In one embodiment, such a prompt may comprise a message 310 displayed to the user. In step 316 that follows, the process 312 obtains the input from the user. In one embodiment, the input may be made via the yes/no keys on the exemplary keypad 150. The process 312 then determines in a decision step 320 whether the check is signed based at least partly on the user input of step 316. If the answer is yes, the process 312 in step 322 designates the check as signed. If the answer is no, the process 312 in step 324 designates the check as unsigned.

Figure 5I:
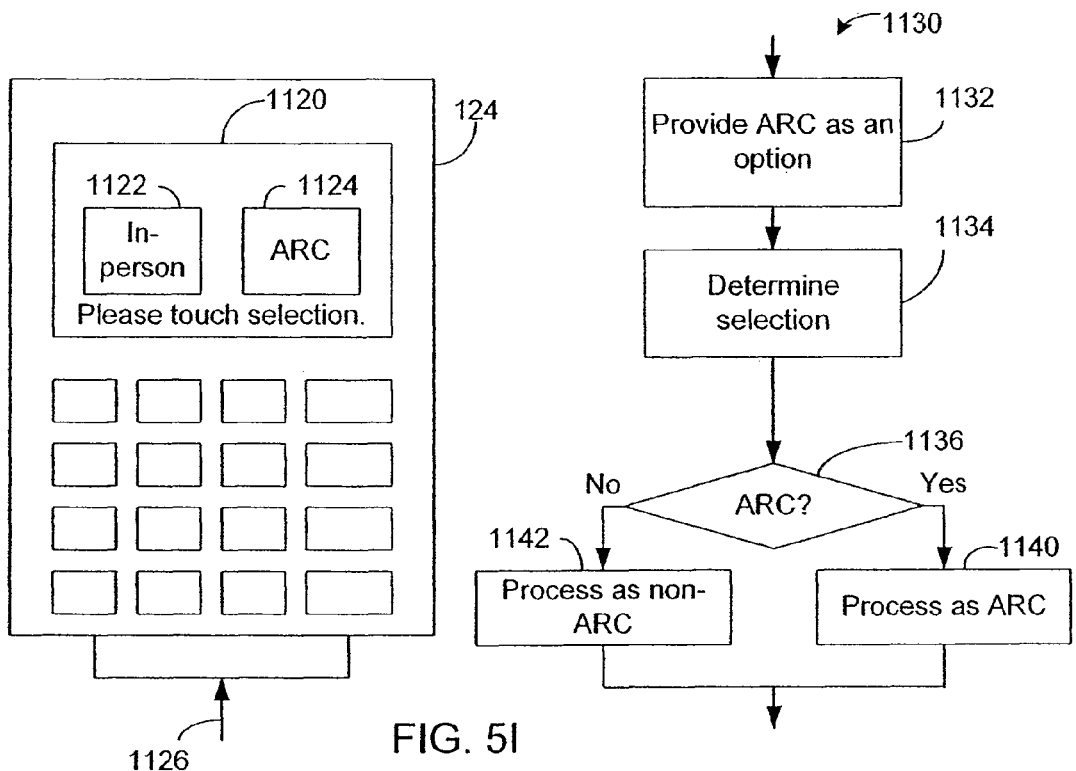
Figure 5J:
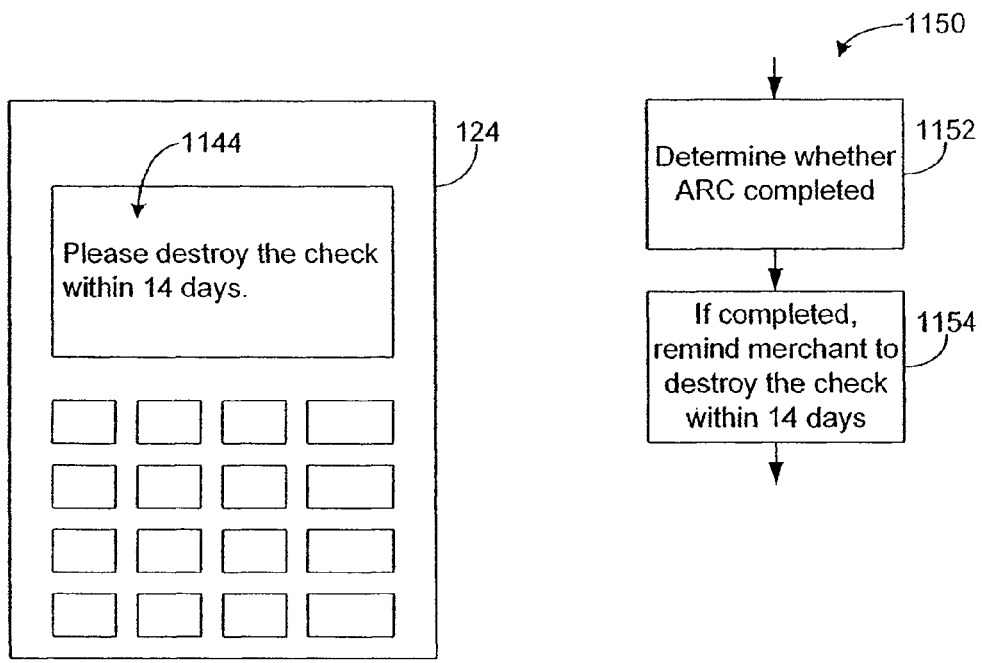

In certain embodiments, the POS device may be configured to allow conversion of both AR checks submitted in a non-face-to-face manner and checks presented in person in a face-to-face manner. FIGS. 5I-J illustrate two exemplary user interface functions that facilitate processing of checks in such a POS device.

As shown in FIG. 5I, one embodiment of the POS device 124 may be configured to display a processing option on a touch-screen 1120. The option may comprise an in-person check conversion option 1122 and an ARC option 1124. The user may select the option by touching the portion of the touch-screen 1120 corresponding to the choice. In one embodiment, the displaying of the in-person/ARC options is triggered when a check is inserted (as depicted by an arrow 1126) into the POS device 124.

FIG. 5I also illustrates an exemplary user interface process 1130 that allows the user to facilitate processing of AR checks via the POS device. The process 1130 in step 1132 provides ARC as an option to the user. In step 1134 that follows, the process 1130 determines the user's selection. In a decision step 1136 that follows, the process 1130 determines whether the ARC option is selected. If the answer is "yes", the process 1130 in step 1140 processes the check as an AR conversion. If the answer is "no", the process 1130 in step 1142 processes the check as a non-AR conversion.

It will be appreciated that the exemplary in-person option 1122 and the ARC option 1124 may be considered as two types of check transactions processed by the POS device 124. Thus, these two options may be thought of as two identifiers for the two types of check transactions, and selection of one of the options invokes check processing under the corresponding identifier. One use for having such an identifier is for keeping track of how much transactions are performed under the selected identifier. The concept of the POS device being configurable to handle multiple identifiers is described below in greater detail.

FIG. 5J now illustrates an exemplary user interface process 1150 that may be implemented after an AR check has been converted by the POS device 124 and authorized by the check processing service (not shown). Typically, AR checks processed electronically are not returned to the customers. Thus, the process 1150 in step 1152 determines whether the AR check conversion and authorization are completed. If completed, the process 1150 in step 1154, via the POS device, reminds the merchant to destroy the AR check within a specified period of time. In one implementation, the specified period of time is 14 days. As shown in FIG. 5J, such a reminder can be displayed as a message 1144 on the POS device 124.

Figure 6:
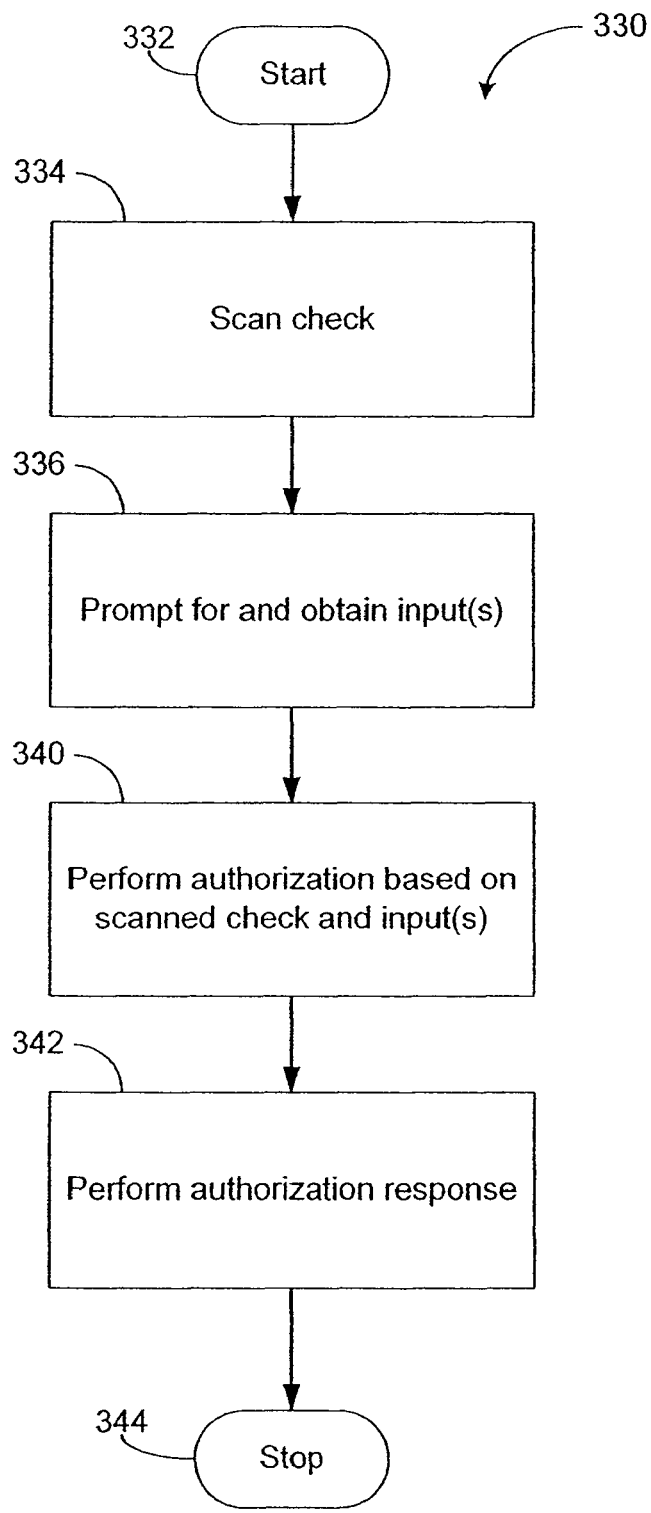
FIG. 6 illustrates a process that obtains information via the user interface functions and utilizes the information to perform a check transaction authorization.

FIGS. 6-7 now illustrate how the various exemplary user interface functions described above can be used to facilitate further processing of the checks received by the merchant. FIG. 6 illustrates a process 330 that utilizes at least some of the input(s) obtained by the user interface function(s) to perform an authorization of the check transaction. The process 330 begins at a start state 332, and in step 334 that follows, the process 330 induces scanning of the check. In step 336 that follows, the process 330 induces prompting and obtaining of input(s) from the user via the location-base device. In step 240 that follows, the process 330 induces performing an authorization of the check transaction based at least in part on the information from the scanned check and the input(s). In step 342 that follows, the process 330 induces performing of an authorization response to the merchant based on the result of the performed authorization. The process 330 ends in a stop state 344.

It will be appreciated that in one implementation, the process 330 described in reference to FIG. 6 may be performed and coordinated by one or more processors associated with the check processing service. In another implementation, the process 330 may be performed and coordinated by some combination of one or more processors associated with the location-base device and the check processing service.

FIG. 7A illustrates an exemplary process 350 that may be performed by the check processing service to perform the authorization and selected interfacing with the location-base device user. The process 350, in step 352, induces performing of the check transaction authorization. In one implementation, the check transaction authorization includes a risk assessment of the check transaction in a manner described below in greater detail.

As shown in FIG. 7A, the process 350 determines in a decision step 354 whether the check authorization has resulted in an error. If the answer is yes, the process 350 induces retrying of the transaction. The process 350 in state 358 then prompts the merchant to re-enter the input(s). If the answer in the decision step 354 is no, the process 350 in step 360 sends a response to the merchant depending on the authorization result.

Some exemplary authorization results are depicted as branches 362, 364, 366, and 368 that sends different exemplary responses to the merchant. The exemplary result/response branch 362 comprises step 370, where the process 350 has determined that the check transaction has been approved, and that the check can be processed electronically. In step 374 that follows, the process 350 induces prompting the user to void the check via the POS device. In one embodiment of the POS device, such voiding is accomplished by inserting the check face up into the device. In step 376 that follows, the process 350 induces prompting the user to remove the voided check from the POS device. In step 380 that follows, the process 350 sends an approval code to be displayed on the POS device. In step 382 that follows, the process 350 sends a reminder to the user to destroy the check. As previously described, AR converted checks are typically destroyed by the merchant within a specified period of time after the transaction is authorized. The process 350, in state 384, then induces prompting of the user to return to main menu of the POS device.

As shown in FIG. 7A, the exemplary authorization result/response branch 364 comprises step 390, where the process 350 has determined that the check itself is approved, but the electronic processing is not offered for the approved check. In step 392 that follows, the process 350 sends an approval notice to the POS device user. In step 394 that follows, the process 350 sends an instruction to the user to keep the approved check for non-electronic processing. In one implementation, the non-electronic processing of the check may comprise the merchant sending the original paper check to the check processing service. In another implementation, the merchant may send an image of the check to the check processing service, and the check may be converted back to paper format at the processing service for further processing. Such a concept of having the check processing service handle non-electronic checks for ARC check transactions are described below in greater detail. The process 350, in state 396, then induces prompting of the user to return to main menu of the POS device.

As shown in FIG. 7A, the exemplary authorization result/response branch 366 comprises step 400, where the process 350 has determined that the check transaction is declined. In certain implementation of the authorization, the first decline decision may be overturned by re-assessment of the check transaction using additional information. Such information may be requested from the merchant, external database(s), and other sources that facilitate a more detailed risk assessment of the check transaction. The re-assessment of the check transaction may be triggered if the risk assessed places the check in a borderline area in terms of the check's risk and potential profit. Thus as shown in FIG. 7A, the process 350 in a decision step 402 determines if the first decline decision is overturnable. If the answer is yes, the process 350 in step 404 performs a re-assessment of the check transaction. The process 350 then determines in a decision step 406 whether the first decline decision has been overturned. If the answer in step 406 is yes, the process 350 in step 408 notifies the merchant of the approval decision. If the answer in step 406 is no, the process 350 sends a decline notice to the merchant. One manner of notifying the merchant of the decline decision is described below in reference to the "no" result in the decision step 402.

If the answer in the decision step 402 (overturnable?) is no, the process 350 in step 412 sends the decline notice to the merchant. As shown in FIG. 7A, the decline decision notification step 412 may be invoked by the "no" result of the decision step 406 (overturned?). In step 414 that follows, the process 350 induces notification of the merchant. The process 350 then prompts the merchant to return to the POS device's main menu in state 410. As shown in FIG. 7A, the return-to-menu state 410 can also be entered after the merchant notification step 408.

As shown in FIG. 7A, the exemplary authorization result/response branch 368 comprises step 420, where the process 350 has determined that the processing of the check transaction can benefit from human intervention. In step 422 that follows, the process 350 sends an instruction to the merchant to contact a call service center for the human intervention. The process 350, in state 424, then induces prompting of the user to return to main menu of the POS device.

Figure 7B:
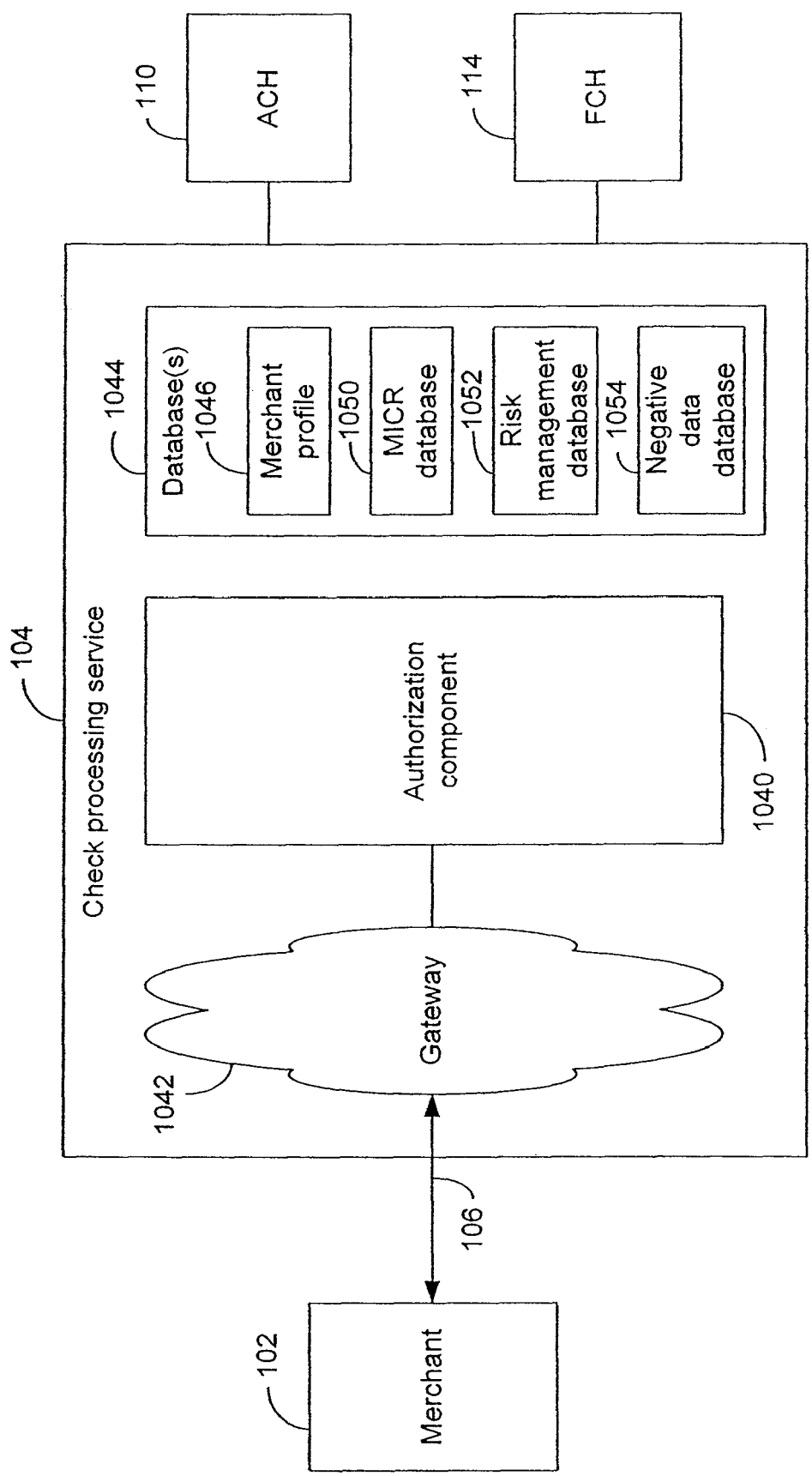
FIG. 7B illustrates a block diagram of one possible configuration of the check processing service adapted to communicate with merchants and authorize check transactions.

FIG. 7B illustrates one possible embodiment of the check processing service 104 that processes check transactions. In one embodiment, the processing service 104 comprises a gateway 1042 that communicates with the merchant 102 via the link 106. The gateway 1042 may be configured to receive electronic information about the various types of financial transactions input into the location-base device (not shown in FIG. 7B) associated with the merchant 102. The gateway 1042 may also be configured to transmit decisions or other information associated with the service's processing of the financial transaction information.

In general, the gateway 1042 may comprise one or more computers tasked for allowing communication between the processing service 104 and the plurality of merchants' location-base devices. Such a task may include, but not limited to, routing incoming and outgoing data, providing a firewall that inhibits unauthorized access, and providing a secure link between the processing service 104 and the subscribing merchants (via, for example, encrypted communication link).

The processing service 104 further comprises an authorization component 1040 configured to authorize or decline check transactions. In one embodiment, the authorization component 1040 is configured to authorize or decline acceptance and processing of AR checks received by the merchant 102 in a manner described herein.

As shown in FIG. 7B, the authorization component 1040 may perform its authorization function facilitated by one or more database 1044. The exemplary database 1044 may comprise a merchant profile database 1046 having information about the merchant 102. The database 1044 may also comprise a check information database 1050 having information about a magnetic ink character recognition (MICR) line associated with the check being processed. The database 1044 may also comprise a risk management database 1052 having information that facilitates risk assessment(s) performed by the authorization component 1040 or some other component associated with the authorization component 1040. The database 1044 may also comprise a negative data database 1054 having information about previous transactions that resulted in a negative disposition.

It will be appreciated that, although the various databases 1046, 1050, 1052, and 1054 are depicted to be within the database 1044, such a relationship is for descriptive purpose only, and in no way limit the manner in which the databases can be configured. For example, the various databases may be part of a single large database. The various databases can also be physically separate from each other, and also physically separate from the database 1044. Furthermore, the database 1044 may also be physically located outside of the processing service 104, and be accessible by the authorization component 1040. Thus, it will be appreciated that the system of processing service 104 depicted in FIG. 7B is a functional block diagram, and in no way intended to limit the scope of how such service 104 can be configured.

Figure 7C:
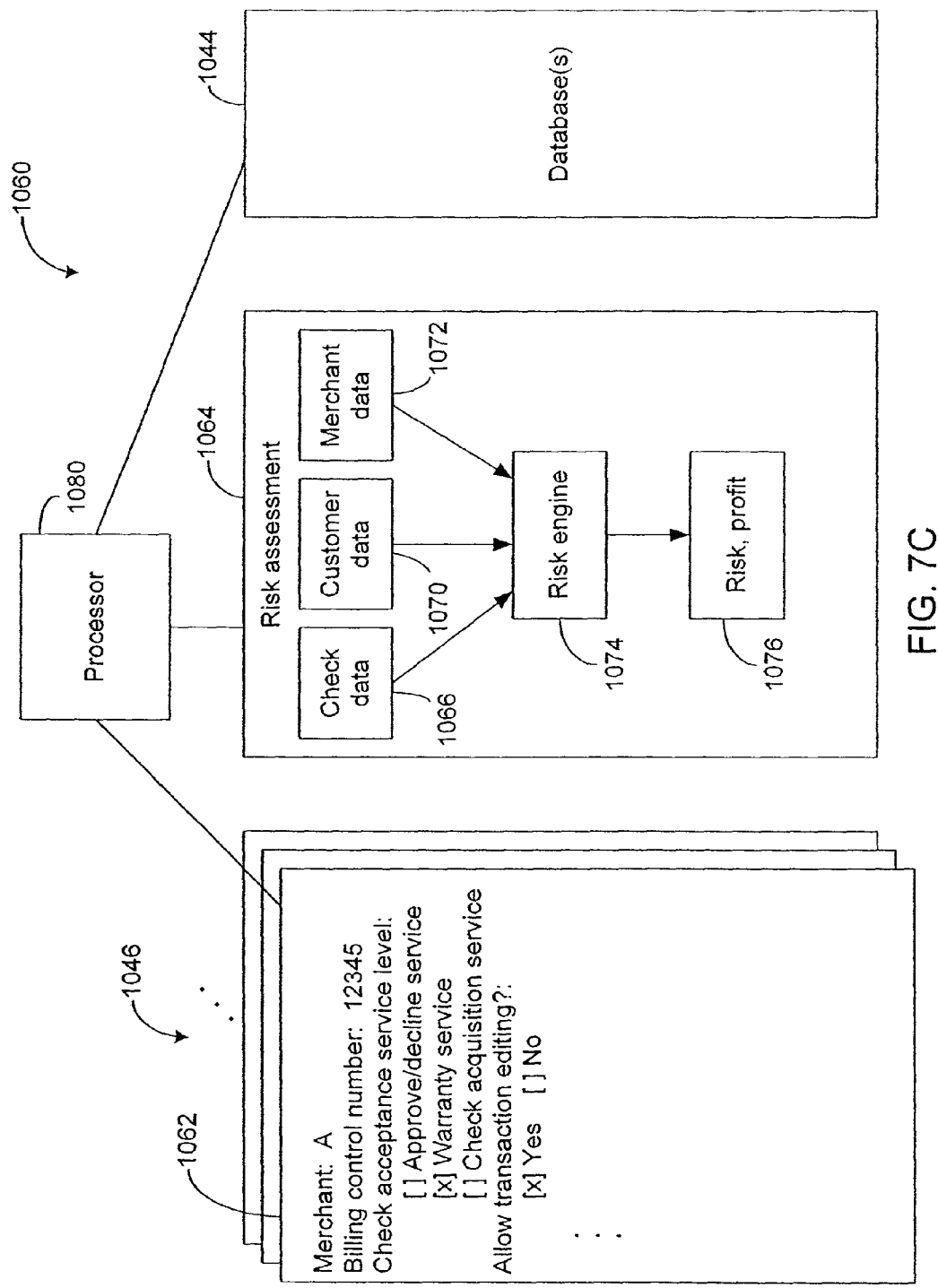
FIG. 7C illustrates a block diagram of how the check transaction may be authorized based on information about the merchant and an assessment of risk associated with the check.

FIG. 7C illustrates one embodiment of an exemplary authorization component 1060 that authorizes or declines the check transaction. As shown in FIG. 7C, the authorization "component" 1060 may comprise a combination of processors, databases, data, programs, and the like. Similar to the databases described above in reference to FIG. 7B, such "parts" of the authorization component 1060 may be integrated at a single location, located at different locations, or be configured in any possible combination.

The exemplary authorization component 1060 comprises a processor 1080 that accesses information related to the check transaction and determines whether to authorize or decline the transaction. In one implementation, the processor 1080 accesses the merchant profile database 1046 having information about a plurality of merchants. For example, an exemplary merchant "A" has associated with it a profile 1062. Such a profile may include merchant name, billing control number, check acceptance level, check transaction edit capability, etc.

The check acceptance level may include several services available to subscribing merchants, with each service level having a corresponding service fee. In one implementation, the service level options include a basic approve/decline service where the merchant still assumes the risk even if the check is approved. The merchant may also choose a warranty service where the check processing service guarantees that check will clear if it approves the transaction. In such a service, the check processing service assumes the risk once it approves the check. The merchant may also choose a check acquisition service where the check processing service buys the checks from the merchant and assumes the risks associated with the checks. It will be appreciated that any of a number of different service levels can be provided to the merchant without departing from the spirit of the present teachings.

As shown in FIG. 7C, the exemplary merchant profile 1062 indicates that the exemplary merchant "A" has selected the exemplary warranty service. The profile 1062 also indicates that merchant "A" is capable of editing check transactions.

In one implementation, the processor 1080 obtains information about the merchant from the merchant profile database 1046, and uses at least some of that information to perform a risk assessment (indicated by a block 1064). Thus, a merchant data input 1072 may be obtained in the foregoing manner. Other inputs such as a check data input 1066 and a customer data input 1070 may also be obtained in a similar manner. The exemplary data 1066, 1070, and 1072 are depicted to be inputs into a risk engine 1074 that performs a risk analysis process and outputs a risk score 1076 that is indicative of the risk of the check transaction. Other factors such as the potential profit associated with the processing of the check transaction may also affect the authorize/decline decision.

FIG. 7C also shows the database 1044 described above in reference to FIG. 7B. Such a database may be accessed by the processor 1080 to facilitate the risk assessment. As shown in FIG. 7C and described above, the exemplary merchant profile database 1046 may be located anywhere (with respect to the other databases and the check processing service) accessible by the authorization component 1060 without departing from the spirit of the present teachings.

In certain implementations, the risk assessment assigns a risk score based on various factors associated with the check transaction. Such factors can weigh the likelihood that the check will return against the likelihood that the check will clear. Such balancing of risk of a bad check against the potential profit for a successful transaction may depend on factors such as the amount of the check, check writer's history, check writing frequency at the time of check submission, location and type of business associated with the merchant, merchant's check transaction history, and the like. The check transaction may be approved if the risk score determined in such a manner is above a certain level. The check transaction can be declined if the risk score is below a certain level. In certain implementations, an intermediate risk score between the "authorize" and "decline" score levels may trigger an additional risk assessment that assesses the potentially profitable check transaction in greater detail.

Figure 8:
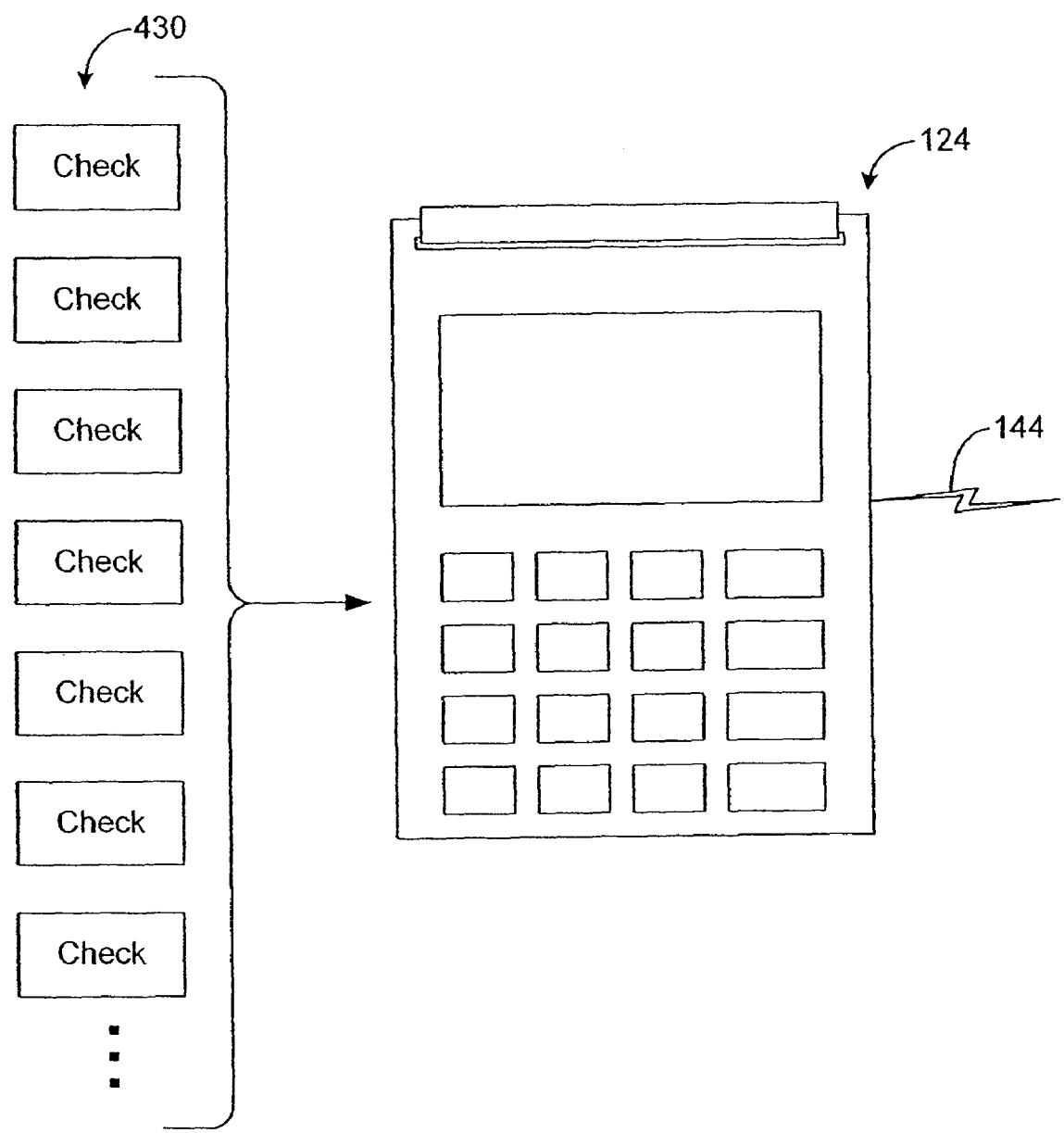
FIG. 8 illustrates one embodiment of the location-base device configured to process a plurality of checks having a common parameter such as a common check amount.

FIGS. 8-9 now illustrate one aspect of the present teachings relating to the location-base device being configurable to allow handling of a repetitive input that may be common to a plurality of checks. FIG. 8 illustrates the POS device 124 processing a plurality of checks 430. For the purpose of description in reference to FIGS. 8-9, it will be assumed that the plurality of checks 430 being processed share some common parameter that is input into the POS device 124. As further shown in FIG. 8, the POS device 124 is linked to the check processing service (not shown) by the communication link 144.

Figure 9A:
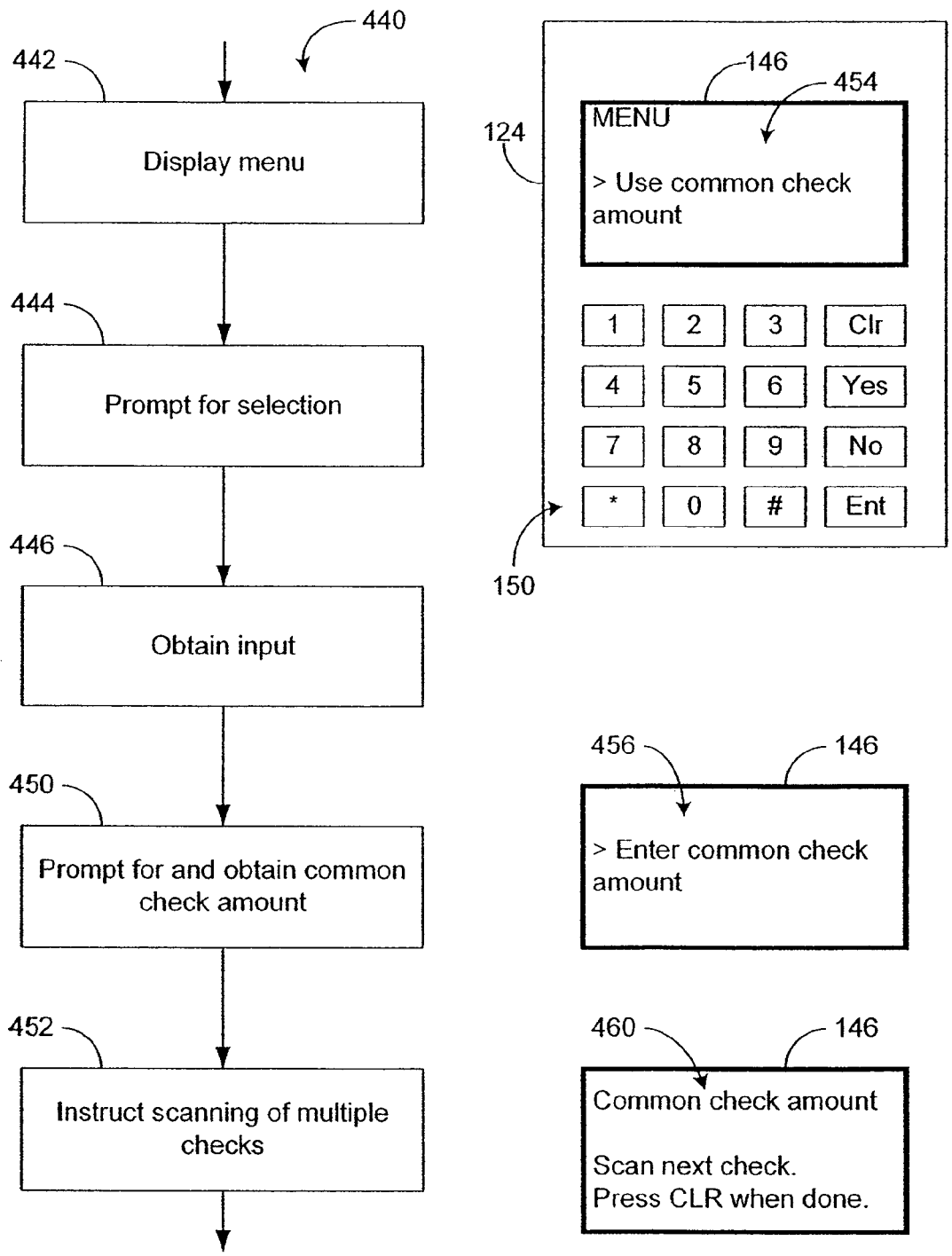
FIG. 9A illustrates a process that utilizes a menu to allow the user to enter a common check amount mode for processing a plurality of checks having a common check amount.

FIGS. 9A and B illustrate two exemplary processes that can cause the POS device 124 to enter a common input mode. As illustrated in FIG. 9A, one exemplary process 440 allows the user to enter the common input mode via the device's menu. The process 440 induces displaying of the menu in step 442. In step 444 that follows, the process 440 prompts for the user's selection. In step 446 that follows, the process 440 obtains the user's selection as an input. As also shown in FIG. 9A, the exemplary display 146 of the exemplary POS device 124 displays an exemplary message 454. The message 454 is shown to have an exemplary "common check amount" option selected. The selection of the option can be facilitated by the exemplary keypad 150.

The "common check amount" is used as an exemplary common parameter for the descriptive purpose herein. It will be appreciated, however, that any other parameter associated with the check transaction (some of which are described herein) may qualify as a common parameter and be treated likewise without departing from the spirit of the present teachings. The exemplary common check amount parameter can arise, for example, in a rental establishment where a plurality of renters have a same rent amount. In such situations, it may be more efficient for the POS device user not to repeatedly enter the same check amount for each of the plurality of checks having the same amount.

As shown in FIG. 9A, the process 440 in step 450 prompts for and obtains the common check amount for the plurality of checks. Such prompt and input may be facilitated by a message 456 displayed on the display panel 146. In step 452 that follows, the process 440 instructs the user to scan the plurality of checks having the common check amount. An exemplary message 460 may facilitate such scanning of checks. As an example, the message 460 may indicate that the POS device is in a common check amount mode, and at the completion of scanning (and other inputs) of one check, the message may prompt for scanning of the next check, or inform how to exit the common check amount mode. An exemplary looping process that can perform the function of step 452 is described below in greater detail.

Figure 9B:
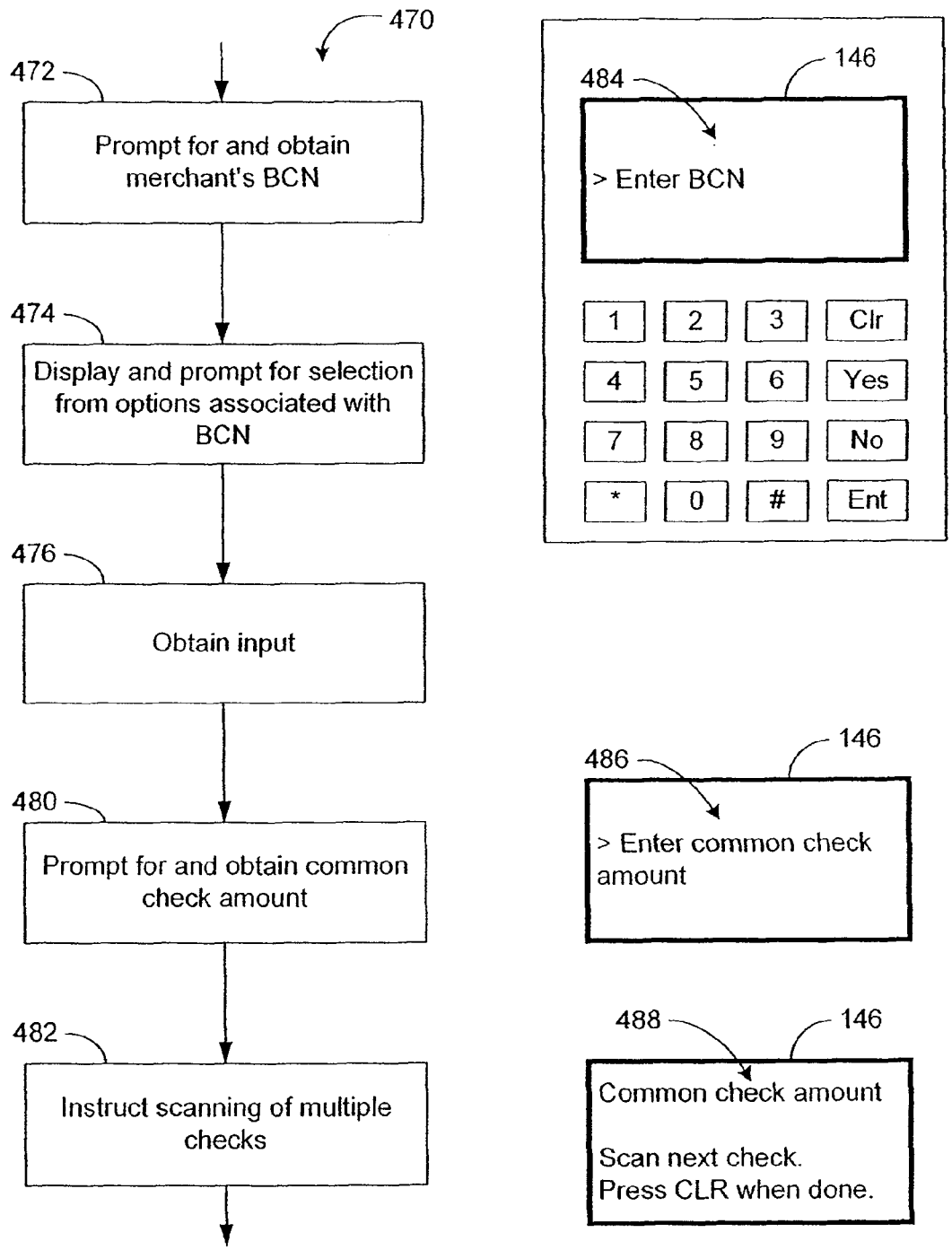
FIG. 9B illustrates a process that allows the user to enter the common check amount mode via a menu induced by the check processing service.

FIG. 9B illustrates another exemplary process 470 that allows the user to enter the common check amount mode. In certain implementations, the check processing service may prompt the user with the option of entering such a mode. One way of configuring the merchant's options may be achieved by the merchant's billing control number (BCN) that can be obtained from the merchant via the POS device user interface function described above in reference to FIG. 5C. Thus, the process 470 in step 472 prompts for and obtains the merchant's BCN. Obtaining of the BCN may be facilitated by a message 486 displayed on the display panel 146. In step 474 that follows, the process 474 induces displaying and prompting for a selection from options associated with the BCN. In step 476 that follows, the process 470 obtains the user's selection input—in this exemplary case, the common check amount mode. In step 480 that follows, the process 470 is in the common check amount mode, and prompts for and obtains a common check amount. Obtaining the common check amount may be facilitated by a message 486 requesting the user to enter the check amount common to the plurality of checks. In step 482 that follows, the process 470 instructs the user to scan the plurality of checks having the common check amount. An exemplary message 488 may facilitate such scanning of checks. As an example, the message 488 may indicate that the POS device is in a common check amount mode, and at the completion of scanning (and other inputs) of one check, the message may prompt for scanning of the next check, or inform how to exit the common check amount mode. An exemplary looping process that can perform the function of step 482 is described below in greater detail.

Figure 9C:
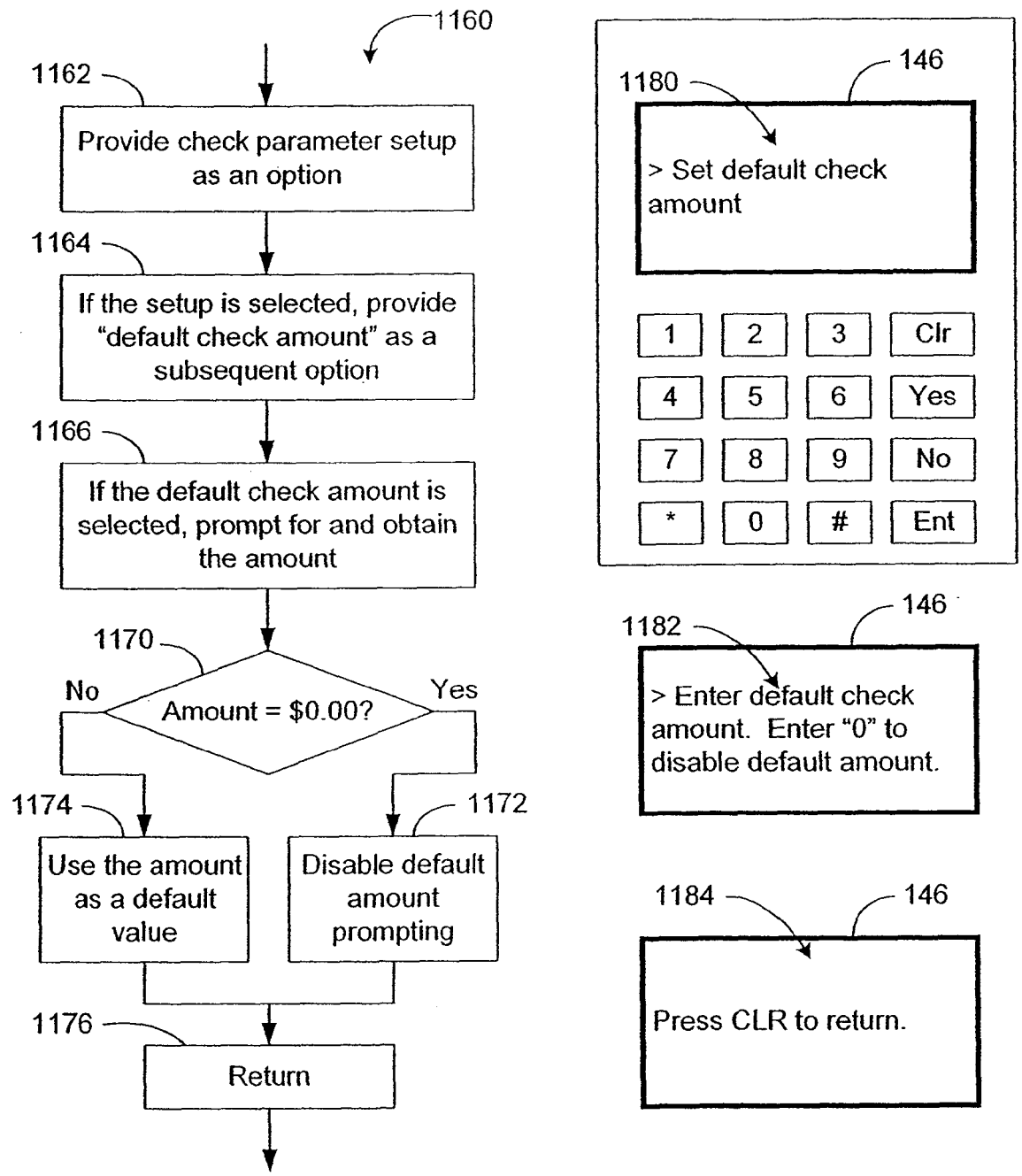
FIG. 9C illustrates a process that allows the user to set a default check amount for the common check amount mode or disable such a mode.

FIG. 9C illustrates an exemplary process 1160 that allows the user to set a default value for the check amount. Thus, the set default check value may provide the common check amount for one or more checks scanned thereafter. The process 1160 in step 1162 provides a check parameter setup as an option to the user. In step 1164 that follows, the process 1160 provides a default check amount as a subsequent option if the check parameter setup is selected by the user. An exemplary message 1180 can present such an option to the user. In step 1166 that follows, the process 1160 prompts for and obtains the default amount if the default check amount option is selected. The process 1160, in a decision step 1170, determines is the default amount is $0.00. In one implementation, the default amount of $0.00 can function as a disabling switch that disables the default amount prompting during the check conversion process. The prompting for the default value and the disabling feature can be presented to the user by an exemplary message 1182 shown on the display. Thus if the answer is "yes", the process 1160 in step 1172 disables the default amount prompting feature of the POS device. If the answer is "no," the process 1174 uses the entered amount as a default value during the subsequent check conversion(s), until a new default value is set or the default value feature is disabled. The process 1160 in step 1176 returns to a menu or to some state of the conversion process with the default check amount value set. The user may be prompted to cause the return by an exemplary message 1184.

Figure 9D:
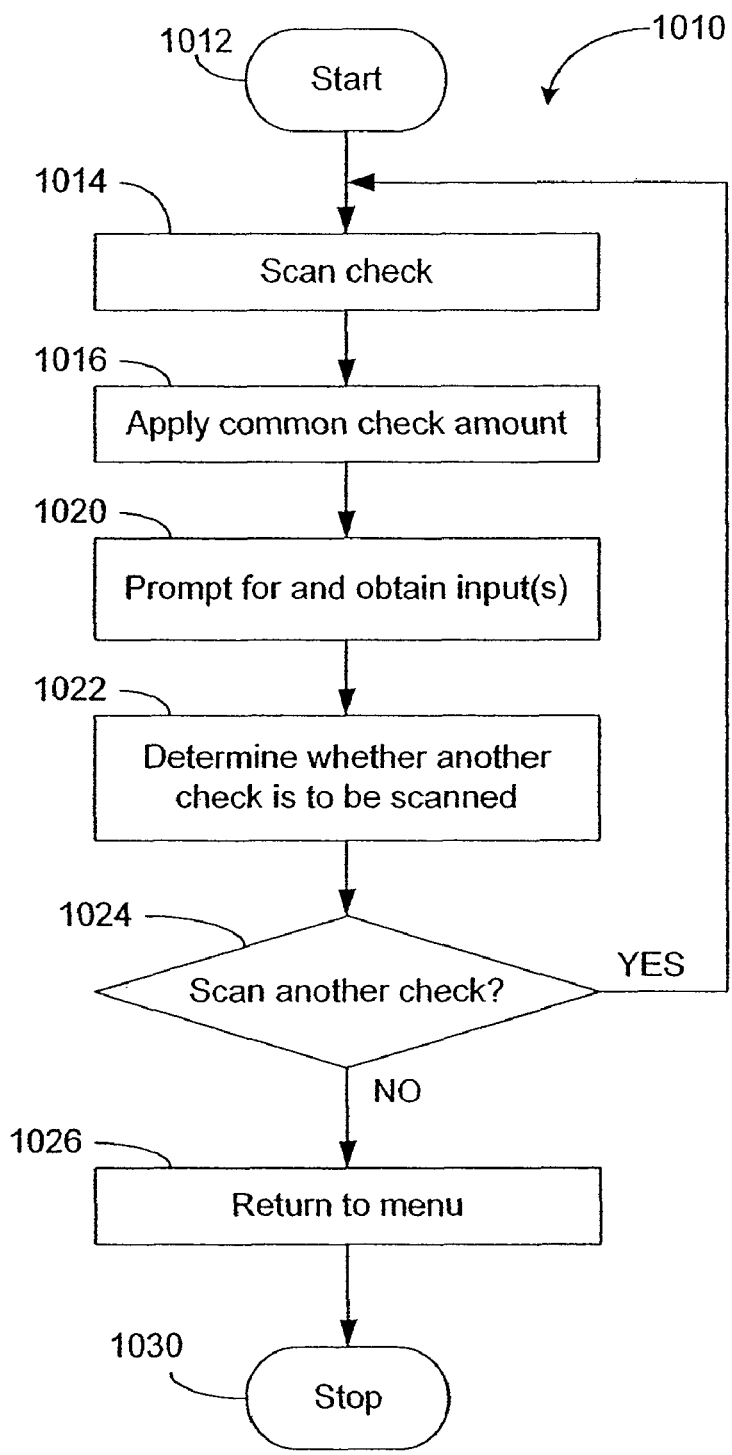
FIG. 9D illustrates a process that allows scanning and processing of the plurality of checks having the common check amount.

FIG. 9D illustrates an exemplary process 1010 that facilitates scanning of the plurality of checks having the same check amount. Thus, the process 1010 may occur in steps 452 and 482 of the processes 440 and 470 described above in reference to FIGS. 9A-B. The process 1010 may also occur after the default check amount is set by the process 1160 as described above in reference to FIG. 9C.

The process 1010 begins in a start state 1012, and in step 1014 that follows, the process 1010 induces scanning of one the checks having the same check amount. In step 1016 that follows, the process 1010 applies the common check amount to the scanned check. In step 1020 that follows, the process 1010 prompts for and obtains other input(s). In step 1022 that follows, the process 1010 determines whether another check with the same amount is to be scanned. If the answer is yes, the process 1010 loops back to step 1014 where scanning of another check is induced. If the answer in no, the process 1010 in step 1026 returns the POS device to the main menu. The process 1010 then ends in a stop state 1030.

Figure 10:
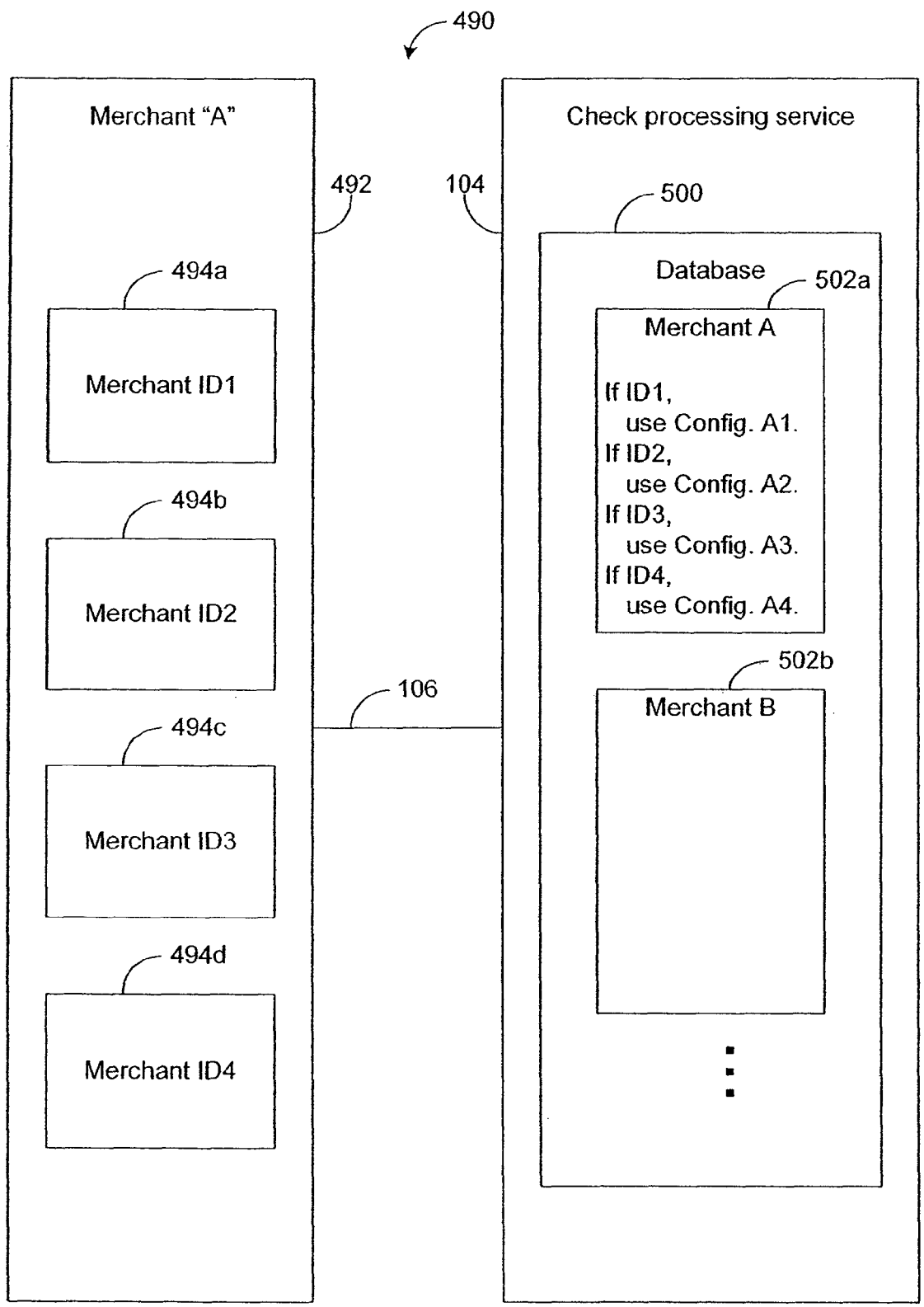
FIG. 10 illustrates one embodiment of a system wherein a merchant has a plurality of identifiers, and wherein the check processing service has a database that includes different processing configurations associated with the different identifiers.
Figure 11:
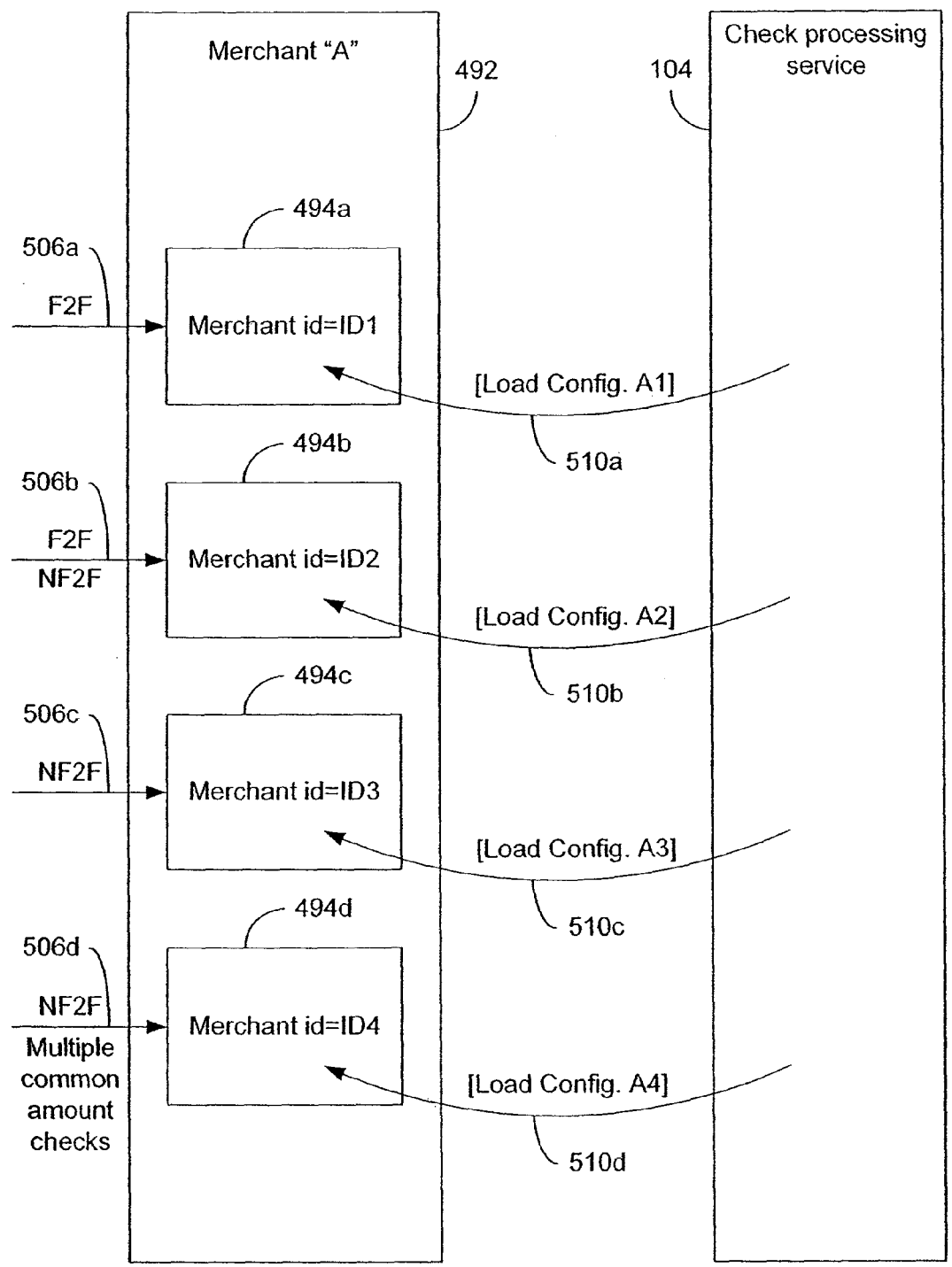
FIG. 11 illustrates an exemplary situation of the system of FIG. 10, wherein different processing configurations can be invoked for different types of check transactions associated with the merchant.

FIGS. 10-12 now illustrate one aspect of the present teachings relating to the merchant's subscription to the check processing service configurable such that the merchant can be serviced in a plurality of manners depending on a plurality of identifiers associated with the merchant. Certain merchants may comprise different facets in their business, and it may be advantageous to set up the check processing configurations differently for the different facets. As an example, a merchant may be involved in a retail sales operation in part of a building complex. That merchant may also own that building, and the remainder of the building may be leased or rented to others for business or personal purposes. Thus, the merchant may receive face-to-face checks in the retail sales operation, and AR checks from the leasees and renters. The merchant may then decide to have the received checks separated and processed accordingly, and set up more than one identifiers under the subscription to the check processing service. As one can appreciate, a given merchant's subscription can be divided into multiple categories in any number of ways. Each of the multiple categories can then be assigned a identifier, and each assigned identifier can be advantageously configured to improve the manner in which checks are processed.

FIG. 10 illustrates a block diagram 490 wherein an exemplary merchant "A" 492 has a plurality of merchant identifiers 494a-d denoted as ID1, ID2, ID3, ID4. The multiple identifiers of the merchant 492 may be serviced by one or more location-base devices. As further shown in FIG. 10, the merchant 492 is linked to the check processing service 104 via the link 106. The check processing service 104 is depicted as comprising a database 500 that includes information about the various subscribing merchants. Information 502a about merchant A may include a plurality of configurations to be used, depending on the merchant A's identifier. Thus for example, configurations A1, A2, A3, A4 correspond respectively to identifiers ID1, ID2, ID3, ID4.

FIG. 11 illustrates a specific example where each the four exemplary identifiers are assigned to preferentially handle selected types of check transactions. The "preferential handling" may be facilitated by a single POS device wherein a default set of options are loaded into the device upon the selection of the identifier. The single POS device may still allow other functions (not associated with the selected configuration) to be performed via one or more menus. The preferential configuration may also be implemented via a plurality of POS devices associated with the merchant, with each device having similar default set of preferred options and other selectable functions.

Thus in the exemplary configuration of FIG. 11, merchant A is depicted as having the exemplary identifier ID1 (494a) associated with configuration A1 that preferentially handles face-to-face checks (as indicated by arrow 506a). Similarly, the ID2 (494b) is associated with configuration A2 that preferentially handles both face-to-face and non-face-to-face checks (as indicated by arrow 506b). The ID3 (494c) is associated with configuration A3 that preferentially handles non-face-to-face checks (as indicated by arrow 506c). The ID4 (494d) is associated with configuration A4 that preferentially handles non-face-to-face checks having common check amounts (as indicated by arrow 506d). As previously described, these exemplary preferred configurations can be implemented via one or more POS devices.

As further illustrated in FIG. 11, the exemplary configurations A1-A4 are depicted as being loaded (as indicated by arrows 510a-d) from the check processing service 104 to the one or more POS device at the merchant location. As previously described in reference to FIG. 10, such exemplary configurations may be stored in the exemplary database 500 associated with the check processing service 104, and be invoked by the identifiers associated with the merchant.

It will be appreciated that the exemplary "in-person" and ARC options, described above in reference to FIG. 5I, may also be considered to be two exemplary identifiers that identify two types of check transactions. As described above, these two options resulted in different configurations for processing of their respective types of check transactions.

Figure 12A:
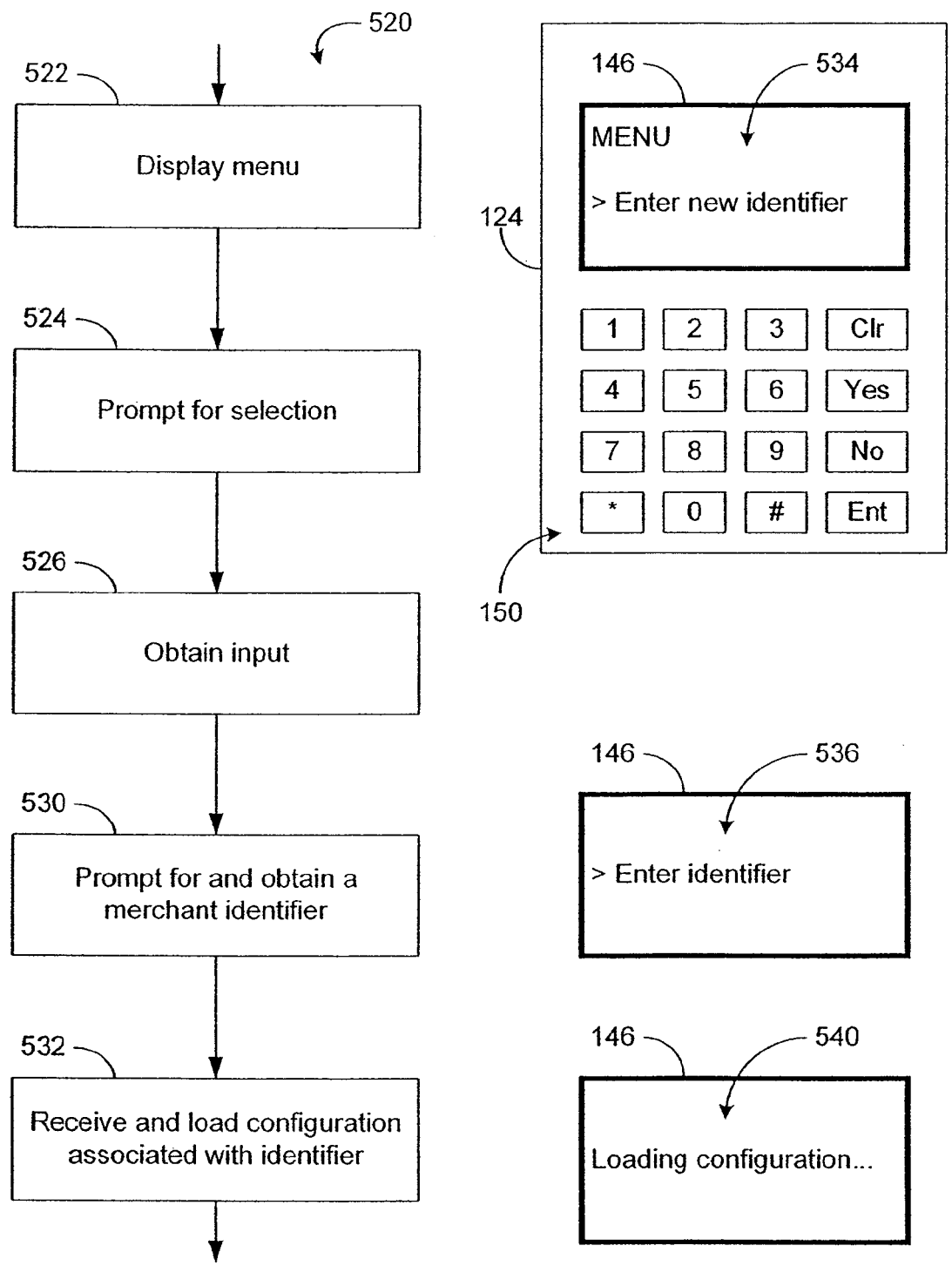
FIG. 12A illustrates a process that utilizes a menu to allow invoking of a configuration associated with a selected merchant identifier.

FIGS. 12A and B now illustrate two exemplary processes that allows the POS device user to enter an identifier that results in the device being configured in a selected manner. In FIG. 12A, a process 520 obtains a merchant identifier via a menu associated with the POS device. The process 520 in step 522 induces displaying of the menu. In step 524 that follows, the process 520 prompts for the user's selection. Such a selection prompt may be achieved by an exemplary message 534 (for entering a new identifier) displayed on the display panel 146. In step 526 that follows, the process 520 obtains the input from the user. The user input may be facilitated by the exemplary keypad 150. In step 530 that follows, the process 520 prompts for and obtains a merchant identifier. Prompting and obtaining of the merchant identifier from the user may be facilitated by a message 536. In step 532 that follows, the process 520 uses the obtained identifier to induce receiving and loading of a configuration associated with the identifier. The loading of the configuration may be visually confirmed to the user by an exemplary message 540.

Figure 12B:
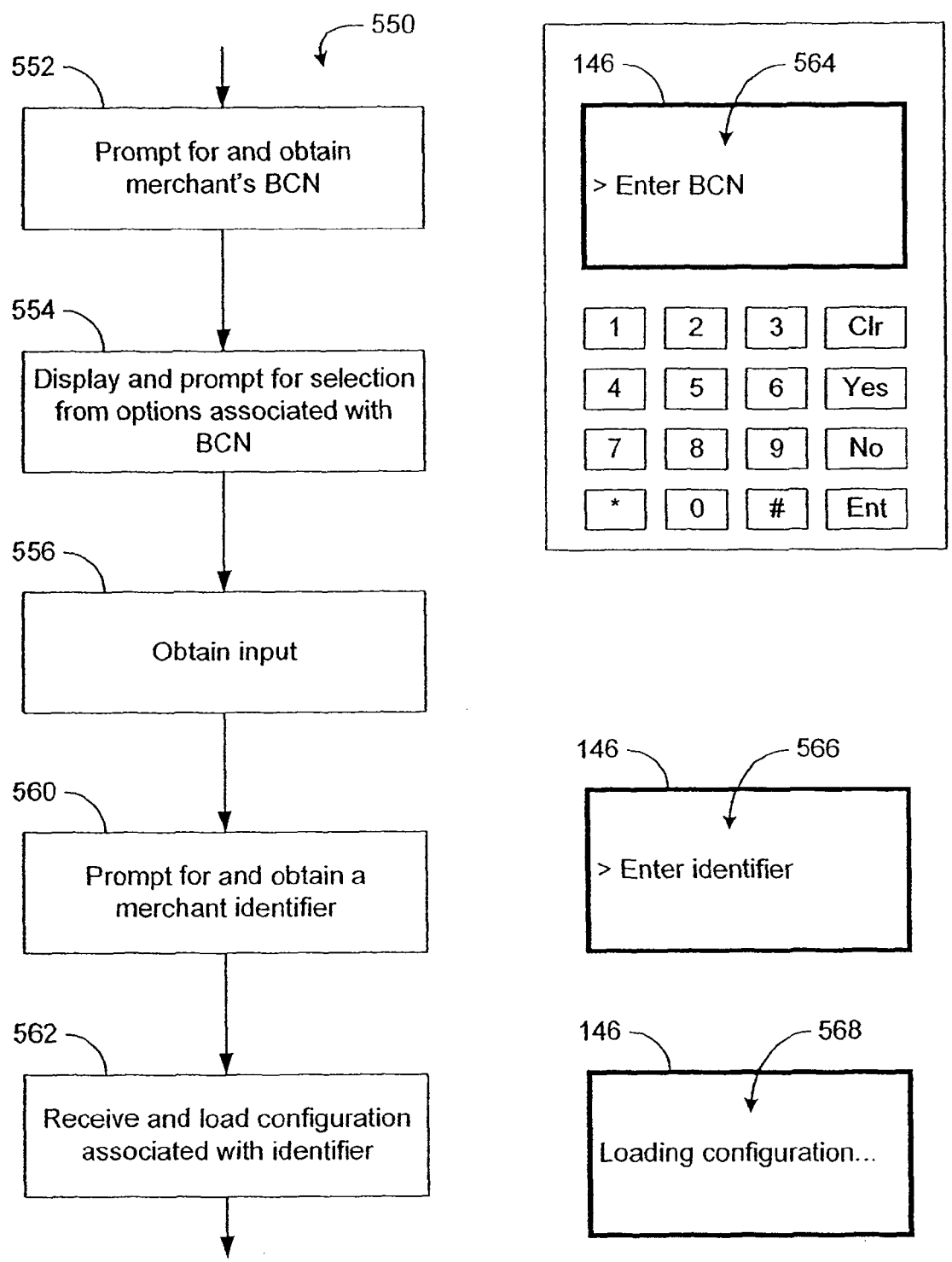
FIG. 12B illustrates a process that allows invoking of the configuration associated with the selected merchant identifier via a menu induced by the check processing service.

In FIG. 12B, a process 550 obtains a merchant identifier via the merchant's billing control number (BCN). The process 550 in step 552 induces prompting for and obtaining the merchant's BCN. Such a prompt may be facilitated by a message 564. In step 554 that follows, the process 550 induces displaying of options associated with the BCN. The process 550 further prompts for a selection from the options. In step 556 that follows, the process 550 obtains an input from the user. For the exemplary process 550, the input would indicate that a merchant identifier is to be selected. In step 560 that follows, the process 550 induces prompting for and obtaining of a merchant identifier. Step 560 can be facilitated by a message 566. In step 562 that follows, the process 550 uses the obtained identifier to induce receiving and loading of a configuration associated with the identifier. The loading of the configuration may be visually confirmed to the user by an exemplary message 568.

FIGS. 13-16 now illustrate one aspect of the present teachings relating to the location-base device being configurable to allow generation of different types of receipts in response to various factors associated with different check transactions. FIGS. 13A and B illustrate the exemplary POS device 124, showing that a receipt can be generated and output in different ways for transactions that issue receipts. For example, the display panel 146 of the POS device 124 may display a receipt language 570, and the customer can acknowledge and accept the terms of the receipt via the exemplary keypad 150. Such a receipt output method is typically suitable for face-to-face check transactions where the customer can view the receipt language.

In other face-to-face transactions, a hardcopy receipt 152 may be more appropriate. The receipt 152 may include a receipt language 572 that depends on the type of the check transaction. Exemplary factors that can affect the transaction type, and thus the receipt language, are described below in greater detail.

Figure 13C:
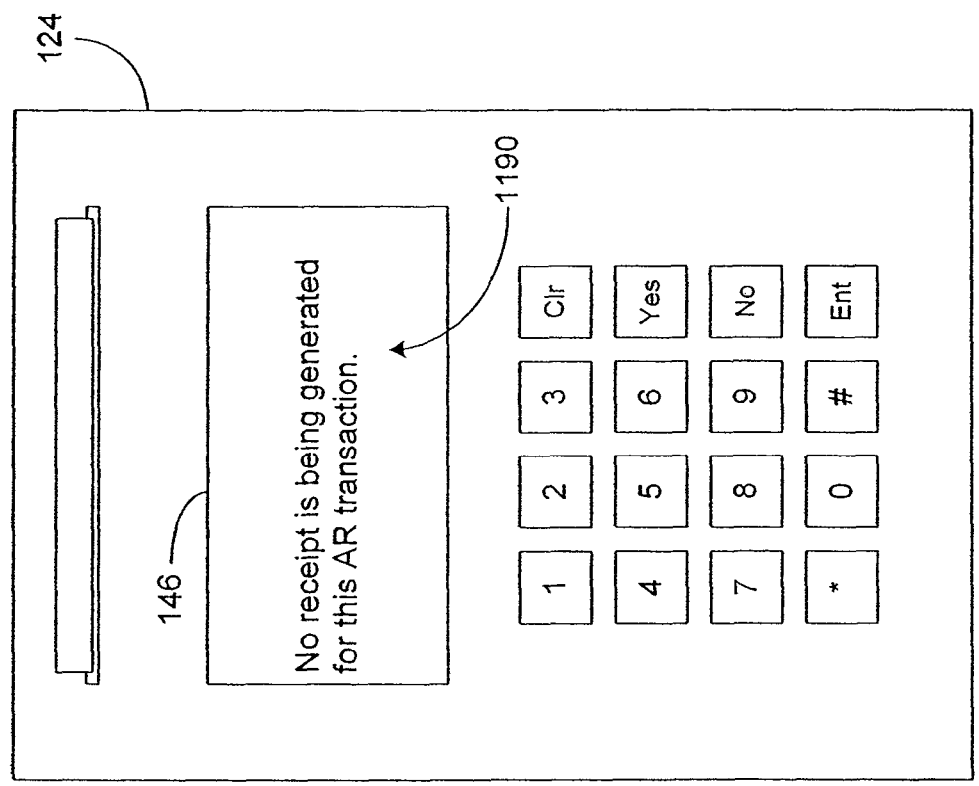
FIG. 13C illustrates one embodiment of the location-base device configured to not generate a receipt for AR check transactions.

FIG. 13C illustrates that the POS device 124 that is configured to convert AR checks may also inform the user about the absence of a receipt for the transaction. An exemplary message 1190 shown on the display panel 146 of the POS device 124 can inform the user that no receipt is being generated for the converted and processed AR transaction.

Figure 13D:
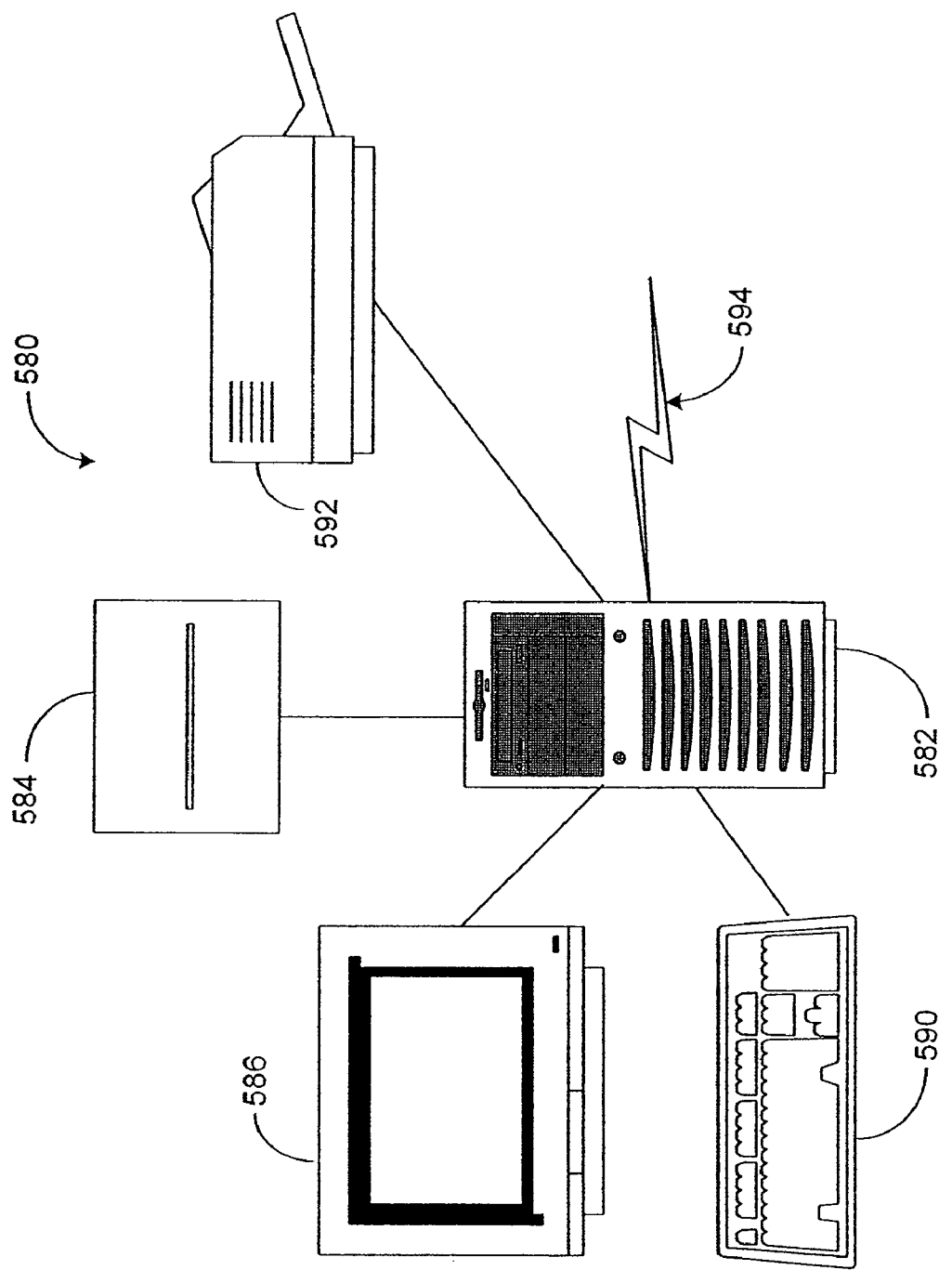
FIG. 13D illustrates that one embodiment of the location-device may comprise a computer based system that uses peripheral devices such as a check scanner and a printer to process the check transaction and print a receipt.

FIG. 13D illustrates that the receipt generation (or no generation for AR transactions) does not necessarily have to be performed by the POS device. Moreover, the location-base device having the novel features described herein may comprise separate components as depicted in FIG. 13D. An exemplary location-base device 580 is depicted as comprising a computing device 582 coupled to a check scanner 584, a display terminal 586, a keyboard 590, and a printer 592. The computing device 582 is also linked to the check processing service (not shown) via a communication link 594. For the location-base device 580, the different receipts may be printed via the printer 592.

Figure 14:
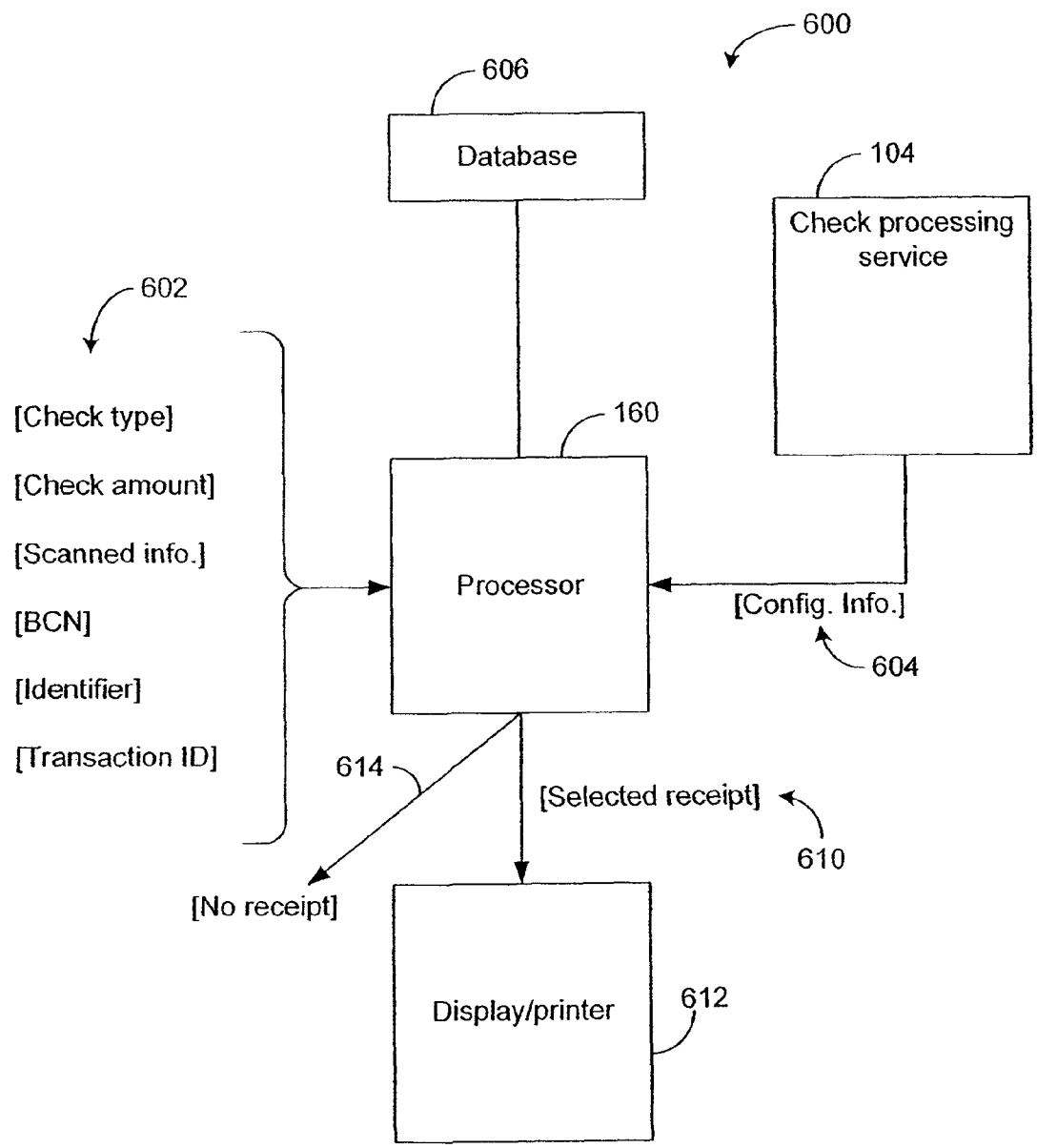
FIG. 14 illustrates a block diagram of a system that generates a selected receipt associated with the check transaction processing.

FIG. 14 illustrates a generalized functional block diagram 600 that allows selective generation of different types of receipts in response to various factors 602 associated with check transaction. As shown in FIG. 14, at least some of the check transaction factors 602 are input into the processor 160 of the location-base device. In one embodiment, the processor 160 may obtain a configuration information 604 from the check processing service 104 in response to the input factors 602. The processor 160 can determine the type of the check transaction based on the configuration information 604 and/or the check transaction factors 602. The processor 160 then induces a display/printer 612 to generate a selected receipt 610 appropriate for the determined check transaction type. The processor 160 may also determine that for AR check transactions, no receipt is to be generated, as indicated by an arrow 614. FIG. 14 also shows a database 606 that may be used to store various receipt languages and other information needed for the generation of the various receipts. It will be understood that the database 606 may be part of the location-base device, or may be located at any other location that is accessible by the device itself or via the check processing service 104.

Figure 15A:
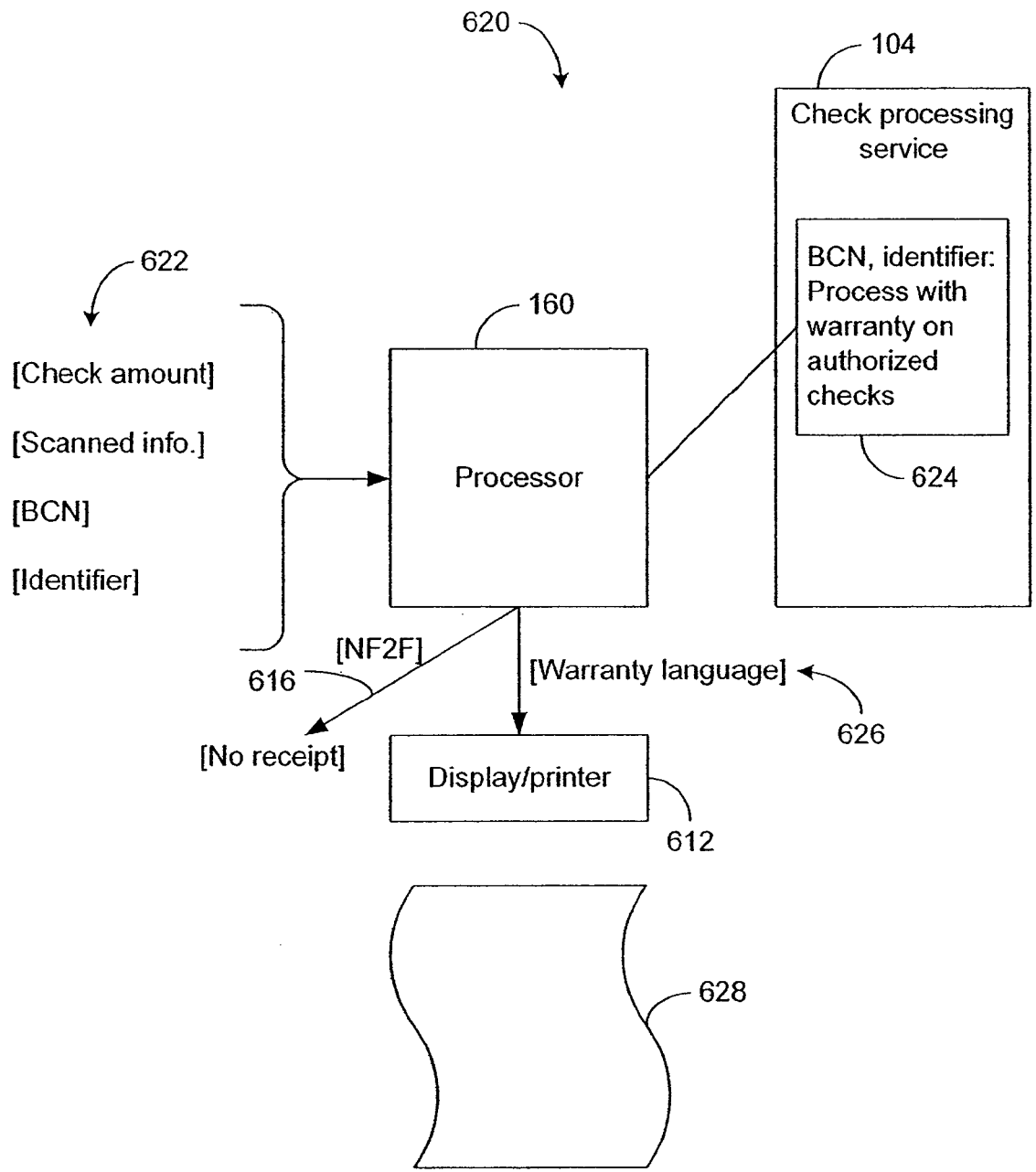
FIG. 15A illustrates an exemplary check transaction processing for a check-warranty type service such that the resulting receipt includes a language that reflects the warranty nature of the transaction.

FIGS. 15A-D illustrate some exemplary receipts (or no receipts) that can be generated by the configuration described above in reference to FIG. 14. As shown in FIG. 15A, a receipt selection configuration 620 comprises the processor 160 receiving exemplary factor inputs 622 including (but not limited to) the check amount, scanned check information, billing control number (BCN), and merchant identifier. In one embodiment, the processor 160 can then access a database 624 associated with the check processing service 104 to obtain a processing configuration associated with the transaction factors 622. In FIG. 15A, the exemplary processing configuration associated with the BCN and the identifier comprises a warranty on the checks authorized by the check processing service 104. In one implementation of the authorization, the check processing service may offer the merchant a warranty (sometimes also referred to as guarantee) subscription, where the service guarantees the check transactions it authorizes. In one guarantee subscription, the check processing service assumes the risk of a check it authorizes. Thus, if the authorized check returns for some reason and the merchant cannot collect the fund and fees associated with the returned check, the processing service pays the merchant the equivalent amount. In another guarantee subscription, the check processing service may purchase the merchant-received check it authorizes. Thus, the processing service assumes the risk of the check and the burden of collecting fund if the check returns. It will be appreciated that the aforementioned guarantee subscriptions are exemplary, and the details and terms may vary. Moreover, the guarantee subscription may comprise other similar risk/burden-assuming features. Thus, as shown in FIG. 15A, the processor 160 in response to the processing configuration, can include a warranty language 626 in a receipt 628 generated by the display/printer 612. As further shown in FIG. 15A, the processor 160 may, for non-face-to-face transactions (arrow 616), no receipt is to be generated.

Figure 15B:
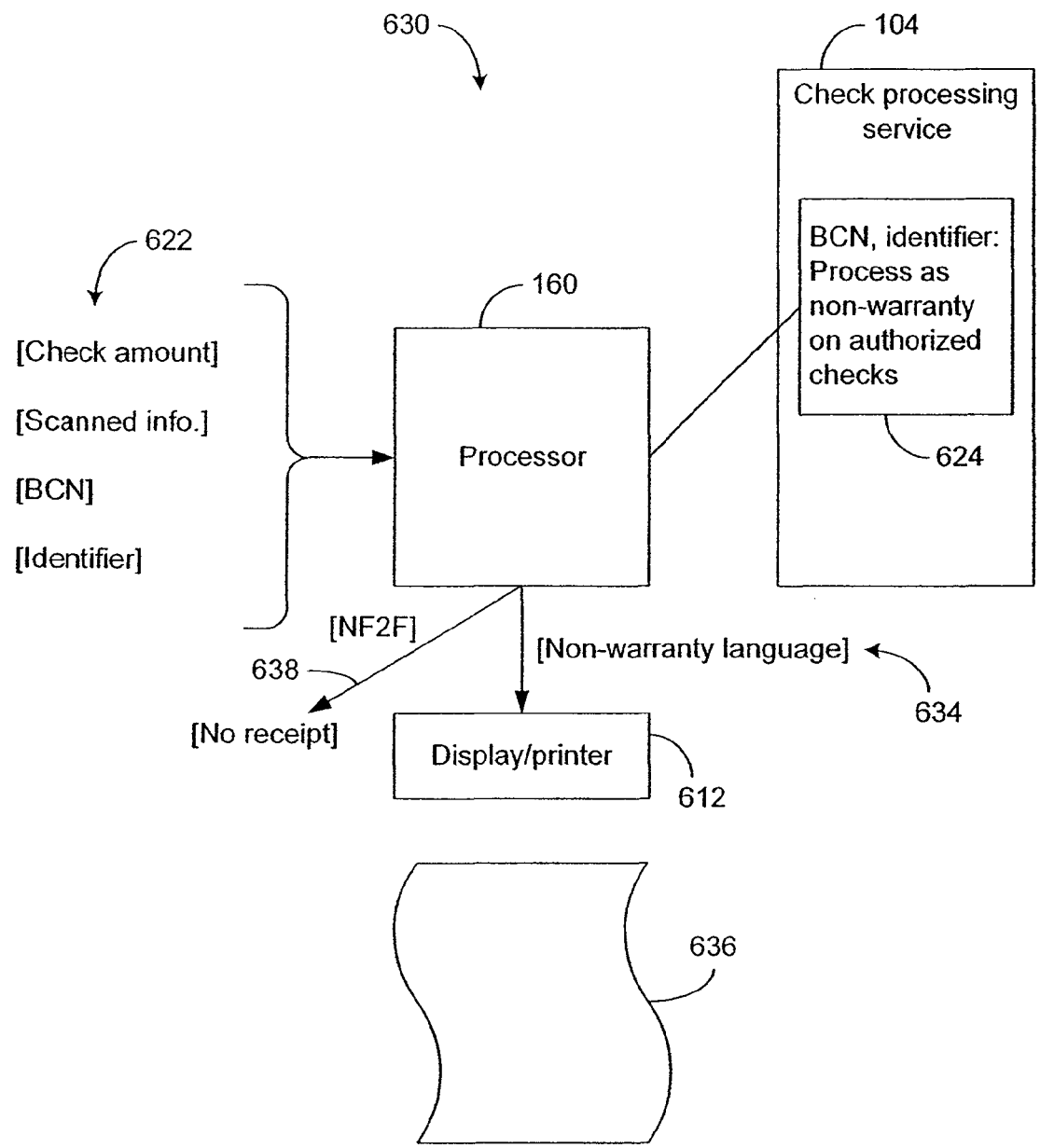
FIG. 15B illustrates an exemplary check transaction processing for a non-warranty type service such that the resulting receipt includes a language that reflects the non-warranty nature of the transaction.

FIG. 15B illustrates another exemplary processing configuration 630 that results in a receipt 636 having a non-warranty language 634. Similar to the configuration described above in reference to FIG. 15A, the exemplary transaction factors 622 input into the processor 160 can cause the check processing service 104, via the database 624 (where the BCN and identifier invokes non-warranty service), to configure the transaction as a non-warranty transaction. As further shown in FIG. 15B, the processor 160 may, for non-face-to-face transactions (arrow 638), no receipt is to be generated.

Figure 15C:
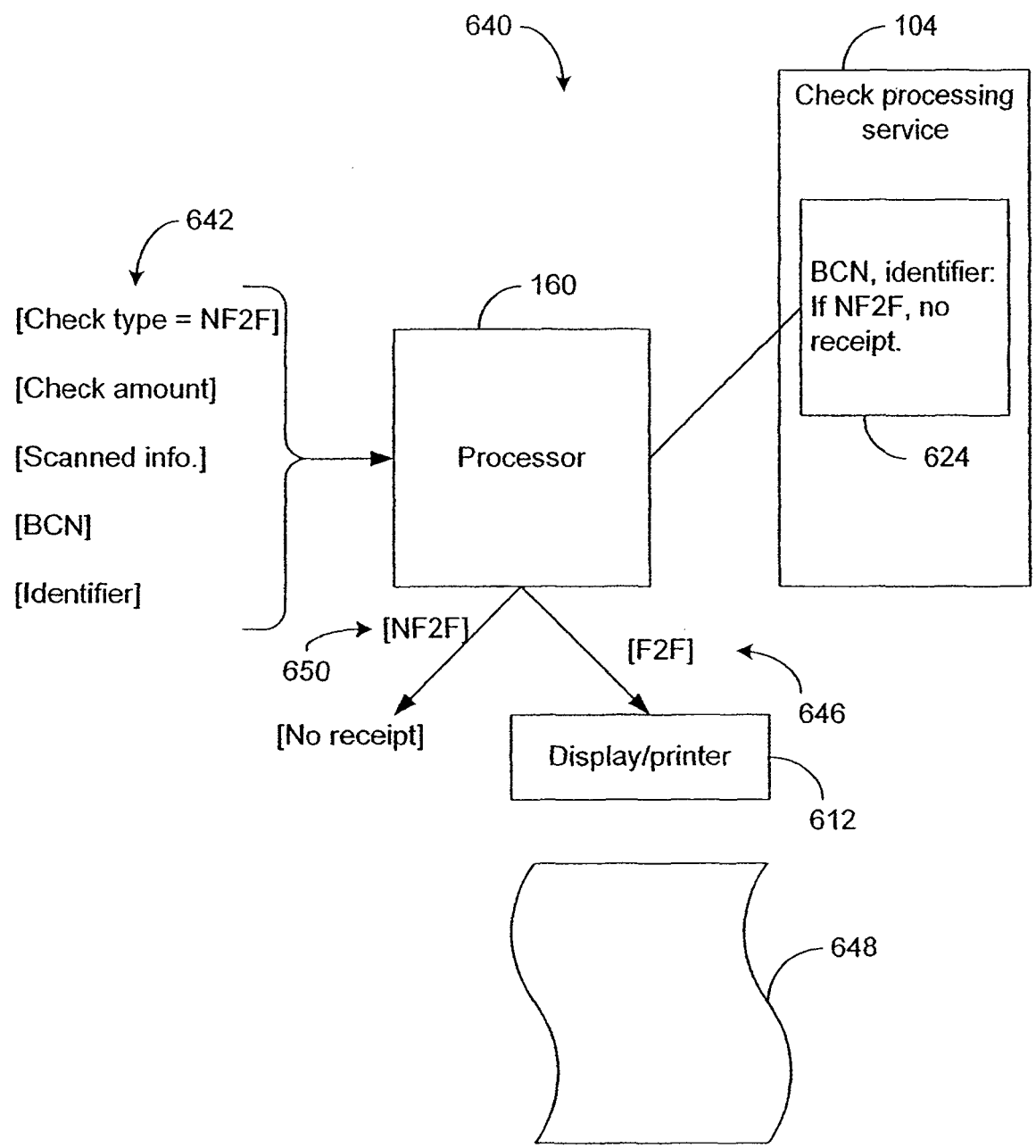
FIG. 15C illustrates an exemplary check transaction processing for accounts receivable conversion (ARC) transactions wherein the receipt may or may not be generated and wherein the receipt, if generated, includes a language that reflects the ARC nature of the transaction.

FIG. 15C illustrates another exemplary processing configuration 640 where the processor 160 receives transaction factors 642 that includes a tag that indicates that the transaction is an AR transaction and other factors as described above in reference to FIGS. 15A-B. In one embodiment, the processor 160, uses the transaction factors to determine a processing configuration via the database 624 associated with the check processing service. The exemplary configuration for the BCN and the identifier, as depicted in the database 624, causes the processor 160 to determine that a receipt is not to be issued for AR transactions. Thus, no receipt is generated for the AR check transaction as indicated by an arrow 650. If the transaction is a face-to-face type, the processor 160 generates a receipt 648 having an appropriate language 646 via the display/printer 612.

Figure 15D:
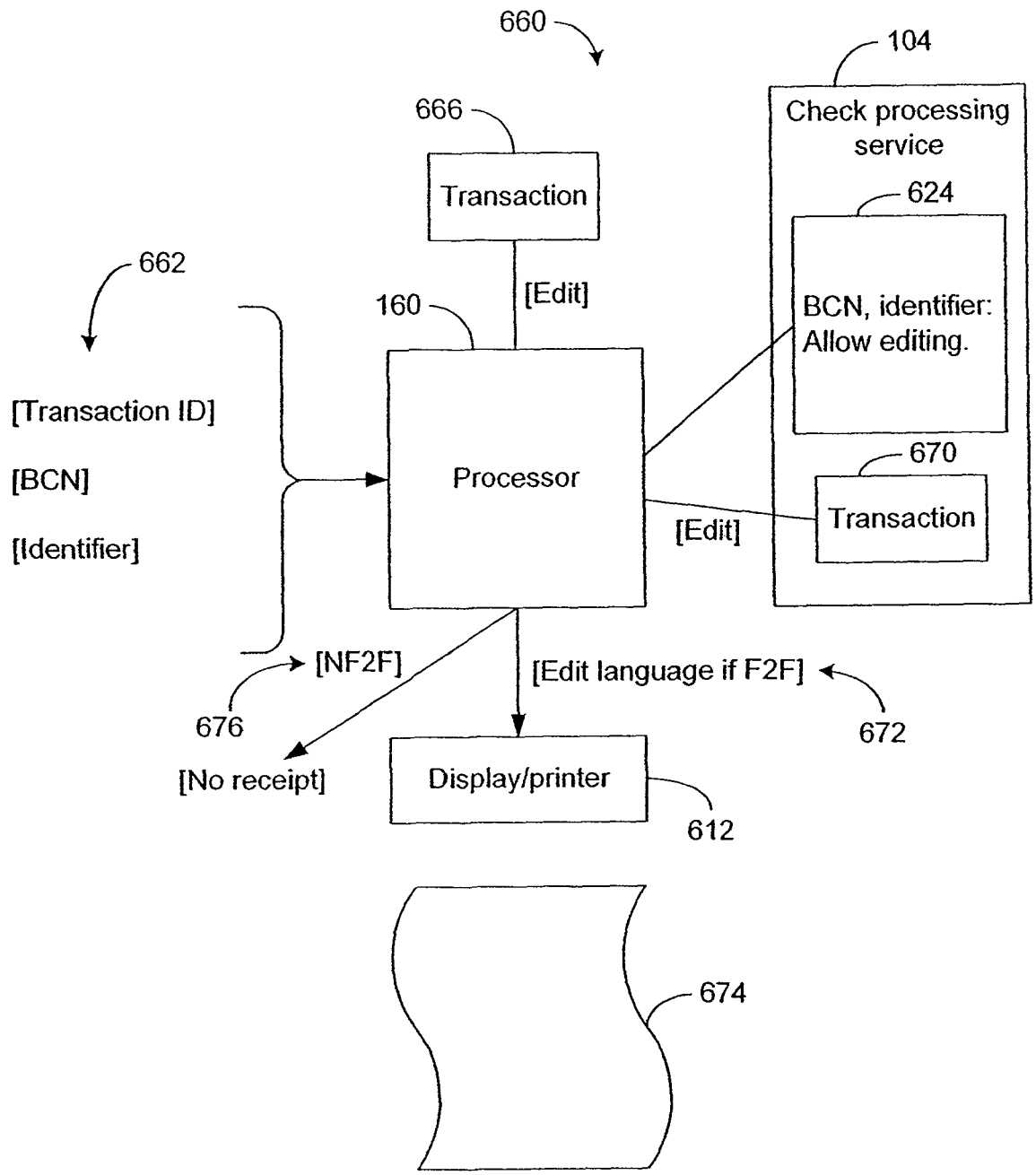
FIG. 15D illustrates an exemplary check transaction processing for editing an existing transaction record such that the resulting receipt includes a language that reflects the edit nature of the transaction.

FIG. 15D illustrates another exemplary processing configuration 660 that facilitates generation of a receipt 674 (or no receipt for non-face-to-face transactions as indicated by an arrow 676) for an editing transaction. The processor 160 is depicted to receive exemplary transaction factors 662 including a transaction identifier, the BCN, and the merchant identifier. In one embodiment, the processor 160 uses the transaction factors 662 to obtain from the check processing service, via the database 624, an exemplary configuration that allows editing of selected transactions that already have occurred. The transaction to be edited may be residing within the location-base device as a transaction 666, or may be located at the check processing service 104 as a transaction 670. Various manners in which the check transactions can be edited via the location-base device are described below in greater detail. Thus, the processor 160 in response to the allowed editing configuration, perform the edit for the transaction associated with the transaction identifier, and may include an edit language 672 in the receipt 674 (for face-to-face transactions) generated by the display/printer 612.

As shown in FIG. 15D, the processor 160 does not induce generation of a receipt for non-face-to-face transactions (arrow 676). In one embodiment, the receipt issue/no issue decision is based on the original transaction (666 or 670) being edited. If the original transaction issued a receipt, then the corresponding edit transaction also issues an edit receipt. If the original transaction did not issue a receipt, then the corresponding edit transaction also does not issue an edit receipt.

In the exemplary processing configurations illustrated in FIGS. 15A-D, and in the generalized configuration in FIG. 14, the processor 160 is depicted as obtaining the situation-specific configuration from the check processing service 104. It will be appreciated that such depiction of the processor-service relationship is in no way intended to limit the scope of the present teachings. The location-base device may include its own database, or may access a database other than that of the processing service 104, to obtain similar situation-specific configurations that facilitate the generation of different receipts, without departing from the spirit of the present teachings.

Figure 16:
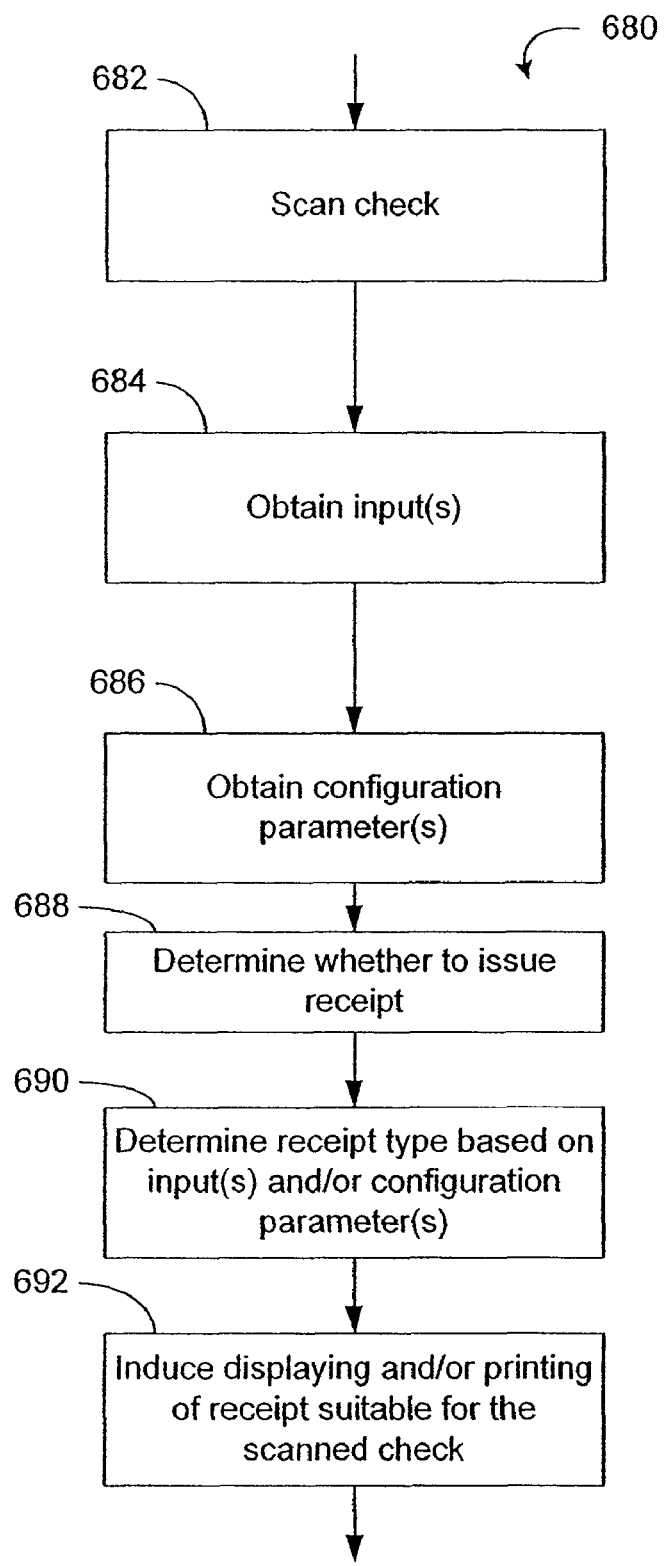
FIG. 16 illustrates a process that allows selection of the check transaction processing and thereby the resulting receipt type.

The various exemplary receipt generation methods for different transaction types can be generalized as a process 680 illustrated in FIG. 16. The process 680 in step 682 induces scanning of the check. In step 684 that follows, the process 680 obtains input(s) from the user, some of which can be used as check transaction factors. In step 686 that follows, the process 680 obtains configuration parameter(s) based on the check transaction factors. In step 688 that follows, the process 680 determines whether to issue a receipt. In step 690 that follows, the process 680 determines (if a receipt is to be issued) the type of receipt to be generated, based on the check transaction parameters and/or the configuration parameters. In step 692 that follows, the process 680 induces displaying and/or printing of a receipt suitable for the transaction type of the scanned check.

Figure 17A:
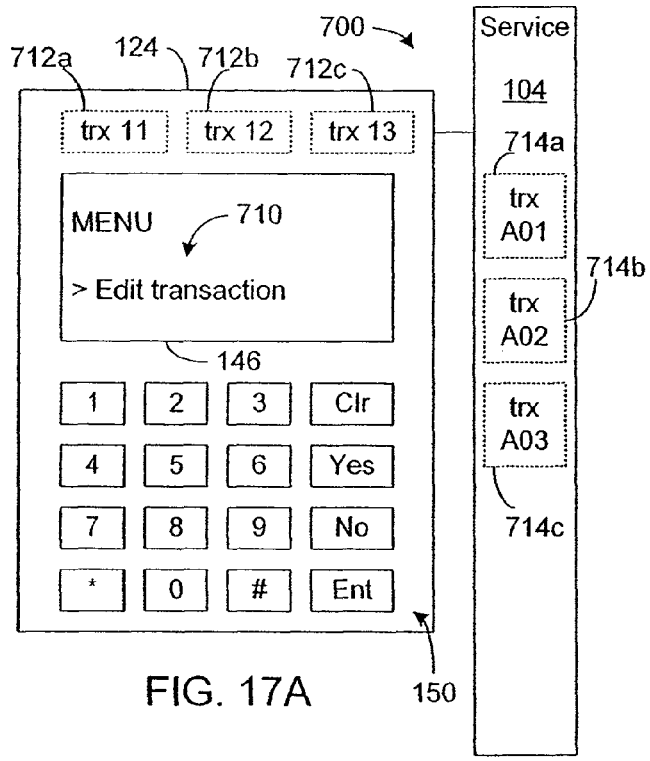
FIGS. 17A-D illustrate one embodiment of the location-base device configured to allow editing of certain check transactions.
Figure 17B:
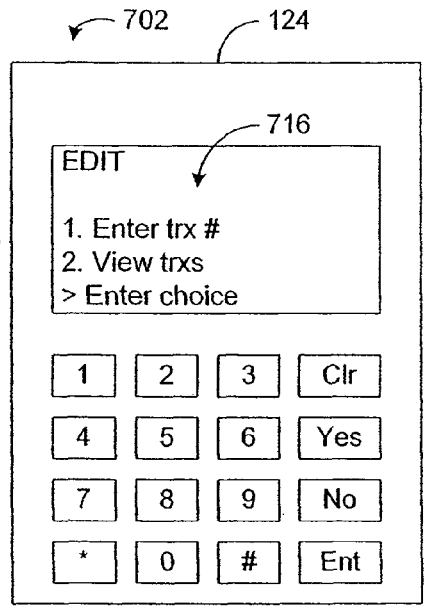
Figure 17C:
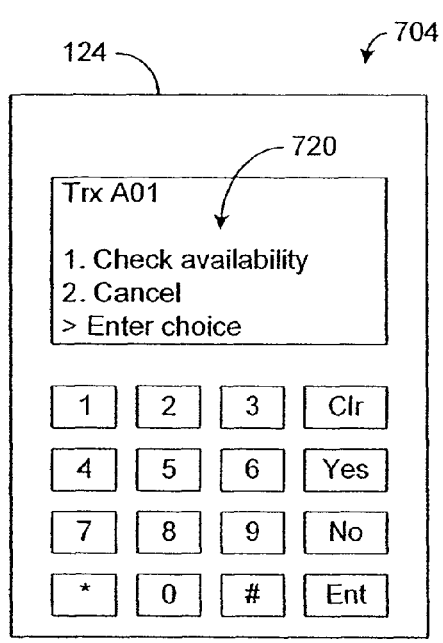
Figure 17D:
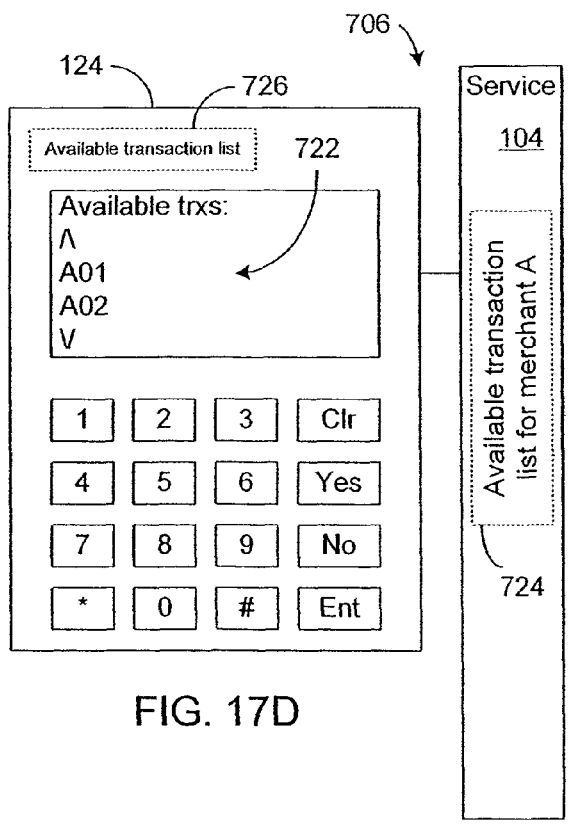
Figure 17E:
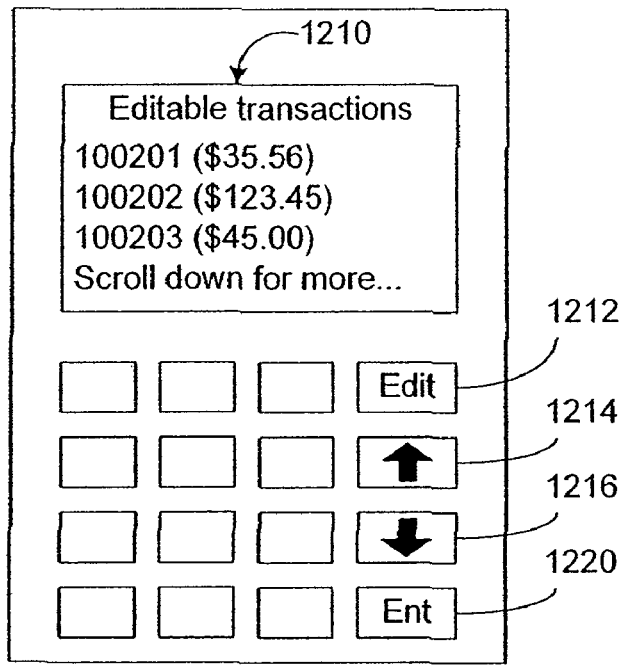
FIGS. 17E-F illustrate another embodiment of the location-base device configured to allow editing of certain check transactions.
Figure 17F:
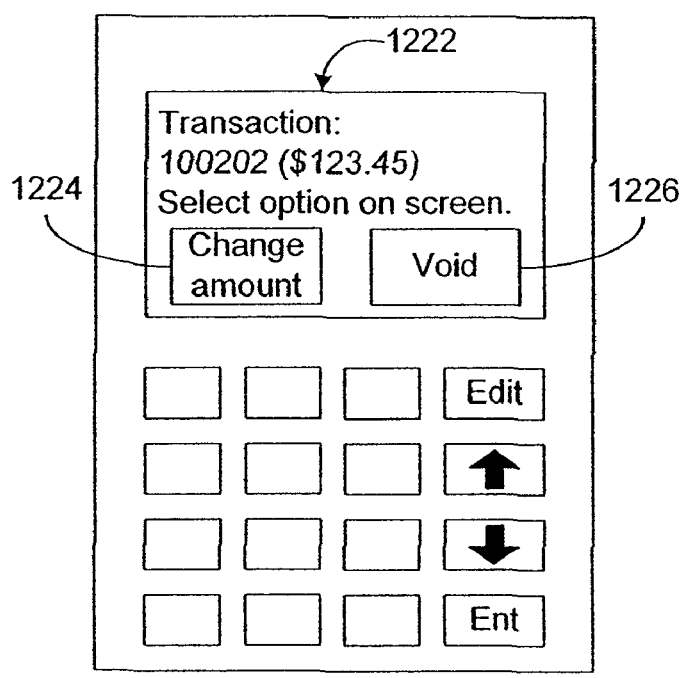
Figure 18:
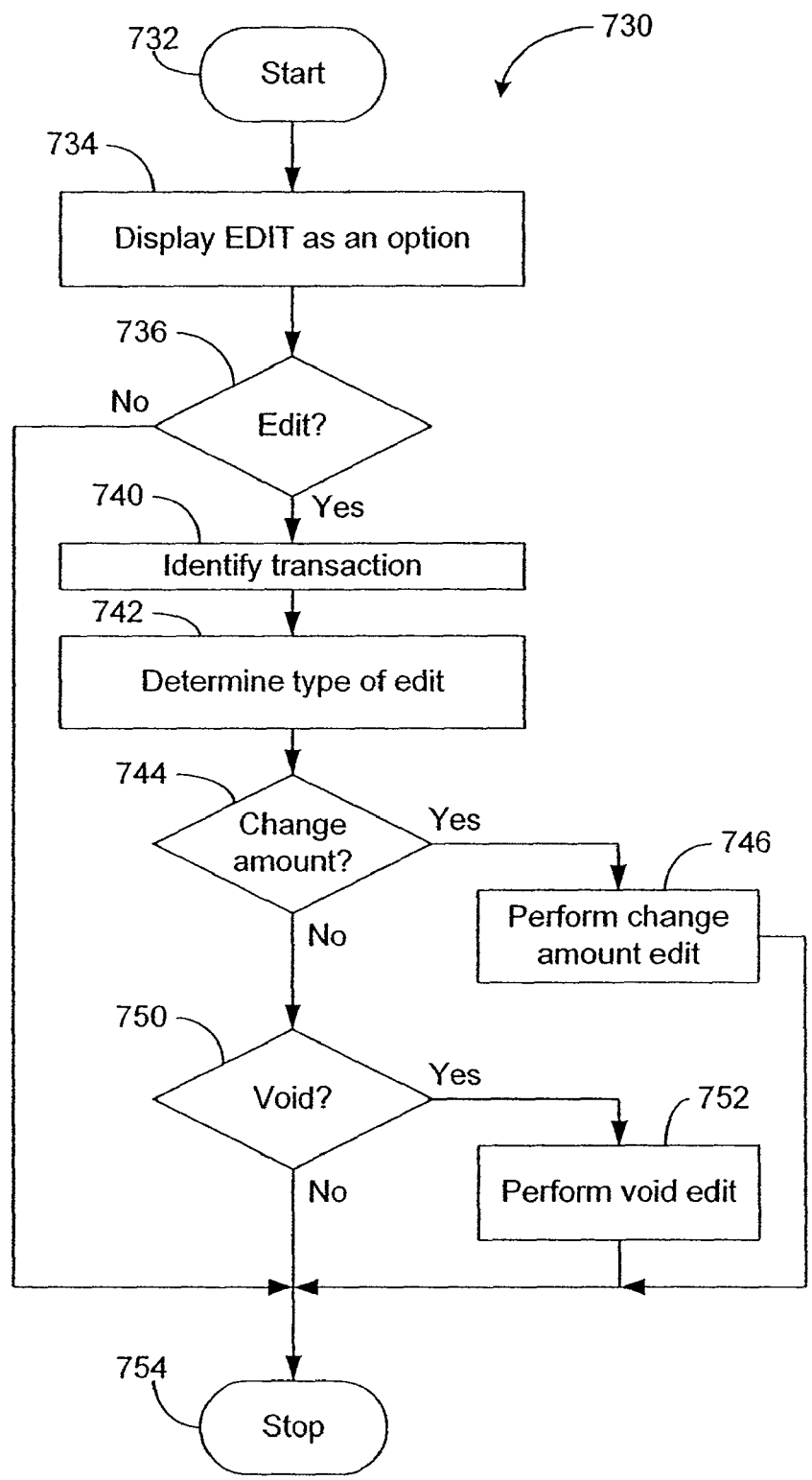
FIG. 18 illustrates a process that allows an amount-change and void edit operations.

FIGS. 17-19 now illustrate one aspect of the present teachings relating to the location-base device being configurable to allow editing of selected check transactions that have been previously processed. FIGS. 17A-D illustrate an exemplary manner in which a check transaction can be identified and accessed for editing. It will be appreciated that the transaction(s) to be edited may be identified and accessed in any number of ways without departing from the spirit of the present teachings.

In FIG. 17A, a transaction accessing configuration 700 comprises some combination of check transaction files held at the POS device 124 and/or the check processing service 104. Exemplary check transaction files 714a, b, and c at the processing service 104 are respectively denoted as transactions A01, A02, and A03. Exemplary check transaction files 712a, b, and c at the POS device 124 are respectively denoted as transactions #11, #12, and #13. It will be understood that the foregoing exemplary transaction files are just that—exemplary, and in no way intended to limit the manner in which the transaction files are distributed between the POS device 124 and the processing service 104. In some configurations, the POS device 124 may not hold any device-completed transaction files for the purpose of editing; substantially all such files may be held at the processing service 104 temporarily prior to being transmitted to the automated clearing house (ACH).

As shown in FIG. 17A, the one or more of the available transaction files can be accessed via a menu displayed on the display panel 146. An exemplary message 710 can prompt the user to select the "Edit transaction" option, and the user can select the option via the keypad 150.

Once the edit option is selected, FIG. 17B illustrates an edit configuration 702 where the POS device 124 displays an exemplary option display 716 listing options among the edit function. One exemplary option prompts for the user to enter the identifier of the transaction to be edited. If the subsequently entered transaction identifier does not match with any of the available transactions, the POS device 124 may be configured to display a message indicating such. Another exemplary option allows the user to view the identifiers of transactions that are available for editing. For the purpose of description, the user is assumed to select the first option that allows the user to input the transaction identifier.

FIG. 17C illustrates an exemplary transaction selection configuration 704 that results from the exemplary user action of FIG. 17B, wherein the user selects an exemplary transaction identifier A01. For this selected transaction, an exemplary menu 720 may comprise "Check availability" and "Cancel" options. For the purpose of description, the user is assumed to select the "Check availability" option.

FIG. 17D illustrates an exemplary transaction displaying configuration 706 that results from the exemplary user action of FIG. 17C, wherein the user wants to see the availability of the transaction A01. The POS device 124 may then compile a list of available transaction from the POS device (depicted as a list 726) and the processing service (depicted as a list 724). Such compiled list of available transactions may be displayed as a list 722. In the exemplary list 722 of the editable transactions, the transaction A02 is depicted as being available for editing.

FIGS. 17E-F illustrate another manner in which a check transaction can be identified and selected for editing. As shown in FIG. 17A, the POS device may comprise an Edit key 1212 that activates displaying of a list of editable transactions 1210. The user may scroll up and down the list by scroll keys 1214 and 1216 or by some form of a touch-screen scrolling options. Once a transaction is identified, the user may select it by using the Ent key 1220 or by some form of a touch-screen option.

FIG. 17F shows that once the transaction is selected, additional options 1222 for that transaction may be displayed to the user. The option display 1222 may comprise a change-amount option 1224 and a void option 1226. In one embodiment, these edit options 1224 and 1226 are presented to the user in a touch-screen format, thereby allowing the user to make the selection by touching the desired option.

FIG. 18 illustrates an editing process 730 that allows the POS device user to edit a check transaction. The check transaction to be edited may be identified and accessed in the exemplary manner described above in reference to FIGS. 17A-D. The process 730 begins at a start state 732, and in step 734 that follows, the process 730 induces displaying of a menu where "edit" is one of the options. In a decision step 736 that follows, the process determines whether the edit option is selected. If the answer is "no," the process 730 ends in a stop state 754.

If the answer to the decision step 736 is "yes", the process 730 in step 740 induces identifying and accessing of the transaction to be edited. In step 742 that follows, the process 730 determines the type of edit to be performed from the user. In a decision step 744 that follows, the process determines whether the edit comprises a amount-change operation. If the answer is "yes", the process 730 in step 746 performs the amount-change editing operation. The process 730 then ends in the stop state 754. If the answer to the decision step 744 is "no," the process 730 further determines in a decision step 750 whether the edit comprises a void operation. If the answer to the decision step 750 is "yes", the process 730 in step 752 performs the void editing operation. The process 730 then ends in the stop state 754. If the answer in the decision step 750 is "no," the process 730 ends in the stop state 754.

It will be appreciated that in the edit process 730, the order of amount-change determination (step 744) and the void determination (step 750) can be interchanged without departing from the spirit of the present teachings. The amount-change edit operation (step 746) and the void edit operation (step 752) are described below in greater detail in reference to FIGS. 19A and B, respectively.

Figure 19A:
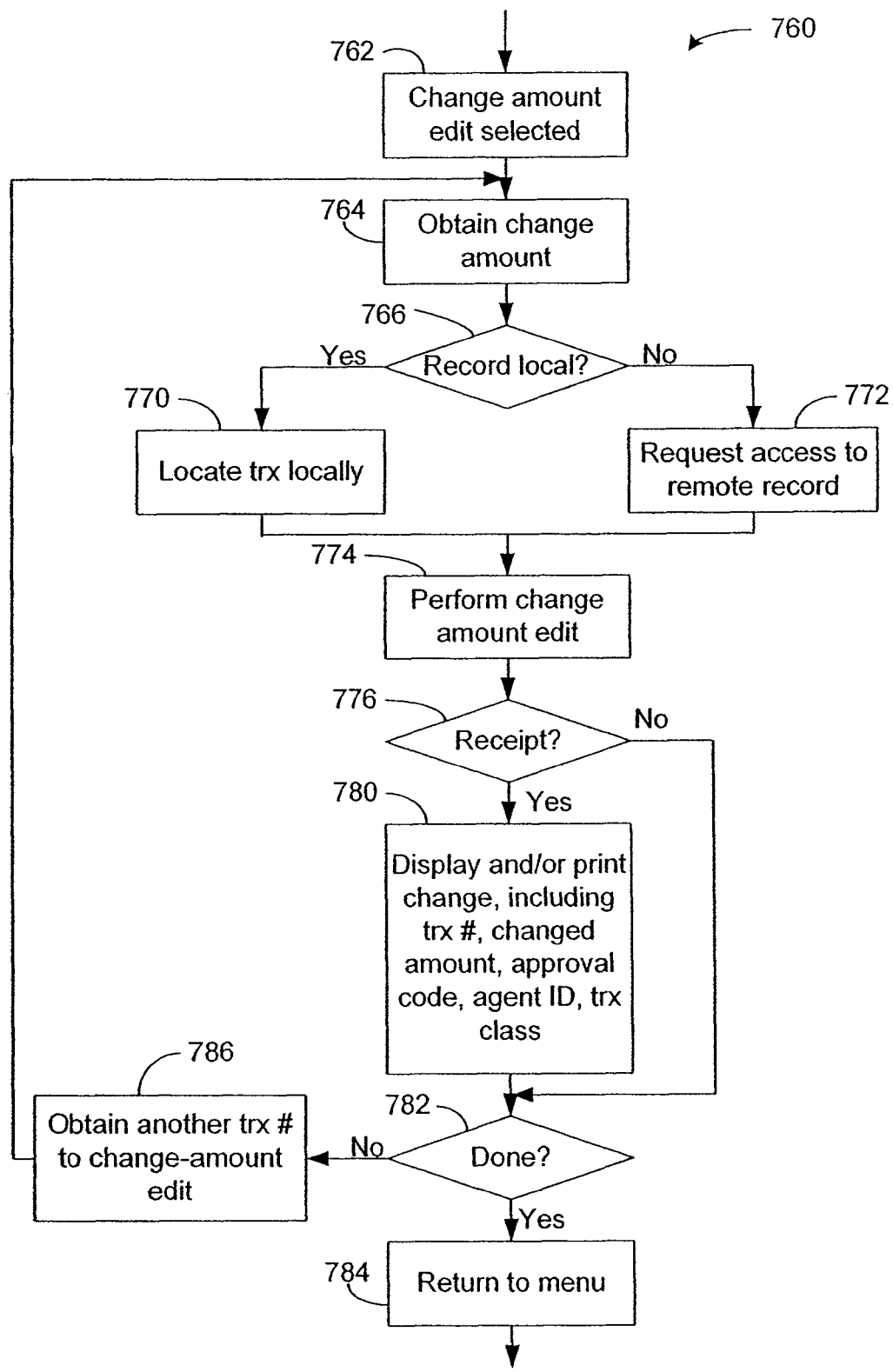
FIG. 19A illustrates a process that allows editing of the amount of one or more check transactions.

FIG. 19A illustrates an amount-change edit process 760 that may be performed in step 746 of the process 730 described above in reference to FIG. 18. The process 760 in step 762 has determined that the amount-change edit operation has been selected. In step 764 that follows, the process 760 obtains the change amount from the user. In a decision step 766 that follows, the process 760 determines whether the transaction record to be edited is held locally in the POS device. If the answer is "yes", the process 760 in step 770 locates and accesses the local transaction record. If the answer is "no," the process 760 in step 772 requests access to the transaction record held at the check processing service.

As shown in FIG. 19A, the process 760 obtains the transaction record, either locally or remotely, and in step 774, performs the amount-change edit operation. In a decision step 776 that follows, the process 760 determines whether a receipt for the edit operation is to be issued. If the answer is "yes", the process 760 in step 780 displays and/or prints a receipt having details such as transaction identifier, changed amount, approval code, agent identifier, transaction class, and the like. If the answer is "no" (AR transaction, or not wanted for non-AR transaction), the process 760 skips the receipt generating step 780.

As shown in FIG. 19A, the process 760 then determines whether the user is done with the amount-change editing operation. In certain implementations, the editing configuration allows the user to amount-change edit multiple check transactions. Thus, if the answer to the decision step 782 is "no", the process 760 in step 786 obtains another transaction identifier for amount-change operation. The process 760 then loops back to step 764 for another amount-change operation. In certain implementations, the next transaction to be edited may undergo at least some of the transaction availability (for editing) determinations described above in reference to FIGS. 17-18. If the answer to the decision step 782 is "yes", the process 760 in step 784 returns to menu.

Figure 19B:
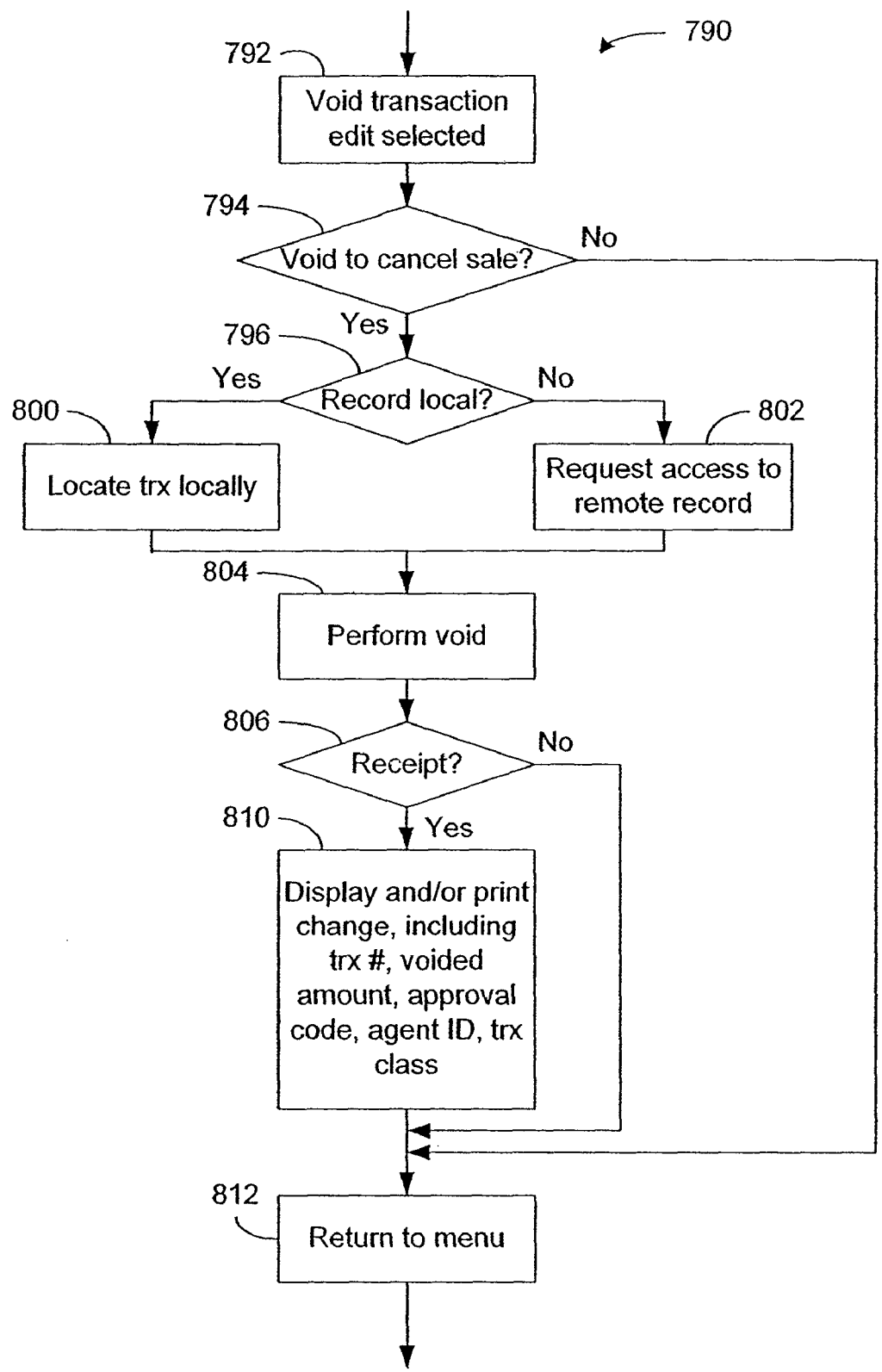
FIG. 19B illustrates a process that allows voiding of a check transaction.

FIG. 19B illustrates a void edit process 790 that may be performed in step 752 of the process 730 described above in reference to FIG. 18. The process 790 in step 792 has determined that the void edit operation has been selected. In a decision step 794 that follows, the process 790 determines whether the user wants to void the transaction to cancel the sale. It will be understood that the "sale" may mean sale of goods or services, or the financial transaction itself. If the answer to the decision step 794 is "no," the process 790 in step 812 returns to the menu. If the answer is "yes", the process 790 in a decision step 796 determines whether the transaction record to be edited is held locally in the POS device. If the answer is "yes", the process 790 in step 800 locates and accesses the local transaction record. If the answer is "no," the process 790 in step 802 requests access to the transaction record held at the check processing service.

As shown in FIG. 19B, the process 790 obtains the transaction record, either locally or remotely, and in step 804, performs the void edit operation. In a decision step 806 that follows, the process 790 determines whether a receipt for the edit operation is to be issued. If the answer is "yes", the process 790 in step 810 displays and/or prints a receipt having details such as transaction identifier, changed amount, approval code, agent identifier, transaction class, and the like. If the answer is "no" (AR transaction, or not wanted for non-AR transaction), the process 790 skips the receipt generating step 810. The process 790 then returns to menu in step 812. In certain implementations, the editing configuration allows the user to void one check transaction per editing session. Thus, in such an implementation, the process 790 does not prompt the user for another void operation.

Figure 20:
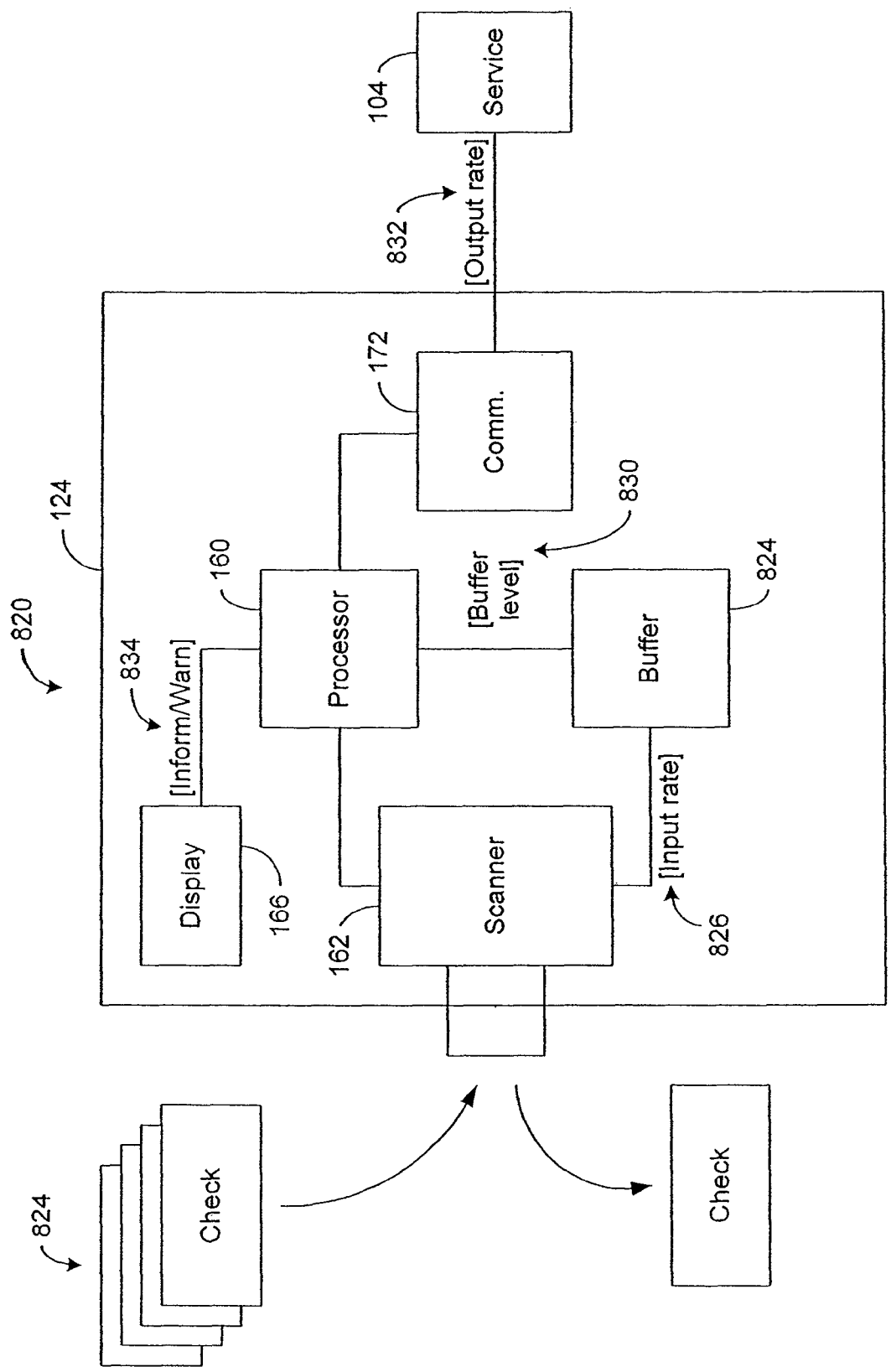
FIG. 20 illustrates one embodiment of a location-base device configured to allow management of the device's throughput.

FIGS. 20-24 now illustrate one aspect of the present teachings relating to the location-base device being configurable to allow managing of the throughput associated with the device. In certain applications of the location-base device, the input rate (into the device) may be sufficiently high enough relative to the output rate (out of the device) so as to be potentially problematic. FIG. 20 illustrates a block diagram of one such exemplary check processing situation 820 where the input rate may be comparable or exceed the output rate. The POS device 124 is depicted as receiving and processing a plurality of 824 in a relatively short time interval. Such a situation may arise, for example, when a landlord receives a plurality of rent checks (AR type) at a specified time of the month and decides to batch-process the checks in one session. The batch processing utilizes the POS device's resource differently than a use such as that of a retail sale processing, where checks are received and processed in a distributed manner over a relatively long period of time. Thus, the POS device's throughput capability may not be an issue when the POS device is used in non-AR applications.

As shown in FIG. 20, the plurality of checks 824 are depicted as being batch processed, wherein checks are scanned one after another by the POS device 124. The device 124 is depicted as comprising the scanner 162 that scans the checks, and the processor 160 that coordinates the scanning and subsequent processing of the transaction records associated with the scanned checks. The POS device 124 further comprises the communication component 172 that facilitates the communication of the POS device 124 with the check processing service 104.

As shown in FIG. 20, one embodiment of the POS device 124 further comprises a buffer component 824 that buffers files associated with the input check transactions. The buffer 824 may comprise some form of a storage medium that can modulate the input rate to the processor 160. The buffer 824 may also function as a temporary storage area for files that are being processed by the processor 160. It will be appreciated that the buffer 824 may also comprise other components associated with POS devices, wherein such components facilitate the "buffering" function as is generally understood in the art.

Associated with the buffer 824 is a buffer capacity that determines how much the buffer 824 can store before it becomes "filled." In one embodiment, a buffer level 830, indicative of how "full" the buffer 824 is, is monitored by the processor 160. An increasing buffer level 830 may indicate that an input rate 826 is greater than an output rate 832 associated with the POS device 124. Thus, if the buffer level 830 increases beyond some threshold level, the processor may be configured to trigger an appropriate warning to the user.

As shown in FIG. 20, one embodiment of the POS device 124 further comprises the display component 166 that can receive an inform/warn command 834 from the processor 160 when the throughput of the device 124 is affected in some manner. One exemplary situation that may result in the inform/warn command 834 is when the buffer level exceeds the threshold level as described above.

In FIG. 20, the input rate 826 is depicted in an exemplary manner as a rate of transfer of data from the scanner 162 to the buffer 824. It will be appreciated, however, that the input rate may include other factors such as user inputs and whether the check is imaged in full or partial manner.

Figure 21:
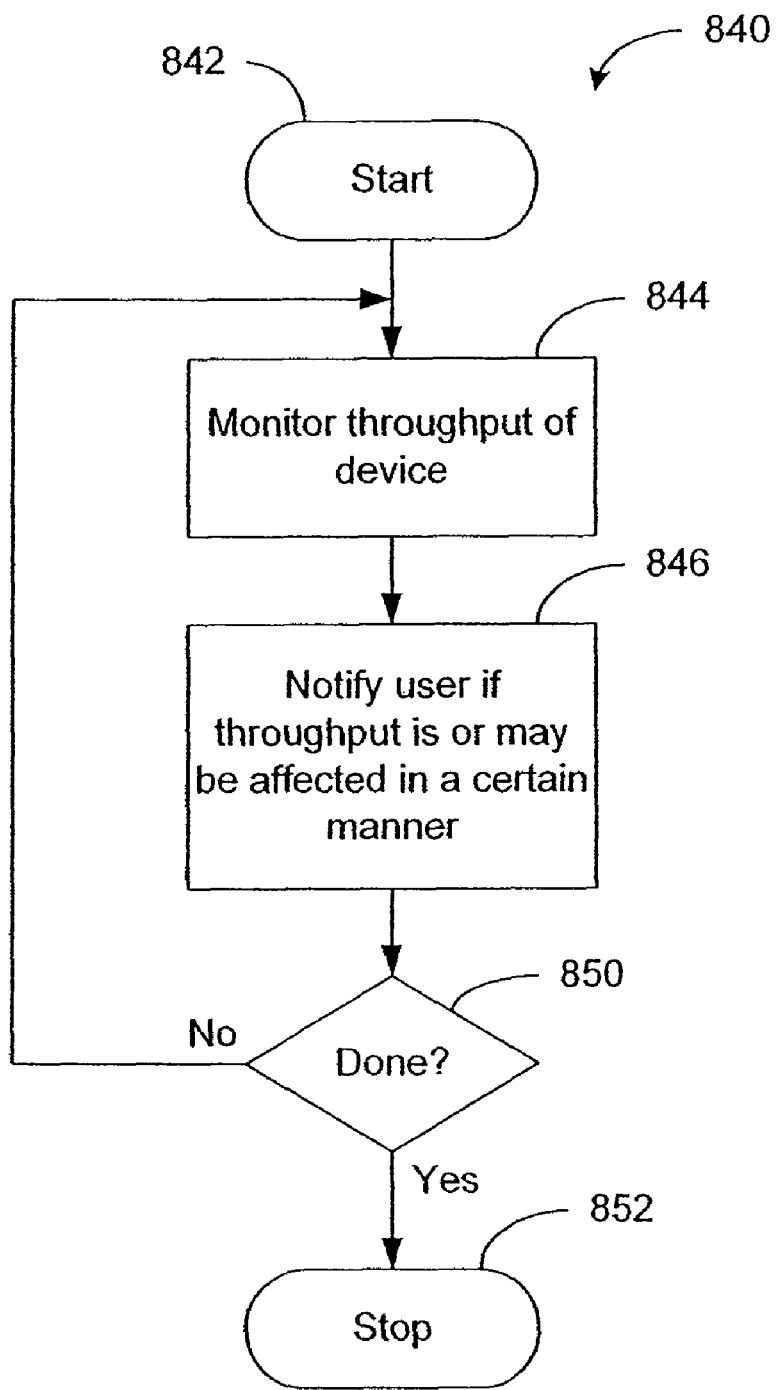
FIG. 21 illustrates a process that monitors the device's throughput and notifies the user if the throughput is affected in a certain manner.

FIG. 21 illustrates a process 840 that monitors the throughput of the POS device and notifies the user under certain conditions. The process 840 begins in a start state 842, and in step 844 that follows, the process 840 monitors the throughput of the device. In step 846 that follows, the process 840 notifies the user if the throughput is or may be affected in a certain manner. In a decision step 850 that follows, the process 840 determines if the monitoring/notifying operation is done. If the answer is "no", the process 840 loops back to step 844 and repeats the cycle. Thus, the monitoring/notifying operation may repeat until some condition causes the loop to terminate. Such termination of the loop may result in the answer being "yes" in the decision step 850, in which case the process 840 ends in a stop state 852.

Figure 22A:
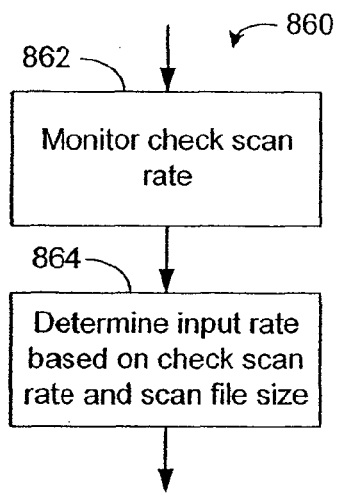
FIGS. 22A-C illustrates various exemplary processes that monitor various factors that can affect the device's throughput.
Figure 22B:
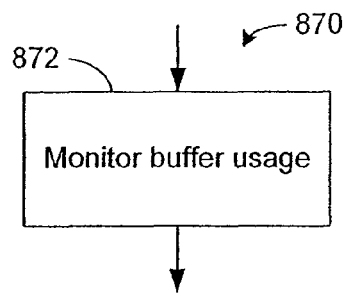
Figure 22C:
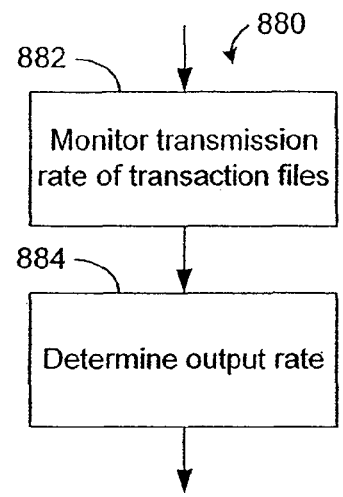

The throughput of the POS device may be affected by various factors, one of which is the buffer capacity as described above. FIGS. 22A-C illustrates some exemplary processes that monitor some of the exemplary factors that affect the throughput of the POS device. Some of all of the various exemplary processes can be implemented in step 844 of the process 840 (FIG. 21) in any combination.

FIG. 22A illustrates a process 860 that monitors the input rate based on the check scanning operation. The process 860, in step 862, monitors the check scan rate. In step 864 that follows, the process 860 estimates the input rate based on the check scan rate and the sizes of the files associated with the scanned checks.

FIG. 22B illustrates a process 870 that monitors the buffer usage of the POS device in step 872. The buffer usage may be monitored by monitoring the buffer level as described above in reference to FIG. 20.

FIG. 22C illustrates a process 880 that monitors the output rate of the POS device based on a transmission rate associated with the POS device. The process 880, in step 882, monitors the transmission rate of the check transaction files. In step 884 that follows, the process 880 estimates the output rate based on the transmission rate and the size of the transaction files being transmitted.

Figure 22D:
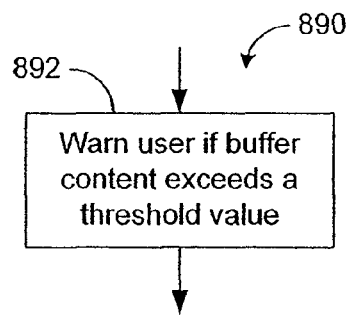
FIG. 22D illustrates an exemplary process that warns the user if a buffer content exceeds a threshold value.
Figure 23A:
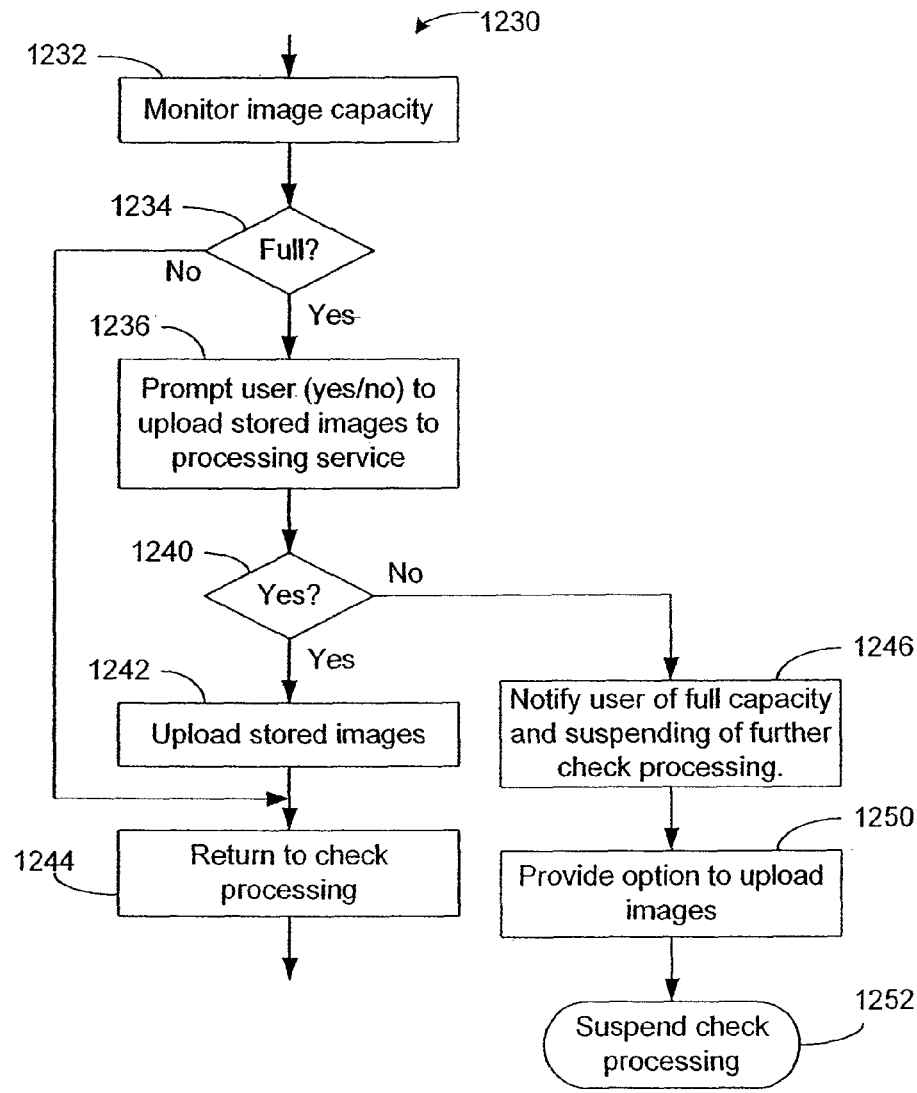
FIGS. 23A-D illustrate a process that prompts the user to upload stored check images to the processing service when the image capacity reaches a full level.
Figures 23B, 23C, 23D:
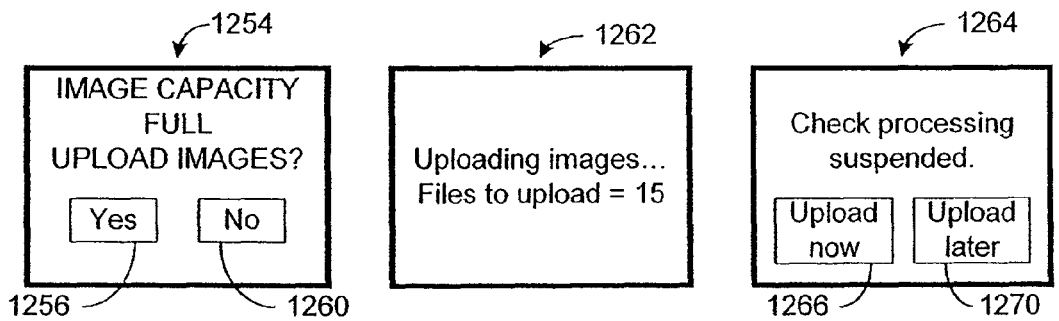

FIG. 22D illustrates an exemplary process 890 that may be performed as part of step 846 of the process 840 (FIG. 20). The process 890, in step 892, warns the user if the buffer level exceeds a threshold value. Such a triggering event may result from the input rate being greater than the output rate for a significant duration. Thus, in one implementation, the buffer level may collectively represent the input rate, output rate, and the buffer usage factors.

In certain embodiments of the POS device, the conversion process comprises scanning of the check. During the scanning operation, the check's magnetic ink character recognition (MICR) line is read, and the check is imaged either in full or in part(s) (often referred to as snippets). Information from the MICR, along with the check amount (either provided by the user, or confirmed by the user if in default amount mode) are used to allow either authorization or decline of the check transaction. In these embodiments, the check image is not used by the check processing service to render a preferably quick decision. Thus, the check image files are stored in the POS device, either in the buffer or some other storage means, for batch processing later. In one embodiment, only the check image files corresponding to authorized transactions are stored. In another embodiment, substantially all of the converted image files are stored whether or not the corresponding transactions are authorized or not. During the batch "uploading", the check image files are transferred to the check processing service for subsequent processing.

If the stored images occupy the storage beyond a certain level, the POS device may not be able to store more images, and thus not be able to convert more checks until the storage area is cleared in some manner. Thus, one can see that the number of stored images and the storage capacity can affect the throughput of the POS device.

FIGS. 23-24 illustrate an image uploading feature that may be implemented in certain embodiments of the POS device to trigger and warn the user when the device's image holding capacity becomes full. It will be understood that the term "full" may include situations where the storage level exceeds a pre-set threshold level thereby providing a "safety" margin.

FIGS. 23A-D illustrate an exemplary monitor and trigger process 1230 that monitors the storage level of the images. The process 1230 in step 1232 monitors the image capacity (storage level) of the POS device. In a decision step 1234 that follows, the process 1230 determines whether the image capacity is full. If the answer is "no," the process 1230 in step 1244 returns to a check processing function that may invoke further monitoring of the image capacity. If the answer is "yes", the process 1230 in step 1236 prompts the user to decide whether the stored images should be uploaded to the processing service. In one implementation, the user can decide by a yes/no decision in response to an exemplary prompt 1254 (having yes and no touch-screen options 1256 and 1260) depicted in FIG. 23B. Thus, in a decision step 1240 that follows, the process 1230 determines whether the user's answer is a yes. If the answer is "yes", the process 1230 in step 1242 induces batch uploading of the stored images, thereby making room for subsequent check images. The status of image uploading may be presented to the user by an exemplary message 1262 depicted in FIG. 23B. The process 1230 then returns to the check processing function in step 1244. If the answer is "no" in the decision step 1240, the process 1230 in step 1246 notifies the user of the full capacity and the suspension of further check processing. In step 1250 that follows, the process 1230 provides the user an option to upload the images. Then, the process 1230 in state 1252 suspends further check processing until the images are uploaded. The notice/suspension/option features of steps 1246, 1250, and 1252 may be presented to the user in an exemplary message 1264 having upload now and upload later options 1266 and 1270.

Figures 24A, 24B:
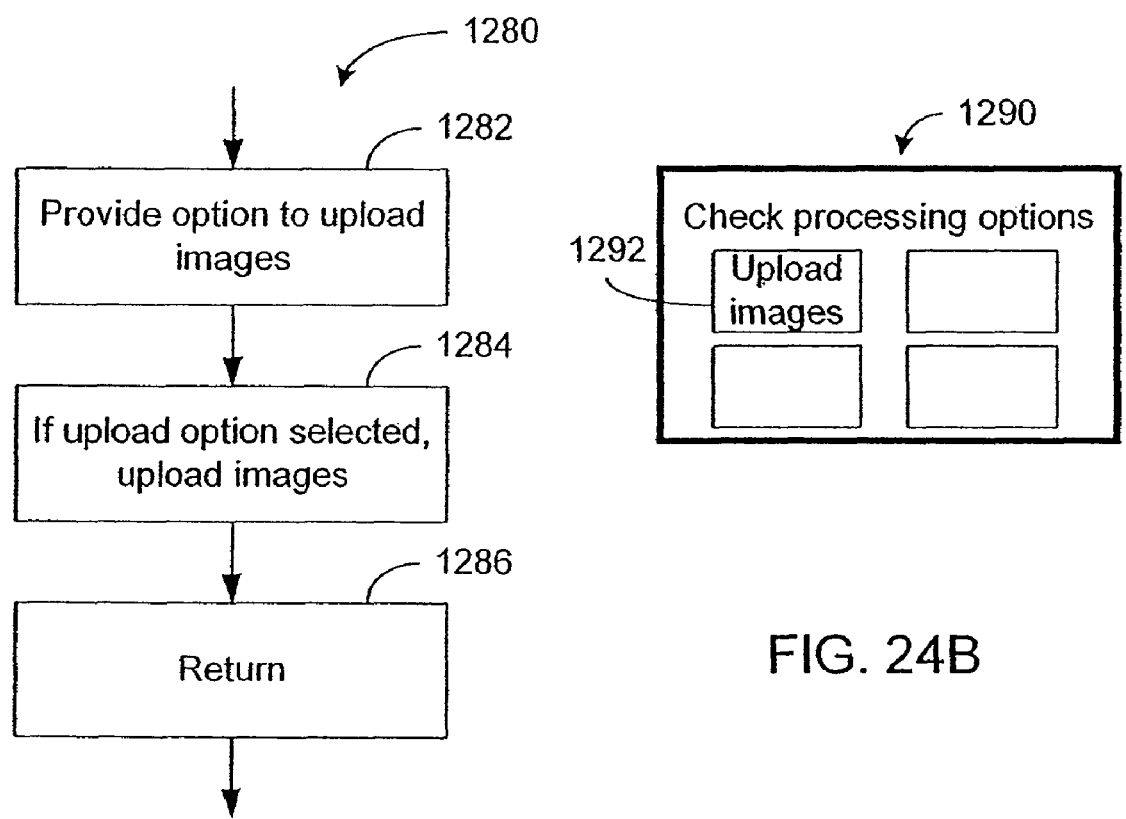
FIGS. 24A-B illustrate a process that allows the user to upload the stored check images.

FIGS. 24A-B illustrate that the image uploading option does not need to be triggered by the full-storage condition. In certain embodiments, the uploading of images may be performed any time, via a menu such as an exemplary menu 1290 where an upload images option 1292 is an option presented to the user. Thus, an exemplary process 1280 in step 1282 provides an option to the user to select image uploading. In step 1284 that follows, the process 1280 induces uploading of the stored images if the upload option is selected by the user. The process 1280 in step 1286 then returns to a check processing function in which it was engaged in.

Figure 25:
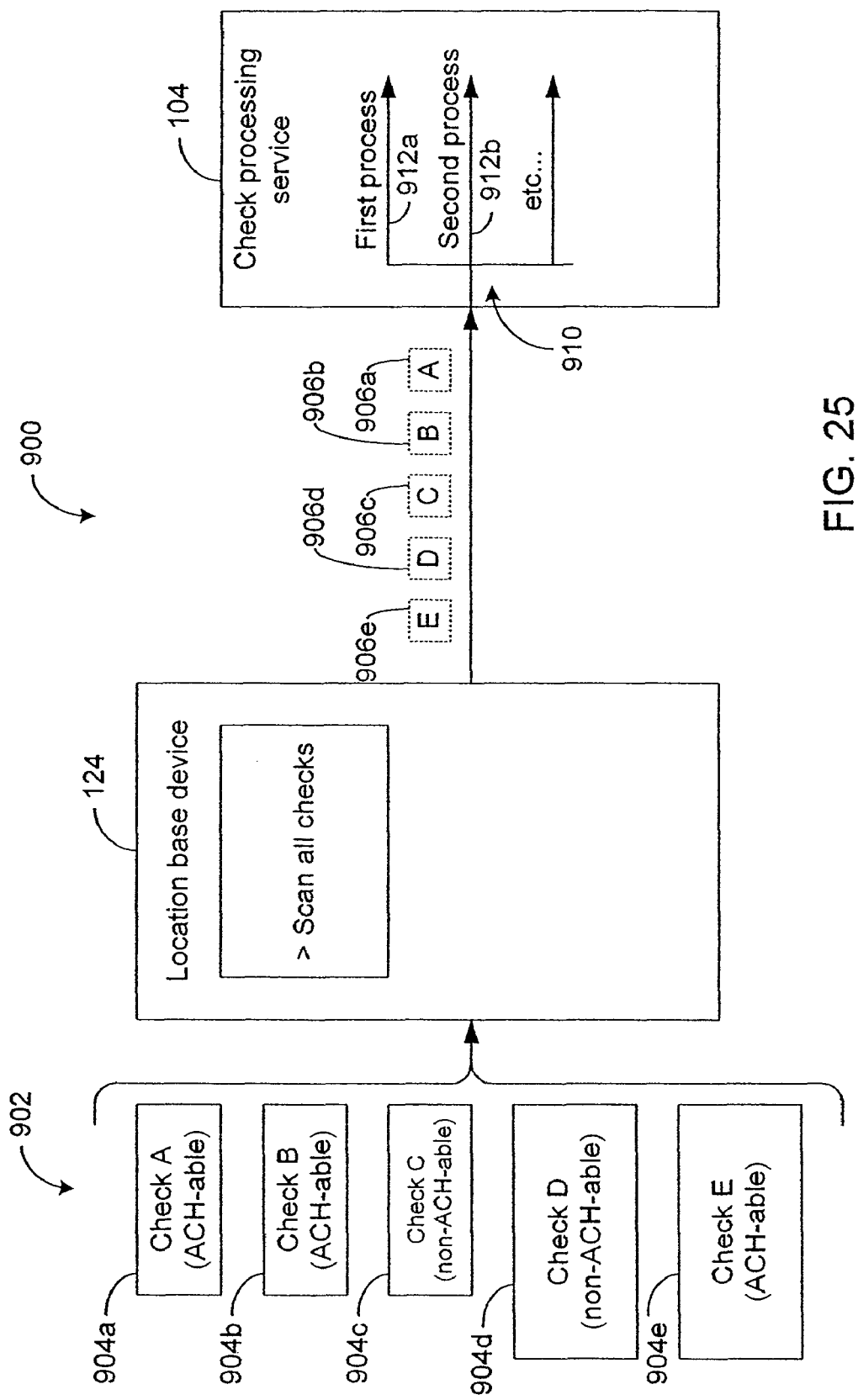
FIG. 25 illustrates one embodiment of a system configured to allow the merchant to scan different types of checks and have the check processing service process the different types of checks differently thereby simplifying the merchant's task.

FIGS. 25-27 now illustrate one aspect of the present teachings relating to the location-base device and the check processing service being configurable to allow at least some of the check-type selection to be performed at the processing service, thereby simplifying the manner in which the merchant processes a plurality of received checks. FIG. 25 illustrates a block diagram of a check-type selection configuration 900 wherein the POS device 124 scans a plurality of checks 902. The exemplary checks 902 being processed by the POS device 124 are depicted as comprising an ACH-processable ("ACH-able") check A (904a), an ACH-able check B (904b), a non-ACH-able check C (904c), a non-ACH-able check D (904d), and an ACH-able check E (904e).

As shown in FIG. 25, the POS device 124 may be configured to prompt the user to scan all checks, thereby allowing the user to process the checks 902 without having to decide in advance which checks can and cannot be processed via the POS device 124. The scanned checks, along with information input by the user, result in a plurality of exemplary electronic transaction files 906a-e denoted as "A" to "E" that are transmitted to the check processing service 104.

The check processing service 104, upon receipt of the plurality of transaction files from the POS device 124, processes each of the transactions via one or more of a plurality of processes 910 depending on the check-type. The plurality of processes 910 is depicted as comprising branching pathways representing various processes 912a, b, etc.

Figures 26A, 26B:
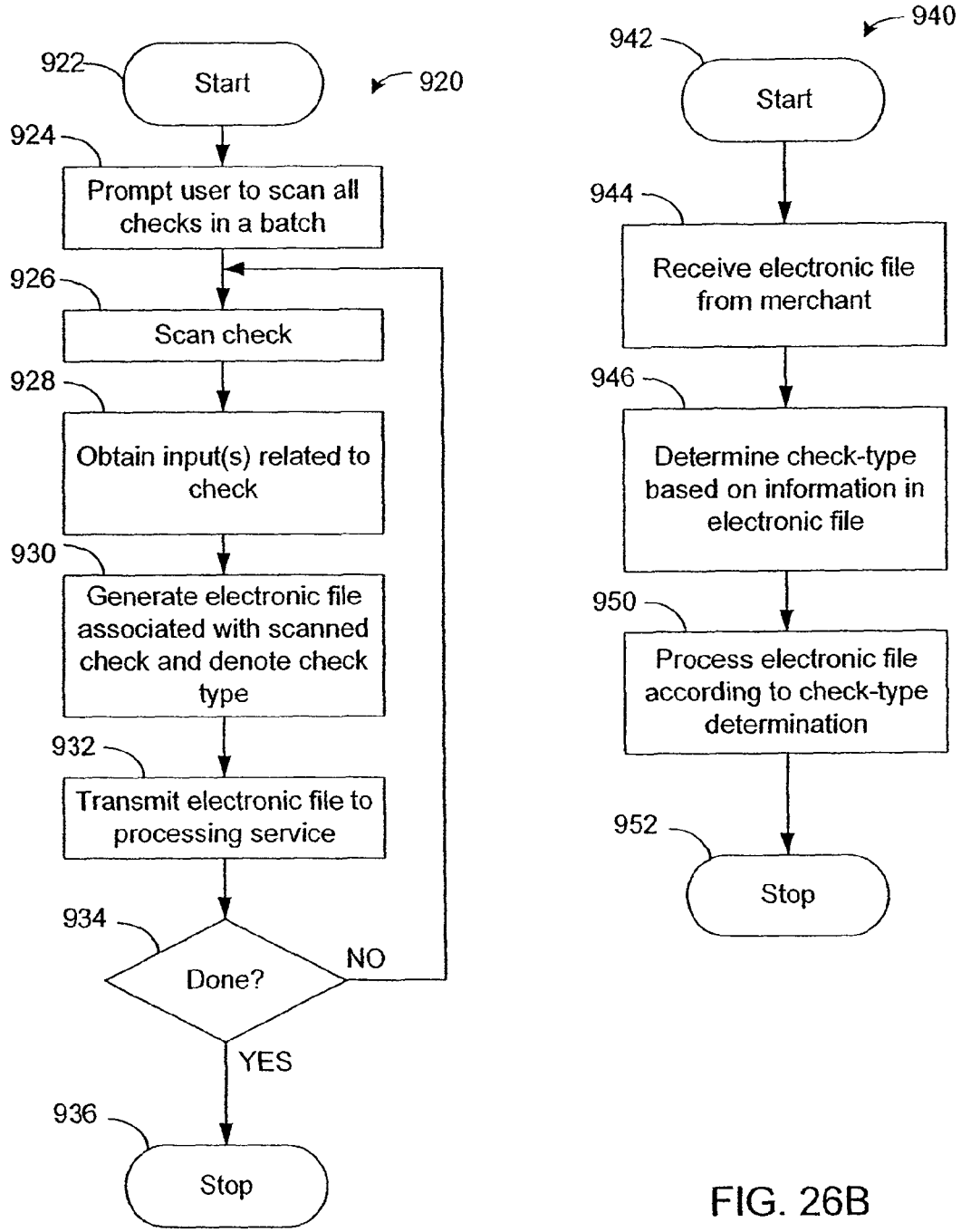
FIG. 26A illustrates a process that allows the merchant to scan different types of checks with the location-base device.
FIG. 26B illustrates a process that allows the check processing service to selectively process electronic files generated by the different types of checks scanned by the location-base device.

FIGS. 26A-B illustrate processes representative of the check-type selection configuration 900 described above in reference to FIG. 25. FIG. 26A illustrates a process 920 that can be implemented at the POS device, and FIG. 26B illustrates a process 940 that can be implemented at the check processing service.

As shown in FIG. 26A, the process 920 begins in a start state 922, and in step 924 that follows, the process 920 prompts the user to scan all checks in a batch. In step 926 that follows, the process 920 induces scanning of a check. In step 928 that follows, the process 920 induces obtaining of input (s) related to the scanned check. In step 930 that follows, the process 920 generates an electronic file associated with the scanned check and denotes the check-type of the scanned check. In step 932 that follows, the process transmits the electronic file to the check processing service. In a decision step 934 that follows, the process 920 determines whether the batch scanning is done. If the answer is "no", the process 920 loops back to step 926 to scan and process another check. If the answer is "yes", the process 920 ends in a stop state 936.

As shown in FIG. 26B, the process 940 begins at a start state 942, and in step 944 that follows, the process 940 receives an electronic file from the merchant. In step 946 that follows, the process 940 determines the type of the check based on information in the electronic file. In step 950 that follows, the process 940 induces further processing of the electronic file according to the check-type determination. The process 940 ends in a stop state 952.

Figures 27A, 27B:
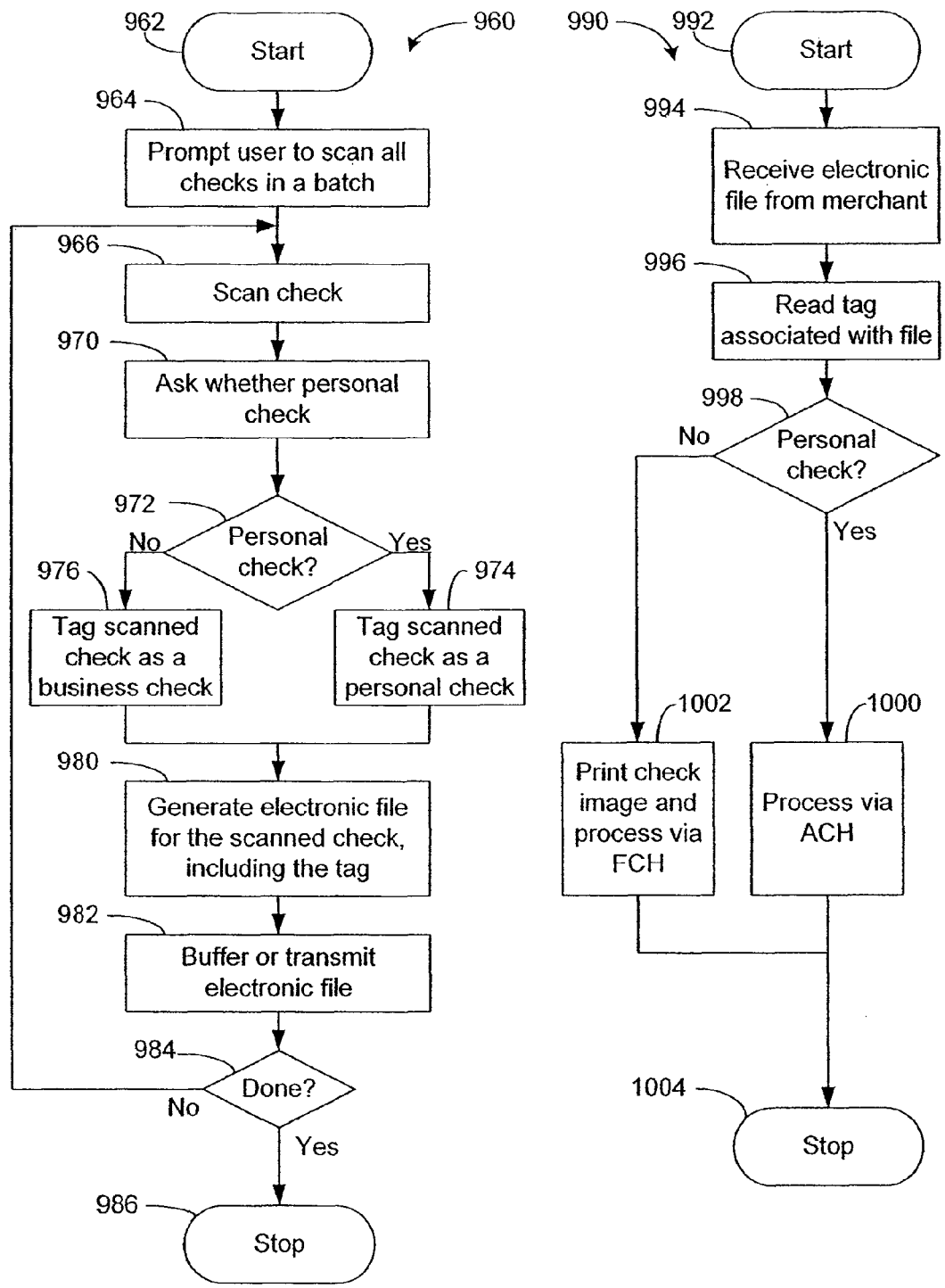
FIG. 27A illustrates an exemplary process that allows the location-base device to tag the check transactions as a personal or a non-personal check transactions as the merchant scans the different types of checks.
FIG. 27B illustrates an exemplary process that allows the check processing service to process the check transaction as a personal or a non-personal check transaction based on the tag attached by the location-base device.

FIGS. 27A-B illustrate more specific exemplary processes 960 and 990 corresponding to the generalized processes 920 and 940 described above in reference to FIGS. 26A-B. The exemplary processes 960 and 990 are described in context of distinguishing the type of the check by determining whether the check is a personal check or a non-personal check. It will be appreciated, however, any other check types may be used to distinguish the checks without departing from the spirit of the present teachings. Furthermore, the use of the personal/non-personal check criteria is in no way intended to limit the scope of the present teachings.

As shown in FIG. 27A, the process 960 begins at a start state 962, and in step 964 that follows, the process 960 prompts the user to scan all checks in a batch. In step 966 that follows, the process 960 induces scanning of a check. In step 970 that follows, the process 960 asks the user whether the scanned check is a personal check. In a decision step 972 that follows, the process 960 determines whether the scanned check is a personal check. If the answer is "yes", the process 960 in step 974 tags the scanned check as a personal check. If the answer is "no", the process 960 in step 976 tags the scanned check as a non-personal check. As shown in FIG. 27A, the process 960 in step 980 then generates an electronic file for the scanned check, including the check-type tag. In step 982 that follows, the process 960 buffers and/or transmits the electronic file to the check processing service. In a decision step 984 that follows, the process 960 determines whether the batch scanning is done. If the answer is "no", the process 960 loops back to step 966 to scan and process another check. If the answer is "yes", the process 960 ends at a stop state 986.

As shown in FIG. 27B, the process 990 begins at a start state 992, and in step 994 that follows, the process 990 receives an electronic file from the merchant. In step 996 that follows, the process 990 reads the check-type tag associated with the electronic file. In a decision step 998 that follows, the process 990 determines whether the electronic file corresponds to a personal check. If the answer is "yes", the process 990 in step 1000 induces further electronic processing of the file via the automated clearing house (ACH). If the answer is "no," the process 990 in step 1002 induces printing of an image of the check from the electronic file and further processing of the check image via the federal clearing house (FCH). As shown in FIG. 27B, the process 990 then ends at a stop state 1004.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. An apparatus for processing a financial transaction received in a non-face-to-face manner, comprising:
   a conversion component that converts a financial transaction into an electronic format to allow at least a portion of the financial transaction to be processed electronically, the conversion component further tags the electronic format of the financial transaction as an accounts receivable transaction if the financial transaction was received in a non-face-to-face manner; and
   a communication link that sends the tagged electronic format of the financial transaction to a check processing service that prints an image of the financial transaction based at least in part on the tagged electronic format and processes the printed image of the financial transaction via the federal clearing house (FCH).

2. The apparatus of claim 1, wherein the financial transaction comprises an accounts receivable check received by a merchant.

3. The apparatus of claim 2, wherein the conversion component scans at least a portion of the accounts receivable check to facilitate the electronic processing of the accounts receivable check.

4. The apparatus of claim 1, wherein the check processing service determines whether to authorize or decline the accounts receivable check.

5. The apparatus of claim 4, wherein determining whether to authorize or decline the accounts receivable check comprises performing a risk assessment of the financial transaction.

6. The apparatus of claim 5, wherein determining whether to authorize or decline the accounts receivable check depends at least in part on a level of service subscribed by the merchant.

7. The apparatus of claim 6, wherein the level of service comprises a guarantee of the financial transaction by the check processing service when the check processing service authorizes the accounts receivable check.

8. A method of processing a financial transaction received in a non-face-to-face manner, the method comprising:
   converting a financial transaction into an electronic format to allow at least a portion of the financial transaction to be processed electronically;
   tagging the electronic format of the financial transaction as an accounts receivable transaction if the financial transaction was received in a non-face-to-face manner; and
   sending the tagged electronic format of the financial transaction to a check processing service that that prints an image of the financial transaction based at least in part on the tagged electronic format and processes the printed image of the financial transaction via the federal clearing house (FCH).

9. The method of claim 8, wherein the financial transaction comprises an accounts receivable check received by a merchant.

10. The method of claim 8, wherein converting comprises scanning at least a portion of the accounts receivable check to facilitate the electronic processing of the accounts receivable check.

11. The method of claim 8, further comprising communicating with a check processing service.

12. The method of claim 11, wherein the check processing service determines whether to authorize or decline the accounts receivable check.

13. The method of claim 12, wherein determining whether to authorize or decline the accounts receivable check comprises performing a risk assessment of the financial transaction.

14. The method of claim 13, wherein determining whether to authorize or decline the accounts receivable check depends at least in part on a level of service subscribed by the merchant.

15. The method of claim 14, wherein the level of service comprises a guarantee of the financial transaction by the check processing service when the check processing service authorizes the accounts receivable check.

16. An apparatus for processing a financial transaction received in a non-face-to-face manner, comprising:
   first means for scanning at least a portion of the financial transaction;
   second means for tagging the scanned financial transaction as an accounts receivable financial transaction if the financial transaction was received in a non-face-to-face manner; and
   third means for sending the tagged financial transaction electronically to a check processing service that prints an image of the financial transaction based at least in part on the tagged financial transaction and processes the image of the financial transaction via the federal clearing house (FCH).

17. The apparatus of claim 16, wherein the financial transaction comprises an accounts receivable check received by a merchant.

18. The apparatus of claim 16, wherein the first means for scanning scans at least a portion of the accounts receivable check to facilitate the electronic processing of the accounts receivable check.

19. The apparatus of claim 16, wherein the first means for scanning further communicates with a check processing service.

20. The apparatus of claim 19, wherein the check processing service determines whether to authorize or decline the accounts receivable check.

21. The apparatus of claim 20, wherein determining whether to authorize or decline the accounts receivable check comprises performing a risk assessment of the financial transaction.

22. The apparatus of claim 21, wherein determining whether to authorize or decline the accounts receivable check depends at least to some degree on a level of service subscribed by the merchant.

23. The apparatus of claim 22, wherein the level of service comprises a guarantee of the financial transaction by the check processing service when the check processing service authorizes the accounts receivable check.

* * * * *